(12) United States Patent
Andrews et al.

(10) Patent No.: US 10,669,403 B2
(45) Date of Patent: *Jun. 2, 2020

(54) POLYOLEFIN COMPOSITIONS FOR BUILDING MATERIALS

(71) Applicant: BASF SE, Ludwigshafen (DE)

(72) Inventors: Stephen Mark Andrews, New Fairfield, CT (US); Joseph James Fay, Hopewell Junction, NY (US); Roswell Easton King, Pleasantville, NY (US); Mohammad Zafar, Pittsford, NY (US); Zhisheng Chen, Bernardsville, NY (US); Thomas Friend Thompson, Highland Mills, NY (US); Feng Zuo, Scarsdale, NY (US)

(73) Assignee: BASF SE, Ludwigshafen (DE)

( * ) Notice: Subject to any disclaimer, the term of this patent is extended or adjusted under 35 U.S.C. 154(b) by 151 days.

This patent is subject to a terminal disclaimer.

(21) Appl. No.: 15/419,283

(22) Filed: Jan. 30, 2017

(65) Prior Publication Data

US 2017/0137613 A1    May 18, 2017

Related U.S. Application Data

(63) Continuation of application No. 15/025,015, filed as application No. PCT/IB2014/002719 on Sep. 24, 2014.

(Continued)

(51) Int. Cl.
| | |
|---|---|
| *C08K 13/02* | (2006.01) |
| *C08K 3/013* | (2018.01) |
| *C08K 3/015* | (2018.01) |
| *E04D 5/06* | (2006.01) |
| *E04F 13/18* | (2006.01) |
| *E04D 13/15* | (2006.01) |
| *C08K 5/00* | (2006.01) |
| *C08K 5/132* | (2006.01) |
| *C08K 5/134* | (2006.01) |
| *C08K 5/17* | (2006.01) |
| *C08K 5/32* | (2006.01) |

(Continued)

(52) U.S. Cl.
CPC ............. *C08K 13/02* (2013.01); *B32B 27/32* (2013.01); *C08K 3/013* (2018.01); *C08K 3/015* (2018.01); *C08K 3/22* (2013.01); *C08K 3/2279* (2013.01); *C08K 3/26* (2013.01); *C08K 3/34* (2013.01); *C08K 5/0041* (2013.01); *C08K 5/0058* (2013.01); *C08K 5/0066* (2013.01); *C08K 5/053* (2013.01); *C08K 5/132* (2013.01); *C08K 5/138* (2013.01); *C08K 5/1345* (2013.01); *C08K 5/17* (2013.01); *C08K 5/32* (2013.01); *C08K 5/3435* (2013.01); *C08K 5/3475* (2013.01); *C08K 5/3492* (2013.01); *C08K 5/52* (2013.01); *C08K 5/526* (2013.01); *C08L 23/06* (2013.01); *C08L 23/12* (2013.01); *E04D 5/06* (2013.01); *E04D 13/15* (2013.01); *E04F 13/18* (2013.01); *B32B 7/02* (2013.01); *C08K 2003/2224* (2013.01); *C08K 2003/2241* (2013.01); *C08K 2003/265* (2013.01); *C08K 2201/014* (2013.01); *C08L 2205/02* (2013.01); *C08L 2205/24* (2013.01); *C08L 2207/062* (2013.01); *Y10T 428/2495* (2015.01)

(58) Field of Classification Search
CPC .......... C08L 23/12; C08L 23/06; C08L 23/02; C08K 3/005; C08K 3/0033; C08K 3/2279; C08K 3/32; C08K 5/005; C08K 5/0041; C08K 5/0058; C08K 5/0066; C08K 5/132; C08K 5/1345; C08K 5/17; C08K 5/32; C08K 5/3435; C08K 5/3475; C08K 5/3492; C08K 5/526; C08K 5/138; E04B 1/00–994; E04B 7/00–24; E04D 1/00–365; E04D 12/00–008; E04D 13/15–178; E04C 2/00–546
See application file for complete search history.

(56) References Cited

U.S. PATENT DOCUMENTS 3,004,896 A    10/1961    Heller et al.
3,055,896 A     9/1962    Boyle et al.
(Continued)

FOREIGN PATENT DOCUMENTS

EP    0 564 961    10/1993
EP    2 206 743     7/2010
(Continued)

OTHER PUBLICATIONS

Blomenhofer et al. "'Designer' Nucleating Agents for Polypropylene". Macromolecules, 38, (2005); pp. 3688-3695.*
(Continued)

*Primary Examiner* — Prashant J Khatri
(74) *Attorney, Agent, or Firm* — Foley & Lardner LLP

(57) ABSTRACT

A polyolefin composition includes a polyolefin substrate having incorporated therein a nucleating agent and a filler, wherein the composition exhibits an impact strength of >35 in-lb measured according to ASTM D4226, and a coefficient of linear thermal expansion of <4.5×10E-05 in/in/ft measured according to ASTM D696. The polyolefin composition may further include one or more of an ultraviolet light absorber, a hindered amine light stabilizer, an antioxidant, a colorant, a flame retardant, and an antimicrobial compound. The polyolefin compositions may be useful for construction articles for outdoor use, for instance house siding, cladding, soffit or roofing.

17 Claims, No Drawings

Related U.S. Application Data

(60) Provisional application No. 61/969,498, filed on Mar. 24, 2014, provisional application No. 61/883,229, filed on Sep. 27, 2013.

(51) Int. Cl.

| | |
|---|---|
| *C08K 5/3475* | (2006.01) |
| *C08K 5/3492* | (2006.01) |
| *C08K 5/526* | (2006.01) |
| *C08L 23/06* | (2006.01) |
| *C08L 23/12* | (2006.01) |
| *B32B 27/32* | (2006.01) |
| *C08K 5/3435* | (2006.01) |
| *C08K 3/22* | (2006.01) |
| *C08K 3/26* | (2006.01) |
| *C08K 3/34* | (2006.01) |
| *C08K 5/053* | (2006.01) |
| *C08K 5/138* | (2006.01) |
| *C08K 5/52* | (2006.01) |
| *B32B 7/02* | (2019.01) |

(56) References Cited

U.S. PATENT DOCUMENTS

| | | |
|---|---|---|
| 3,072,585 A | 1/1963 | Milionis et al. |
| 3,074,910 A | 1/1963 | Dickson et al. |
| 3,189,615 A | 6/1965 | Heller et al. |
| 3,218,332 A | 11/1965 | Heller et al. |
| 3,230,194 A | 1/1966 | Boyle et al. |
| 3,843,371 A | 10/1974 | Piller et al. |
| 3,966,894 A | 6/1976 | Cuer et al. |
| 4,079,035 A | 3/1978 | Brackenridge |
| 4,107,108 A | 8/1978 | Dieck et al. |
| 4,108,805 A | 8/1978 | Dieck et al. |
| 4,127,586 A | 11/1978 | Rody et al. |
| 4,174,343 A | 11/1979 | Hardy et al. |
| 4,226,763 A | 10/1980 | Dexter et al. |
| 4,228,063 A | 10/1980 | Granzow |
| 4,275,004 A | 6/1981 | Winter et al. |
| 4,278,589 A | 7/1981 | Dexter et al. |
| 4,315,848 A | 2/1982 | Dexter et al. |
| 4,325,863 A | 4/1982 | Hinsken et al. |
| 4,338,244 A | 7/1982 | Hinsken et al. |
| 4,347,180 A | 8/1982 | Winter et al. |
| 4,383,863 A | 5/1983 | Dexter et al. |
| 4,619,956 A | 10/1986 | Susi |
| 4,675,352 A | 6/1987 | Winter et al. |
| 4,681,905 A | 7/1987 | Kubota et al. |
| 4,692,486 A | 9/1987 | Gugumus |
| 4,740,542 A | 4/1988 | Susi |
| 4,775,585 A | 10/1988 | Hagiwara et al. |
| 4,812,141 A | 3/1989 | Baumgartner et al. |
| 4,853,471 A | 8/1989 | Rody et al. |
| 4,911,898 A | 3/1990 | Hagiwara et al. |
| 4,911,899 A | 3/1990 | Hagiwara et al. |
| 4,916,198 A | 4/1990 | Scheve et al. |
| 5,004,770 A | 4/1991 | Cortolano et al. |
| 5,096,489 A | 3/1992 | Laver |
| 5,096,950 A | 3/1992 | Galbo et al. |
| 5,106,891 A | 4/1992 | Valet |
| 5,112,890 A | 5/1992 | Behrens et al. |
| 5,124,378 A | 6/1992 | Behrens et al. |
| 5,145,893 A | 9/1992 | Galbo et al. |
| 5,175,312 A | 12/1992 | Dubs et al. |
| 5,203,941 A | 4/1993 | Spain et al. |
| 5,204,473 A | 4/1993 | Winter et al. |
| 5,214,084 A | 5/1993 | Ishii et al. |
| 5,216,052 A | 6/1993 | Nesvadba et al. |
| 5,216,156 A | 6/1993 | Galbo et al. |
| 5,252,643 A | 10/1993 | Nesvadba |
| 5,268,450 A | 12/1993 | Deslauriers et al. |
| 5,278,314 A | 1/1994 | Winter et al. |
| 5,280,124 A | 1/1994 | Winter et al. |
| 5,284,693 A | 2/1994 | Spain et al. |
| 5,298,067 A | 3/1994 | Valet et al. |
| 5,300,414 A | 4/1994 | Leppard et al. |
| 5,300,544 A | 4/1994 | Galbo et al. |
| 5,319,091 A | 6/1994 | Deslauriers et al. |
| 5,354,794 A | 10/1994 | Stevenson et al. |
| 5,356,966 A | 10/1994 | Nesvadba |
| 5,367,008 A | 11/1994 | Nesvadba |
| 5,369,159 A | 11/1994 | Nesvadba |
| 5,393,812 A | 2/1995 | Haley et al. |
| 5,410,071 A | 4/1995 | Deslauriers et al. |
| 5,428,162 A | 6/1995 | Nesvadba |
| 5,428,177 A | 6/1995 | Nesvadba |
| 5,436,349 A | 7/1995 | Winter et al. |
| 5,461,151 A | 10/1995 | Waterman |
| 5,476,937 A | 12/1995 | Stevenson et al. |
| 5,489,503 A | 2/1996 | Toan |
| 5,508,318 A | 4/1996 | Comer |
| 5,516,914 A | 5/1996 | Winter et al. |
| 5,543,518 A | 8/1996 | Stevenson et al. |
| 5,554,668 A | 9/1996 | Scheve et al. |
| 5,554,760 A | 9/1996 | Winter et al. |
| 5,556,973 A | 9/1996 | Stevenson et al. |
| 5,563,242 A | 10/1996 | Winter et al. |
| 5,574,166 A | 11/1996 | Winter et al. |
| 5,591,785 A | 1/1997 | Scheve et al. |
| 5,597,854 A | 1/1997 | Birbaum et al. |
| 5,607,987 A | 3/1997 | Winter et al. |
| 5,662,977 A | 9/1997 | Spain et al. |
| 5,679,733 A | 10/1997 | Malik et al. |
| 5,681,955 A | 10/1997 | Stevenson |
| 5,726,309 A | 3/1998 | Stevenson et al. |
| 5,731,362 A | 3/1998 | Scheve et al. |
| 5,736,597 A | 4/1998 | Birbaum et al. |
| 5,844,026 A | 12/1998 | Galbo et al. |
| 5,942,626 A | 8/1999 | Winter et al. |
| 5,959,008 A | 9/1999 | Birbaum et al. |
| 5,977,219 A | 11/1999 | Ravichandran et al. |
| 5,980,783 A | 11/1999 | Gugumus |
| 5,998,116 A | 12/1999 | Hayoz et al. |
| 6,013,704 A | 1/2000 | Hayoz et al. |
| 6,046,304 A | 4/2000 | Borzatta et al. |
| 6,060,543 A | 5/2000 | Bolle et al. |
| 6,071,542 A | 6/2000 | Tanimoto et al. |
| 6,117,995 A | 9/2000 | Zedda et al. |
| 6,166,218 A | 12/2000 | Ravichandran et al. |
| 6,242,598 B1 | 6/2001 | Stevenson et al. |
| 6,255,483 B1 | 7/2001 | Fletcher et al. |
| 6,265,599 B1 | 7/2001 | Lee et al. |
| 6,271,377 B1 | 8/2001 | Galbo et al. |
| 6,297,299 B1 | 10/2001 | Borzatta et al. |
| 6,376,584 B1 | 4/2002 | Galbo et al. |
| 6,392,041 B1 | 5/2002 | Galbo et al. |
| 6,472,456 B1 | 10/2002 | Horsey et al. |
| 6,528,559 B1 | 3/2003 | Nakacho et al. |
| 6,585,989 B2 | 7/2003 | Herbst et al. |
| 6,590,004 B1 | 7/2003 | Zehner |
| 6,740,695 B1 | 5/2004 | Eckel et al. |
| 6,823,794 B2 | 11/2004 | Bosler et al. |
| 6,843,939 B2 * | 1/2005 | Stretanski ............ C08K 5/1345 |
| | | 252/405 |
| 7,230,042 B2 | 6/2007 | Roth et al. |
| 7,390,912 B2 | 6/2008 | Xia |
| 7,423,088 B2 | 9/2008 | Mader et al. |
| 7,468,410 B2 | 12/2008 | Chafin et al. |
| 7,601,853 B2 | 10/2009 | Xia |
| 7,786,199 B2 | 8/2010 | Pauquet et al. |
| 7,790,793 B2 | 9/2010 | Schmidt et al. |
| 7,888,414 B2 | 2/2011 | Gelbin et al. |
| 8,006,455 B1 | 8/2011 | Mollinger et al. |
| 8,028,475 B2 * | 10/2011 | Sigmund ............ E04D 13/152 |
| | | 52/302.1 |
| 8,061,097 B2 | 11/2011 | Holt et al. |
| 8,124,664 B2 | 2/2012 | Van Rheenen et al. |
| 8,183,312 B2 | 5/2012 | Pham et al. |
| 8,304,477 B2 | 11/2012 | King et al. |
| 8,349,925 B2 | 1/2013 | Butz |
| 8,399,725 B2 | 3/2013 | Brant et al. |
| 8,653,284 B2 | 2/2014 | Xia |

(56) References Cited

U.S. PATENT DOCUMENTS

| | | |
|---|---|---|
| 2001/0006990 A1 | 7/2001 | Jeong et al. |
| 2002/0120041 A1 | 8/2002 | Zingg et al. |
| 2003/0027890 A1 | 2/2003 | Stadler |
| 2003/0220422 A1 | 11/2003 | Kaprinidis |
| 2004/0030009 A1 | 2/2004 | Gugumus |
| 2004/0198875 A1 | 10/2004 | Kaprinidis et al. |
| 2005/0004294 A1* | 1/2005 | Chin .................. B82Y 30/00 524/445 |
| 2005/0049337 A1 | 3/2005 | Stretanski et al. |
| 2005/0222444 A1* | 10/2005 | Bos .................... C07C 29/70 556/130 |
| 2006/0013994 A1 | 1/2006 | Burke et al. |
| 2006/0276571 A1* | 12/2006 | Sharma .............. C08F 255/02 524/98 |
| 2007/0092701 A1 | 4/2007 | Jeng |
| 2008/0182074 A1 | 7/2008 | Pasquale et al. |
| 2008/0306183 A1 | 12/2008 | Leukel et al. |
| 2009/0111915 A1 | 4/2009 | Lavallee et al. |
| 2009/0308009 A1 | 12/2009 | Boor |
| 2010/0016482 A1 | 1/2010 | Heck et al. |
| 2010/0029844 A1 | 2/2010 | Fink et al. |
| 2010/0048782 A1 | 2/2010 | Gelbin et al. |
| 2010/0152376 A1 | 6/2010 | Wermter |
| 2010/0160486 A1 | 6/2010 | Blanton et al. |
| 2010/0234530 A1 | 9/2010 | Hatae et al. |
| 2010/0298515 A1 | 11/2010 | Marchand et al. |
| 2010/0330272 A1 | 12/2010 | Jeng |
| 2011/0015354 A1 | 1/2011 | Marchand et al. |
| 2011/0032621 A1 | 2/2011 | Marchand et al. |
| 2011/0054121 A1 | 3/2011 | Marchand et al. |
| 2011/0060103 A1 | 3/2011 | Marchand et al. |
| 2011/0257310 A1 | 10/2011 | Butz |
| 2012/0100357 A1 | 4/2012 | Michie et al. |
| 2012/0189837 A1 | 7/2012 | Lavallee |
| 2012/0190797 A1 | 7/2012 | Kristiansen et al. |
| 2012/0238677 A1 | 9/2012 | Chiu et al. |
| 2013/0030135 A1 | 1/2013 | Hagadorn et al. |
| 2013/0137829 A1 | 5/2013 | Holtcamp et al. |
| 2013/0225736 A1 | 8/2013 | Jakupca et al. |
| 2013/0274425 A1 | 10/2013 | Holtcamp et al. |
| 2014/0005289 A1 | 1/2014 | Butz |

FOREIGN PATENT DOCUMENTS

| | | | |
|---|---|---|---|
| EP | 2423257 A1 * | 2/2012 | ............ C08L 23/142 |
| GB | 2 386 901 | 10/2003 | |
| JP | 2005-054105 A | 3/2005 | |
| JP | 2011-207020 | 10/2011 | |
| WO | WO-2004/055029 A2 | 7/2004 | |
| WO | WO-2012/000992 | 1/2012 | |
| WO | WO-2013/026864 | 2/2013 | |
| WO | WO-2014/001394 | 1/2014 | |
| WO | WO-2014/099397 | 6/2014 | |

OTHER PUBLICATIONS

Han et al. "Crystallization, Mechanical, and Thermal Properties of Sorbitol Derivatives Nucleated Polypropylene/Calcium Carbonate Composites". Chinese Journal of Polymer Science, vol. 28, No. 4, (2010); pp. 457-466.*
"Ciba IRGAFOS 168". Ciba, Inc., (2004); pp. 1-2.
"Ciba IRGANOX 1076". Ciba, Inc., (2004); pp. 1-2.
"Ciba TINUVIN 326". Ciba, Inc., (2002); pp. 1-2.
Non-Final Office Action in U.S. Appl. No. 15/025015, dated Feb. 8, 2018 (20 pages).
Notification of Reasons for Refusal in JP application No. 2016-517458 dated May 7, 2018 (English translation only). (7 pages).
International Search Report and the Written Opinion of the International Searching Authority for International Application No. PCT/IB2014/002719 dated Apr. 13, 2014, 17 pages.
Final Office Action in U.S. Appl. No. 15/025,015, dated Aug. 27, 2018.
Jang et al. "Crystallization Behavior of Polypropylene with or without Sodium Benzoate as a Nucleating Agent". Journal of Polymer Science: Part B: Polymer Physics, vol. 39, (2001); pp. 1001-1016.
McClintock, M. "Vinyl siding: Three key elements to getting the job right", Chicago Tribune, (2010).
Notice of Allowance in U.S. Appl. No. 15/025,015, dated May 22, 2019 (9 pages).
"ASTM D6864-11," ASTM International, Color and Appearance Retention of Solid Colored Plastic Siding Products, retrieved Feb. 14, 2019, pp. 1-5.
Non-Final Office Action in U.S. Appl. No. 15/025,015, dated Feb. 25, 2019 (14 pages).

* cited by examiner

POLYOLEFIN COMPOSITIONS FOR BUILDING MATERIALS

CROSS-REFERENCE TO RELATED APPLICATIONS

This application is a continuation of U.S. patent application Ser. No. 15/025,015, filed on Mar. 25, 2016, which is a U.S. National Phase application under 35 U.S.C. § 371 of International Application No. PCT/IB2014/002719, filed on Sep. 24, 2014, which in turn claims the benefit of U.S. Provisional Patent Application No. 61/969,498, filed on Mar. 24, 2014, and U.S. Provisional Patent Application No. 61/883,229, filed on Sep. 27, 2013, the entire disclosures of which are incorporated herein by reference for any and all purposes.

Disclosed are fully formulated polyolefin compositions useful for long term outdoor applications. The compositions are useful for building materials such as house siding panels, soffit, profiles, roofing and the like. In particular, the compositions are useful as house siding panels (siding).

Presently, polyvinyl chloride (PVC) siding is commonly employed. PVC siding has drawbacks regarding its environmental impact and overall performance. PVC siding is not widely used in regions with prolonged high temperatures and solar exposure, due to the fact that it will warp, distort and experience color fade under these conditions. PVC siding exposed to high levels of solar exposure will experience excessive color fading in a short period of time, i.e. 5 to 7 years. Further, PVC is not readily recyclable and careful controls during manufacturing must be made to limit exposure due to hazardous vinyl chloride monomer.

It would be advantageous to replace PVC siding with polyolefin siding, where the polyolefin siding meets or exceeds required levels of light stability, processing stability, flame retardancy, and mechanical properties.

For polyolefin siding articles, the current state of the art is injection molding of thick sections. Injection molded thick section polyolefin siding has a thick cross section due to inadequate melt strength of olefin polymer compositions currently available. Processing by injection molding can lead to defects such as flow lines, injection gate defects and "tiger striping" during outdoor weathering. Presently, the industry is seeking extrudable olefin polymer compositions that are able to replace PVC siding with suitable processability, durability, aesthetics and which are light weight.

Conventional injection molded siding panels have a typical thickness range of from 0.10 to 0.125 inches, with widths ranging from 10 to 20 inches and lengths from 30 to 60 inches, depending on the specific designs.

Extruded profile siding dimensions may range from about 30 to about 50 mils thick, preferred are from about 35 to about 45 mils thick. The present compositions allow siding lengths to be extruded as per industry norms today and offered in any linear lengths as produced by the siding conversion operation. Typical siding widths are a minimum of (4) inches to a maximum of (18) inches as is common industry practice today.

This invention relates to a polyolefin based composition having suitable physical and mechanical properties, e.g. sufficiently high melt strength, for use in extruded profiles (e.g. for siding, window profiles, decking, fencing, etc.). The extruded compositions of this invention exhibit improved processability, durability and aesthetics compared to current injection molded polyolefin siding. The extruded siding compositions of this invention provide for easier installation vs. state of the art PVC siding.

The present invention describes a polyolefin composition that allows profile extrusion useful in siding, decking, fencing and window profiles.

Accordingly, disclosed is a polyolefin composition comprising a polyolefin substrate having incorporated therein one or more additives selected from the group consisting of
a) one or more ultraviolet light absorbers,
b) one or more hindered amine light stabilizers and
c) one or more antioxidants,
where the composition exhibits impact strength of >35 in-lb measured according to ASTM D4226, coefficient of linear thermal expansion of <4.5×10E-05 in/in/ft measured according to ASTM D696 and optionally acceptable color uniformity in finished siding parts according to ASTM D6864 and/or acceptable low delta E color for the intended application according to ASTM D2244 and/or a UL-94 rating of V-1 or V-0 and/or a flame spread index of <200 measured according to ASTM E-84.

Advantageously, the polyolefin substrate also has incorporated therein d) one or more colorants. Optionally, the polyolefin substrate also has incorporated therein one or more additives selected from the group consisting of
e) one or more fillers,
f) one or more flame retardants and
g) one or more antimicrobial compounds.

The polyolefin substrate is preferably polyethylene (PE) homopolymers, polyethylene random or block copolymers, polypropylene (PP) homopolymers, polypropylene random or block copolymers, ethylene/propylene copolymers, a mixture of polypropylene and polyethylene or a mixture of different types of polyethylene. More preferably the polyolefin substrate is polypropylene. Polyethylene is preferably linear low density (LLDPE), low density (LDPE), medium density (MDPE) or high density (HDPE). Mixtures mentioned above are for example PP/HDPE, PP/LDPE and LDPE/HDPE. Also included are ternary mixtures such as PP/HDPE/LLDPE. The polyolefin substrates may be formulated with or without crosslinking.

The polyolefin composition contains for instance ≥10 weight percent (wt %) polyolefin, for instance ≥15 wt %, ≥20 wt %, ≥25 wt %, ≥30 wt %, ≥35 wt %, ≥40 wt %, ≥45 wt %, ≥50 wt %, ≥55 wt %, ≥60 wt %, ≥65 wt %, ≥70 wt %, ≥75 wt %, ≥80 wt % or ≥85 wt % polyolefin, based on the weight of the composition.

Polypropylene may be a polypropylene homopolymer, a polypropylene random copolymer, alternating or segmented copolymer or block copolymer containing one or more comonomers selected from the group consisting of ethylene, $C_4$-$C_{30}$-α-olefins, vinylcyclohexane, vinylcyclohexene, $C_4$-$C_{20}$alkandienes, $C_5$-$C_{12}$cycloalkandienes and norbornene derivatives; the total mol amount of propylene and the comonomer(s) being 100%.

Polypropylene copolymer also covers long chain branched polypropylene copolymer. Examples of suitable $C_4$-$C_{30}$ α-olefins are 1-butene, 1-pentene, 1-hexene, 1-heptene, 1-octene, 1-nonene, 1-decene, 1-undecene, 1-dodecene, 1-tetradecene, 1-hexadecene, 1-octadecene, 1-eicosene, 4-methyl-1-pentene, 1-eicosene, 1-docosene, 1-tetracosene, 1-hexacosene, 1-octacosene and 1-triacontene.

Examples of suitable $C_4$-$C_{20}$alkandienes are hexadiene and octadiene.

Examples of suitable $C_5$-$C_{12}$cycloalkandienes are cyclopentadiene, cyclohexadiene and cyclooctadiene.

Examples of suitable norbornene derivatives are 5-ethylidene-2-norbornene (ENB), dicyclopentadiene (DCP) and methylene-domethylene-hexahydronaphthaline (MEN).

A propylene/ethylene copolymer contains for example 50 to 99.9%, preferably 80 to 99.9%, in particular 90 to 99.9%, by weight of propylene.

A propylene copolymer wherein the comonomer is a $C_9$-$C_{20}$ α-olefin such as e.g. 1-nonene, 1-decene, 1-undecene, 1-dodecene, 1-tetradecene, 1-hexadecene, 1-octadecene or 1-eicosene; $C_9$-$C_{20}$alkandiene, $C_9$-$C_{12}$cycloalkandiene or a norbornene derivative such as e.g. 5-ethylidene-2-norbornene (ENB) or methylene-domethylene-hexahydronaphthaline (MEN) contains preferably more than 90 mol %, in particular 90 to 99.9 mol % or 90 to 99 mol %, of propylene.

A propylene copolymer wherein the comonomer is a $C_4$-$C_8$ α-olefin such as e.g. 1-butene, 1-pentene, 1-hexene, 1-heptene, 1-octene or 4-methyl-1-pentene; vinylcyclohexane, vinylcyclohexene, $C_4$-$C_8$alkandiene or $C_5$-$C_8$cycloalkandiene contains preferably more than 80 mol %, in particular 80 to 99.9 mol % or 80 to 99 mol %, of propylene.

Further examples of polypropylene are propylene/isobutylene copolymer, propylene/butadiene copolymer, propylene/cycloolefin copolymer, terpolymers of propylene with ethylene and a diene such as hexadiene, dicyclopentadiene or ethylidene-norbornene; propylene/1-olefin copolymers where the 1-olefin is generated in situ; and propylene/carbon monoxide copolymers.

Allyl or vinyl terminated oligomers of ethylene or propylene may be employed as branches in polymerization reactions with propylene to prepare branched polypropylenes of high melt strength as disclosed in U.S. Pat. No. 8,399,725 and U.S. Pub. Nos. 2013/0274425, 2013/0274425, 2013/0030135 and 2013/0137829.

Polypropylene's linear chain structure results in the polymer exhibiting low melt strength and a lack of strain hardening. This can result in processing issues where polymer extensibility is needed. In contrast, polypropylenes exhibiting high melt strength are valued in industrial converting operations such as blow molding, thermoforming or foaming of polypropylene sheet. Polypropylene based compositions of this invention exhibit acceptable melt strength, extensibility and strain hardening to produce extruded profiles and siding.

Advantageously, the polyolefin substrate comprises a polypropylene homopolymer or copolymer of a suitably high melt strength, optionally blended with a polyethylene homopolymer or copolymer. The blend may further contain a third polymer suitable to facilitate compatibility, partial miscibility or miscibility of the different polyolefins. Such materials are referred to as interfacial tension reducing agents or compatibilizers.

Suitable compatibilizers are typically polymers that contain two or more different segments each of which are miscible or compatible with the individual components to be blended. A compatibilized polymer blend need not be fully miscible nor satisfy all thermodynamics of mixing (e.g. resulting in a single phase, or single glass transition temperature), yet such a blend of different polymer structures will exhibit improved resultant properties over the individual components.

One type of compatibilizer for blending of PP and PE are segmented "olefin block copolymers" or "OBC", containing propylene, ethylene and optionally additional alpha-olefin sequences such as those produced by Dow Global Technologies and taught in U.S. Pub. Nos. 2011/032621, 2011/060103, 2010/298515, 2011/054121 and 2011/015354. Included are Dow products under the tradename INFUSE and ExxonMobil VISTAMAXX products. These block copolymers are produced with an overall molecular weight distribution and segment molecular weight distribution such that Mw/Mn>1.4, with two or more ethylene and alpha-olefin blocks per chain and low molecular weights (Mw<200,000 g/mol). These alternating block copolymers are characterized by crystallizable, rigid 'hard block' segments and an amorphous, elastomeric 'soft block' content. The hard block content ranges from 12-84 wt. % in these OBCs and total 1-octene content (i.e. conferring long chain branches) range from 3 to 14 wt. %. OBCs may compatibilize a blend of PP and HDPE where an increase in elongation to break and tensile strength can be achieved compared to a non compatibilized blend of HDPE and PP.

The polypropylene homopolymer or copolymer or blend with polyethylene optionally compatibilized may be chemically crosslinked to introduce long chain branches (LCB) off of the polypropylene main chain resulting in higher melt strength and extensibility and lower melt flow than is generally commercially available.

Chemical crosslinking of a polypropylene homopolymer or copolymer with another polypropylene or with a polyethylene homo- or copolymer and/or with a compatibilizing material is advantageous. Such crosslinking processes may impart a valuable increase in polyolefin blend melt strength, melt extensibility, mechanical and tensile strength useful in the present extrusion processes. Such crosslinking processes onto polypropylene may produce long chain branching (LCB) on the polypropylene main chain and create an enhanced amount of polymer chain entanglements that results in higher polymer melt strength.

Crosslinking may be accomplished with agents such as organic peroxides or by treatment with a radiation source such as ultraviolet light, electron beam or gamma irradiation. Radiation may be accomplished in a reduced oxygen or zero oxygen environment. For instance, a polypropylene of high melt strength and melt extensibility is obtainable by the blending of a linear polypropylene with a branched polypropylene (b-PP) in an extruder. The b-PP is prepared by reacting a peroxide with an unmodified polypropylene and optionally a bifunctional unsaturated monomer capable of grafting onto the unmodified polypropylene to produce long chain branches, WO2014/001394. In another example, U.S. Pat. Nos. 5,508,318, 5,731,362, 5,591,785, 5,554,668 and 4,916,198 disclose compounding of blends of irradiated and non-irradiated olefin polymer materials suitable for extrusion.

In contrast to downstream extrusion or polymer chemical modification to form crosslinks or long chain branches to improve melt strength, the formation of long chain branching on polyolefins may be conducted upstream during polymer manufacture. In an example, polyethylene may be modified in a polymerization unit via exposure to a low level of oxygen, called 'oxygen tailoring', resulting in formation of long chain branching and enhanced melt strength, as taught in U.S. Pub. No. 2012/100357.

The polyolefin substrate may contain an additive that promotes a higher level of crystallinity upon melt converting the polymer into shaped articles. Such additives are referred to as nucleating agents.

The degree of crystallinity in polypropylene is an important parameter influencing properties such as modulus, yield stress, strength, etc. Within the scope of this invention is the use of nucleating agents which influence the favorable formation of a degree of crystallinity that improves polymer melt strength during extrusion processing and improvement of mechanical properties in the end use article. Suitable nucleating agents are for instance sodium benzoate, 2,2'- methylene-bis(4,6-di-tert-butylphenyl)phosphate, zinc glycerolate, calcium salt of 1,2-dicarboxylic acid cyclohexane, aromatic trisamide compounds, cis-endo-bicyclo[2.2.1]heptane-2,3-dicarboxylic acid disodium salt, aluminum hydroxy-bis[4-(tert-butyl)benzoate] and sorbitols such as 1,3:2,4-bis(3,4-dimethylbenzylidene)sorbitol 1,3:2,4-bis(4-methylbenzylidene)sorbitol or 1,3:2,4-bis(3,4-dimethylbenzylidene)sorbitol, as taught in U.S. Pat. Nos. 7,423,088, 7,790,793 and 8,183,312 and U.S. Pub. No. 2012/0190797.

Nucleating agents may be present for instance from about 10 parts per million (ppm) to about 10,000 ppm, from about 12 ppm to about 1,000 ppm, from about 12 ppm to about 500 ppm or from about 12 ppm to about 300 ppm or about 400 ppm, by weight based on the weight of the polyolefin substrate.

The polyolefin substrate advantageously contains an inorganic (mineral) filler to balance melt strength and extensibility or drawability to allow extrusion production of profiles and siding. Fillers are described in more detail below.

The polyolefin substrate comprising a polypropylene homopolymer or copolymer optionally blended with a polyethylene homopolymer or copolymer, where the blend may further contain a compatibilizer exhibits a suitable high melt strength. Present melt strength for the polyolefin substrate is at least 4 centiNewtons (cN) at 210° C. For instance, the melt strength of the polyolefin substrate is about 4, about 5, about 6, about 7, about 8, about 9, about 10, about 11, about 12, about 13, about 14, about 15, about 16, about 17, about 18, about 19, about 20, about 21, about 22, about 23 about 24 or about 25 centiNewtons at 210° C. For instance the melt strength is ≥5, ≥7, ≥9, ≥11, ≥13, ≥15, ≥17, ≥19, ≥21 or ≥23 centiNewtons at 210° C.

Polyolefins can be prepared by the following methods:
a) radical polymerization (normally under high pressure and at elevated temperature) or
b) catalytic polymerization using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerization medium. The catalysts can be used by themselves in the polymerization or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler(-Natta), TNZ (DuPont), metallocene or single site catalysts (SSC).

Polypropylenes are produced by processes as described in literature including Kissin, Y. V. (2008), Alkene Polymerization Reactions with Transition Metal Catalysts, Elsevier, pp. 207—. ISBN 978-0-444-53215-2; Hoff, Ray and Mathers, Robert T. (2010), Handbook of Transition Metal Polymerization Catalysts, John Wiley & Sons, pp. 158— ISBN 978-0-470-13798-7; Moore, E. P. (1996) Polypropylene Handbook, Polymerization, Characterization, Properties, Processing, Applications, Hanser Publishers: New York, ISBN 1569902089; Benedikt, G. M. and Goodall, B. L. (eds.) (1998) Metallocene Catalyzed Polymers, ChemTech Publishing: Toronto, ISBN 978-1-884207-59-4; Malpass, D. B., Introduction to Industrial Polyethylene, Properties, Catalysts, Processes, Wiley Publ., (2010); and Malpass, D. B., Introduction to Industrial Polypropylene, Properties, Catalysts, Processes, Wiley Publ., (2012).

The ultraviolet (UV) light absorbers are preferably selected from the group consisting of hydroxyphenylbenzotriazole, tris-aryl-s-triazine, hydroxybenzoate, 2-hydroxybenzophenone and cyanoacrylate ultraviolet light absorbers (UVAs).

The hydroxyphenylbenzotriazole UVAs are for instance disclosed in U.S. Pat. Nos. 3,004,896; 3,055,896; 3,072,585; 3,074,910; 3,189,615; 3,218,332; 3,230,194; 4,127,586; 4,226,763; 4,275,004; 4,278,589; 4,315,848; 4,347,180; 4,383,863; 4,675,352; 4,681,905, 4,853,471; 5,268,450; 5,278,314; 5,280,124; 5,319,091; 5,410,071; 5,436,349; 5,516,914; 5,554,760; 5,563,242; 5,574,166; 5,607,987, 5,977,219 and 6,166,218, such as 2-(2-hydroxy-5-methylphenyl)-2H-benzotriazole, 2-(3,5-di-t-butyl-2-hydroxyphenyl)-2H-benzotriazole, 2-(2-hydroxy-5-t-butylphenyl)-2H-benzotriazole, 2-(2-hydroxy-5-t-octylphenyl)-2H-benzotriazole, 5-chloro-2-(3,5-di-t-butyl-2-hydroxyphenyl)-2H-benzotriazole, 5-chloro-2-(3-t-butyl-2-hydroxy-5-methylphenyl)-2H-benzotriazole, 2-(3-sec-butyl-5-t-butyl-2-hydroxyphenyl)-2H-benzotriazole, 2-(2-hydroxy-4-octyloxyphenyl)-2H-benzotriazole, 2-(3,5-di-t-amyl-2-hydroxyphenyl)-2H-benzotriazole, 2-(3,5-bis-α-cumyl-2-hydroxyphenyl)-2H-benzotriazole, 2-(3-t-butyl-2-hydroxy-5-(2-(ω-hydroxy-octa-(ethyleneoxy)carbonyl-ethyl)-phenyl)-2H-benzotriazole, 2-(3-dodecyl-2-hydroxy-5-methylphenyl)-2H-benzotriazole, 2-(3-t-butyl-2-hydroxy-5-(2-octyloxycarbonyl)ethylphenyl)-2H-benzotriazole, dodecylated 2-(2-hydroxy-5-methylphenyl)-2H-benzotriazole, 2-(3-t-butyl-2-hydroxy-5-(2-octyloxycarbonylethyl)phenyl)-5-chloro-2H-benzotriazole, 2-(3-tert-butyl-5-(2-(2-ethylhexyloxy)-carbonylethyl)-2-hydroxyphenyl)-5-chloro-2H-benzotriazole, 2-(3-t-butyl-2-hydroxy-5-(2-methoxycarbonylethyl)phenyl)-5-chloro-2H-benzotriazole, 2-(3-t-butyl-2-hydroxy-5-(2-methoxycarbonylethyl)phenyl)-2H-benzotriazole, 2-(3-t-butyl-5-(2-(2-ethylhexyloxy)carbonylethyl)-2-hydroxyphenyl)-2H-benzotriazole, 2-(3-t-butyl-2-hydroxy-5-(2-isooctyloxycarbonylethyl)phenyl-2H-benzotriazole, 2,2'-methylene-bis(4-t-octyl-(6-2H-benzotriazol-2-yl)phenol), 2-(2-hydroxy-3-α-cumyl-5-t-octylphenyl)-2H-benzotriazole, 2-(2-hydroxy-3-t-octyl-5-α-cumylphenyl)-2H-benzotriazole, 5-fluoro-2-(2-hydroxy-3,5-di-α-cumylphenyl)-2H-benzotriazole, 5-chloro-2-(2-hydroxy-3,5-di-α-cumylphenyl)-2H-benzotriazole, 5-chloro-2-(2-hydroxy-3-α-cumyl-5-t-octylphenyl)-2H-benzotriazole, 2-(3-t-butyl-2-hydroxy-5-(2-isooctyloxycarbonylethyl)phenyl)-5-chloro-2H-benzotriazole, 5-trifluoromethyl-2-(2-hydroxy-3-α-cumyl-5-t-octylphenyl)-2H-benzotriazole, 5-trifluoromethyl-2-(2-hydroxy-5-t-octylphenyl)-2H-benzotriazole, 5-trifluoromethyl-2-(2-hydroxy-3,5-di-t-octyl-phenyl)-2H-benzotriazole, methyl 3-(5-trifluoromethyl-2H-benzotriazol-2-yl)-5-t-butyl-4-hydroxyhydrocinnamate, 5-butyl sulfonyl-2-(2-hydroxy-3-α-cumyl-5-t-octylphenyl)-2H-benzotriazole, 5-trifluoromethyl-2-(2-hydroxy-3-α-cumyl-5-t-butylphenyl)-2H-benzotriazole, 5-trifluoromethyl-2-(2-hydroxy-3,5-di-t-butylphenyl)-2H-benzotriazole, 5-trifluoromethyl-2-(2-hydroxy-3,5-di-α-cumylphenyl)-2H-benzotriazole, 5-butyl sulfonyl-2-(2-hydroxy-3,5-di-t-butyl-phenyl)-2H-benzotriazole and 5-phenyl sulfonyl-2-(2-hydroxy-3,5-di-t-butyl-phenyl)-2H-benzotriazole.

The tris-aryl-s-triazine UVAs are for instance those disclosed in U.S. Pat. Nos. 3,843,371; 4,619,956; 4,740,542; 5,096,489; 5,106,891; 5,298,067; 5,300,414; 5,354,794; 5,461,151; 5,476,937; 5,489,503; 5,543,518; 5,556,973;

5,597,854; 5,681,955; 5,726,309; 5,736,597; 5,942,626; 5,959,008; 5,998,116; 6,013,704; 6,060,543; 6,242,598 and 6,255,483, for example 4,6-bis-(2,4-dimethylphenyl)-2-(2-hydroxy-4-octyloxyphenyl)-s-triazine, CYASORB 1164, 4,6-bis-(2,4-dimethylphenyl)-2-(2,4-dihydroxyphenyl)-s-triazine, 2,4-bis(2,4-dihydroxyphenyl)-6-(4-chlorophenyl)-s-triazine, 2,4-bis[2-hydroxy-4-(2-hydroxy-ethoxy)phenyl]-6-(4-chlorophenyl)-s-triazine, 2,4-bis[2-hydroxy-4-(2-hydroxy-4-(2-hydroxy-ethoxy)phenyl]-6-(2,4-dimethylphenyl)-s-triazine, 2,4-bis[2-hydroxy-4-(2-hydroxyethoxy)-phenyl]-6-(4-bromophenyl)-s-triazine, 2,4-bis[2-hydroxy-4-(2-acetoxyethoxy)phenyl]-6-(4-chlorophenyl)-s-triazine, 2,4-bis(2,4-dihydroxyphenyl)-6-(2,4-dimethylphenyl)-s-triazine, 2,4-bis(4-biphenylyl)-6-(2-hydroxy-4-octyloxycarbonylethylideneoxyphenyl)-s-triazine, 2-phenyl-4-[2-hydroxy-4-(3-sec-butyloxy-2-hydroxypropyloxy)phenyl]-6-[2-hydroxy-4-(3-sec-amyloxy-2-hydroxypropyloxy)phenyl]-s-triazine, 2,4-bis(2,4-dimethylphenyl)-6-[2-hydroxy-4-(3-benzyloxy-2-hydroxypropyloxy)phenyl]-s-triazine, 2,4-bis(2-hydroxy-4-n-butyloxyphenyl)-6-(2,4-di-n-butyloxyphenyl)-s-triazine, 2,4-bis(2,4-dimethylphenyl)-6-[2-hydroxy-4-(3-nonyloxy*-2-hydroxypropyloxy)-5-α-cumylphenyl]-s-triazine (* denotes a mixture of octyloxy, nonyloxy and decyloxy groups), methylenebis-{2,4-bis(2,4-dimethylphenyl)-6-[2-hydroxy-4-(3-butyloxy-2-hydroxypropoxy)phenyl]-s-triazine}, methylene bridged dimer mixture bridged in the 3:5', 5:5' and 3:3' positions in a 5:4:1 ratio, 2,4,6-tris(2-hydroxy-4-isooctyloxycarbonylisopropylidene-oxyphenyl)-s-triazine, 2,4-bis(2,4-dimethylphenyl)-6-(2-hydroxy-4-hexyloxy-5-α-cumylphenyl)-s-triazine, 2-(2,4,6-trimethylphenyl)-4,6-bis[2-hydroxy-4-(3-butyloxy-2-hydroxypropyloxy)-phenyl]-s-triazine, 2,4,6-tris[2-hydroxy-4-(3-sec-butyloxy-2-hydroxypropyloxy)phenyl]-s-triazine, mixture of 4,6-bis-(2,4-dimethylphenyl)-2-(2-hydroxy-4-(3-dodecyloxy-2-hydroxypropoxy)-phenyl)-s-triazine and 4,6-bis-(2,4-dimethylphenyl)-2-(2-hydroxy-4-(3-tridecyloxy-2-hydroxypropoxy)-phenyl)-s-triazine, TINUVIN 400, 4,6-bis-(2,4-dimethyl-phenyl)-2-(2-hydroxy-4-(3-(2-ethylhexyloxy)-2-hydroxypropoxy)-phenyl)-s-triazine and 4,6-diphenyl-2-(4-hexyloxy-2-hydroxyphenyl)-s-triazine.

Hydroxybenzoate UV absorbers are for instance esters of substituted and unsubstituted benzoic acids, as for example 4-tert-butylphenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2-Hydroxybenzophenone UV absorbers are for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

Cyanoacrylate UV absorbers are for instance pentaerythritol tetrakis(2-cyano-3,3-diphenylacrylate), α-cyano-β,β-diphenylacrylic acid ethyl ester or isooctyl ester and α-cyano-β-methyl-p-methoxy-cinnamic acid methyl ester or butyl ester.

The UVA is in particular 5-chloro-2-(3-t-butyl-2-hydroxy-5-methylphenyl)-2H-benzotriazole, 2-(3,5-bis-α-cumyl-2-hydroxyphenyl)-2H-benzotriazole, 4,6-diphenyl-2-(4-hexyloxy-2-hydroxyphenyl)-s-triazine, 4,6-bis-(2,4-dimethylphenyl)-2-(2-hydroxy-4-octyloxyphenyl)-s-triazine, hexadecyl-3,5-di-tert-butyl-4-hydroxybenzoate, or 4-octyloxy-2-hydroxybenzophenone.

Many of the UVAs are commercial, for example TINUVIN 326, TINUVIN 234, TINUVIN 1577, TINUVIN 1600, CYASORB UV 1164, CYASORB THT, CYASORB UV 2908, CHIMASSORB 81, UVINUL 3030, etc.

The ultraviolet light absorbers are present, in total, from about 0.01 to about 2.5 weight percent, preferably from about 0.10 to about 1.5 weight percent, based on the weight of the polyolefin substrate. More preferably from about 0.10 to about 0.95 weight percent. For instance, at levels of about 0.20, about 0.25, about 0.30, about 0.35, about 0.40, about 0.45, about 0.50, about 0.55, about 0.60, about 0.65, about 0.70, about 0.75, about 0.80, about 0.85 or about 0.90 weight percent, based on the weight of the polyolefin substrate and levels in between.

The hindered amine light stabilizers (HALS) are disclosed for example in U.S. application Ser. No. 14/379,842, published as WO2013/136285 and U.S. Pat. Nos. 5,004,770, 5,204,473, 5,096,950, 5,300,544, 5,112,890, 5,124,378, 5,145,893, 5,216,156, 5,844,026, 5,980,783, 6,046,304, 6,117,995, 6,271,377, 6,297,299, 6,392,041, 6,376,584 and 6,472,456.

Suitable hindered amine light stabilizers are for example (1) 1-cyclohexyloxy-2,2,6,6-tetramethyl-4-octadecylaminopiperidine; (2) bis(2,2,6,6-tetramethylpiperidin-4-yl) sebacate; (3) bis(1-acetoxy-2,2,6,6-tetramethylpiperidin-4-yl) sebacate; (4) bis(1,2,2,6,6-pentamethylpiperidin-4-yl) sebacate; (5) bis(1-cyclohexyloxy-2,2,6,6-tetramethylpiperidin-4-yl) sebacate; (6) bis(1-octyloxy-2,2,6,6-tetramethylpiperidin-4-yl) sebacate; (7) bis(1-acyl-2,2,6,6-tetramethylpiperidin-4-yl) sebacate; (8) bis(1,2,2,6,6-pentamethyl-4-piperidyl) n-butyl-3,5-di-tert-butyl-4-hydroxybenzylmalonate (9) 2,4-bis[(1-cyclohexyloxy-2,2,6,6-tetramethylpiperidin-4-yl)butylamino]-6-(2-hydroxyethylamino-s-triazine; (10) bis(1-cyclohexyloxy-2,2,6,6-tetra-methylpiperidin-4-yl) adipate; (11) 2,4-bis[(1-cyclohexyloxy-2,2,6,6-piperidin-4-yl)butylamino]-6-chloro-s-triazine; (12) 1-(2-hydroxy-2-methylpropoxy)-4-hydroxy-2,2,6,6-tetramethyl-piperidine; (13) 1-(2-hydroxy-2-methylpropoxy)-4-oxo-2,2,6,6-tetramethylpiperidine; (14) 1-(2-hydroxy-2-methylpropoxy)-4-octadecanoyloxy-2,2,6,6-tetramethylpiperidine; (15) bis(1-(2-hydroxy-2-methylpropoxy)-2,2,6,6-tetramethylpiperidin-4-yl) sebacate; (16) bis(1-(2-hydroxy-2-methylpropoxy)-2,2,6,6-tetramethylpiperidin-4-yl) adipate; (17) 2,4-bis{N-[1-(2-hydroxy-2-methylpropoxy)-2,2,6,6-tetramethylpiperidin-4-yl]-N-butylamino}-6-(2-hydroxyethylamino)-s-triazine; (18) 4-benzoyl-2,2,6,6-tetramethylpiperidine; (19) di-(1,2,2,6,6-pentamethylpiperidin-4-yl) p-methoxybenzylidenemalonate; (20) 2,2,6,6-tetramethylpiperidin-4-yl octadecanoate; (21) bis(1-octyloxy-2,2,6,6-tetramethylpiperidyl) succinate; (22) 1,2,2,6,6-pentamethyl-4-aminopiperidine; (23) 2-undecyl-7,7,9,9-tetramethyl-1-oxa-3,8-diaza-4-oxospiro[4,5]decane; (24) tris(2,2,6,6-tetramethyl-4-piperidyl) nitrilotriacetate; (25) tris-(2-hydroxy-3-(amino-(2,2,6,6-tetramethylpiperidin-4-yl)propyl) nitrilotriacetate; (26) tetrakis(2,2,6,6-tetramethyl-4-piperidyl)-1,2,3,4-butane-tetracarboxylate; (27) tetrakis-(1,2,2,6,6-pentamethyl-4-piperidyl)-1,2,3,4-butane-tetracarboxylate; (28) 1,1'-(1,2-ethanediyl)-bis-(3,3,5,5-tetramethylpiperazinone); (29) 3-n-octyl-7,7,9,9-tetramethyl-1,3,8-triazaspiro[4.5]decan-2,4-dione; (30) 8-acetyl-3-dodecyl-7,7,9,9-tetramethyl-1,3,8-triazaspiro[4.5]decane-2,4-dione; (31) 3-dodecyl-1-(2,2,6,6-tetramethyl-4-piperidyl)pyrrolidin-2,5-dione; (32) 3-dodecyl-1-(1,2,2,6,6-pentamethyl-4-piperidyl)pyrrolidine-2,5-dione; (33) N,N'-bis-formyl-N,N'-bis(2,2,6,6-tetramethyl-4-piperidyl) hexamethylenediamine; (33a) bis(1-undecanyloxy-2,2,6,6-tetramethylpiperidin-4-yl)carbonate; (34) reaction product of 2,4-bis[(1-cyclohexyloxy-2,2,6,6-piperidin-4-yl)-butylamino]-6-chloro-s-triazine with N,N'-bis(3-aminopropyl)ethylenediamine); (35) condensate of 1-(2-hydroxyethyl)-2,2,6,6-tetramethyl-4-hydroxypiperidine and succinic acid; (36) condensate of N,N'-bis(2,2,6,6-tetramethyl-4-piperidyl)-hexamethylenediamine and 4-tert-octylamino-2,6-dichloro-1,3,5-triazine; (37) condensate of N,N'-bis(2,2,6,6-tetramethyl-4-piperidyl)-hexamethylenediamine and 4-cyclohexylamino-2,6-dichloro-1,3,5-triazine; (38) condensate of N,N'-bis-(2,2,6,6-tetramethyl-4-piperidyl)hexamethylenediamine and 4-morpholino-2,6-dichloro-1,3,5-triazine; (39) condensate of N,N'-bis-(1,2,2,6,6-pentamethyl-4-piperidyl)-hexamethylenediamine and 4-morpholino-2,6-dichloro-1,3,5-triazine; (40) condensate of 2-chloro-4,6-bis(4-n-butylamino-2,2,6,6-tetramethylpiperidyl)-1,3,5-triazine and 1,2-bis(3-amino-propylamino)ethane; (41) condensate of 2-chloro-4,6-di-(4-n-butylamino-1,2,2,6,6-pentamethylpiperidyl)-1,3,5-triazine and 1,2-bis-(3-aminopropylamino)ethane; (42) a reaction product of 7,7,9,9-tetramethyl-2-cycloundecyl-1-oxa-3,8-diaza-4-oxospiro-[4,5]decane and epichlorohydrin; (43) poly[methyl-(3-oxy-(2,2,6,6-tetramethylpiperidin-4-yl)propyl)]siloxane, CAS #182635-99-0; (44) reaction product of maleic acid anhydride-$C_{18}$-$C_{22}$-α-olefin-copolymer with 2,2,6,6-tetramethyl-4-aminopiperidine; (45) oligomeric condensate of 4,4'-hexamethylene-bis(amino-2,2,6,6-tetramethylpiperidine) and 2,4-dichloro-6-[(2,2,6,6-tetramethylpiperidin-4-yl)butylamino]-s-triazine end-capped with 2-chloro-4,6-bis(dibutylamino)-s-triazine; (46) oligomeric condensate of 4,4'-hexamethylenebis(amino-1,2,2,6,6-pentamethylpiperidine) and 2,4-dichloro-6-[(1,2,2,6,6-pentamethylpiperidin-4-yl)butylamino]-s-triazine end-capped with 2-chloro-4,6-bis(dibutylamino)-s-triazine; (47) oligomeric condensate of 4,4'-hexamethylene-bis(amino-1-propoxy-2,2,6,6-tetramethylpiperidine) and 2,4-dichloro-6-[(1-propoxy-2,2,6,6-tetramethylpiperidin-4-yl)butylamino]-s-triazine end-capped with 2-chloro-4,6-bis(dibutyl-amino)-s-triazine; (48) oligomeric condensate of 4,4'-hexamethylenebis(amino-1-acyloxy-2,2,6,6-tetramethylpiperidine) and 2,4-dichloro-6-[(1-acyloxy-2,2,6,6-tetramethylpiperidin-4-yl)butylamino]-s-triazine end-capped with 2-chloro-4,6-bis(dibutylamino)-s-triazine and (49) product obtained by reacting (a) with (b) where (a) is product obtained by reacting 1,2-bis(3-aminopropylamino)ethane with cyanuric chloride and (b) is (2,2,6,6-tetramethylpiperidin-4-yl)butylamine. Also included are the sterically hindered N—H, N-methyl, N-methoxy, N-hydroxy, N-propoxy, N-octyloxy, N-cyclohexyloxy, N-acyloxy and N-(2-hydroxy-2-methylpropoxy) analogues of any of the above mentioned compounds. For example, replacing an N—H hindered amine with an N-methyl hindered amine would be employing the N-methyl analogue in place of the N—H. For illustrative purposes, some of the structures for the above-named compounds are shown below.

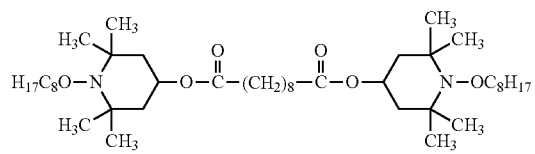

(6)

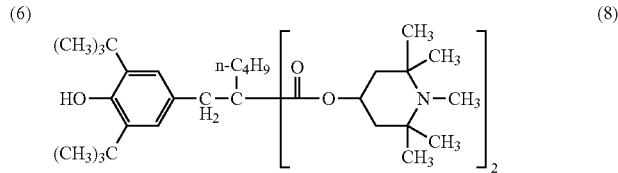

(8)

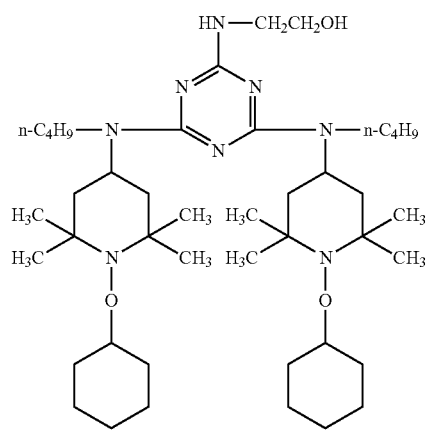

(9)

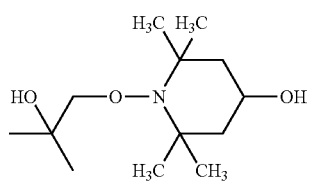

(12)

-continued
(19)
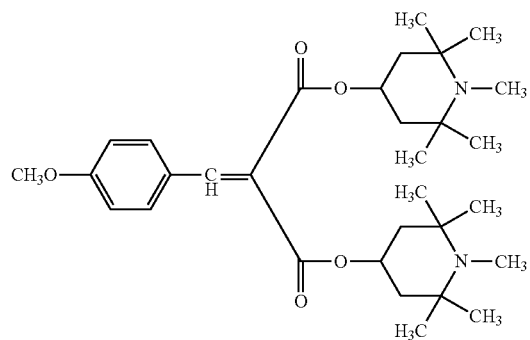
(23)
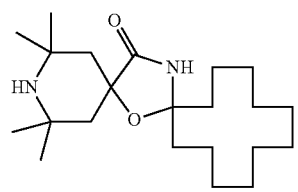
(25)
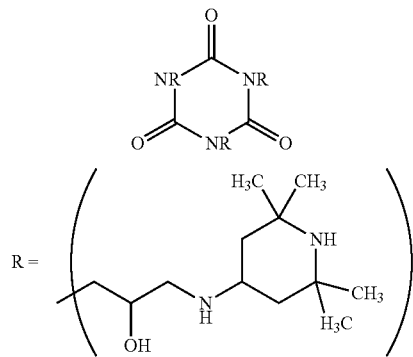
(26)
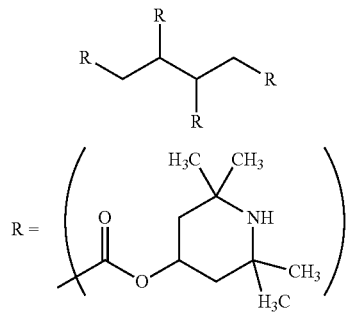
(28)
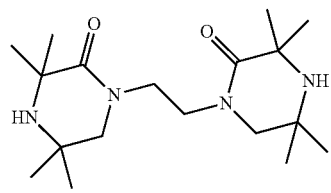
(29)
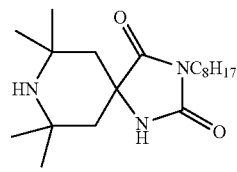
(31)
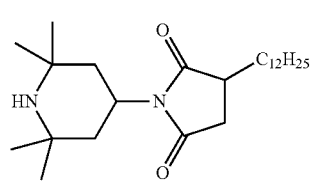
(33)
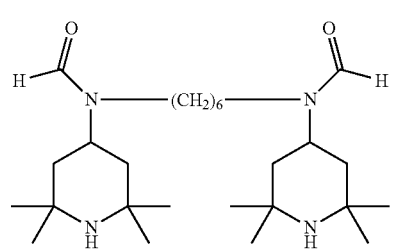

-continued
(34)
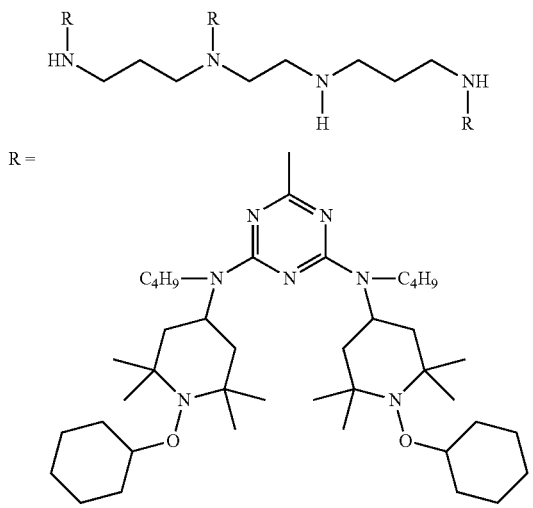
(35)
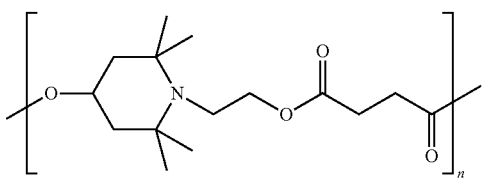
(36)
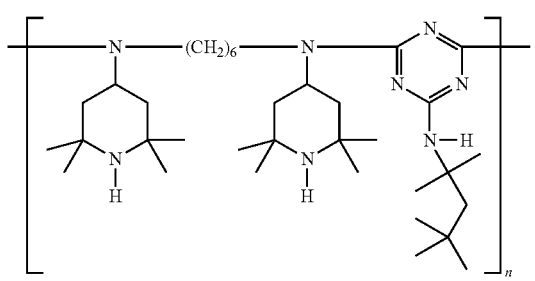
(38)
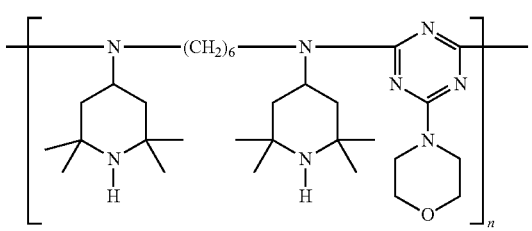
(41)
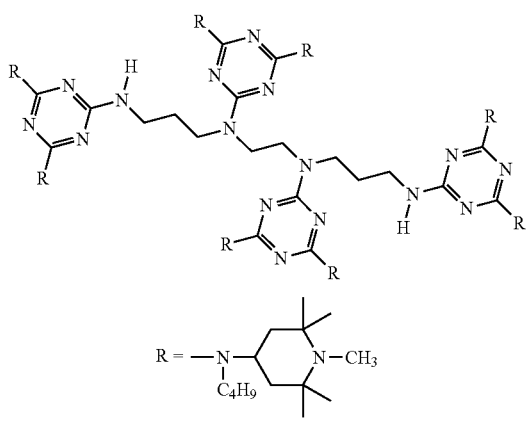
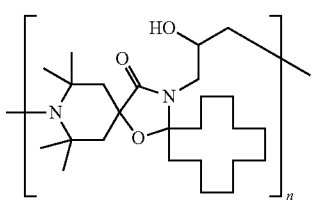
(42)
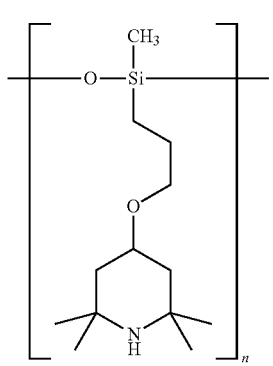
(43)
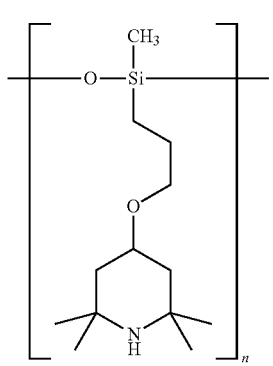
(44)
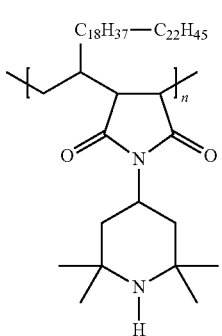

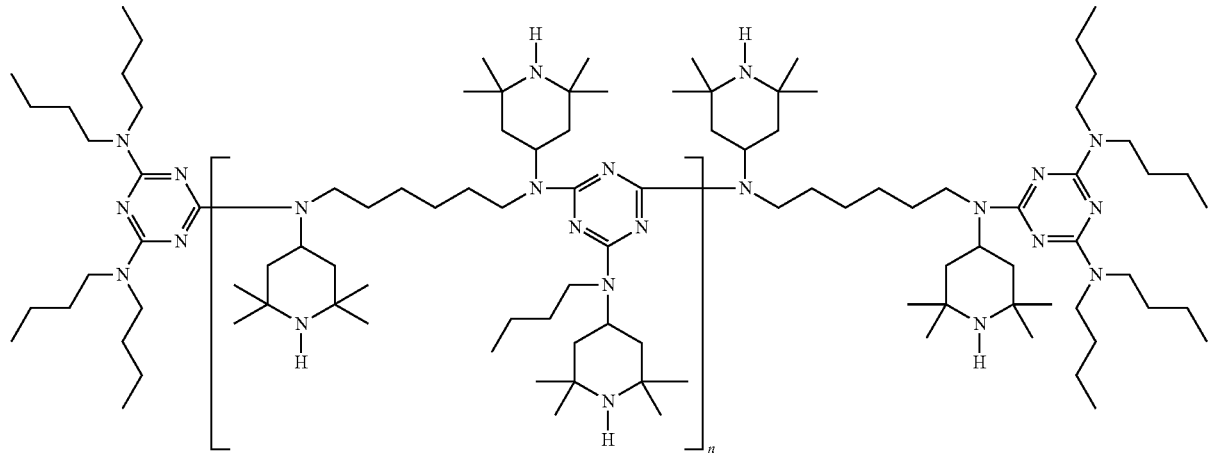

(45)

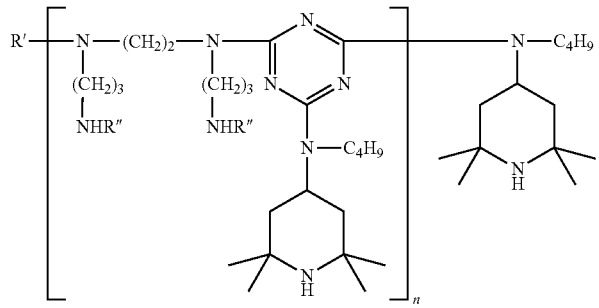

(49)

where R' = R" or H
n = 2 or 3 and where R" =

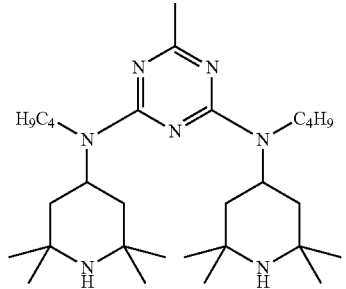

Preferably, the hindered amine light stabilizers are selected from the group consisting of bis(2,2,6,6-tetramethylpiperidin-4-yl) sebacate; 2,2,6,6-tetramethylpiperidin-4-yl octadecanoate; 1-(2-hydroxy-2-methylpropoxy)-4-octadecanoyloxy-2,2,6,6-tetramethyl-piperidine; N,N'-bis-formyl-N,N'-bis(2,2,6,6-tetramethyl-4-piperidyl)hexamethylenediamine; a condensate of N,N'-bis(2,2,6,6-tetramethyl-4-piperidyl)-hexamethylenediamine and 4-tert-octylamino-2,6-dichloro-1,3,5-triazine; a condensate of N,N'-bis-(2,2,6,6-tetramethyl-4-piperidyl)hexamethylenediamine and 4-morpholino-2,6-dichloro-1,3,5-triazine; a condensate of N,N'-bis-(1,2,2,6,6-pentamethyl-4-piperidyl)hexamethylenediamine and 4-morpholino-2,6-dichloro-1,3,5-triazine; a reaction product of maleic acid anhydride-$C_{18}$-$C_{22}$-α-olefin-copolymer with 2,2,6,6-tetramethyl-4-aminopiperidine; an oligomeric compound condensate of 4,4'-hexa-methylenebis(amino-2,2,6,6-tetramethylpiperidine) and 2,4-dichloro-6-[(2,2,6,6-tetramethyl-piperidin-4-yl)butylamino]-s-triazine end-capped with 2-chloro-4,6-bis(dibutylamino)-s-triazine; an oligomeric compound condensate of 4,4'-hexamethylenebis(amino-1-propoxy-2,2,6,6-tetra-methylpiperidine) and 2,4-dichloro-6-[(1-propoxy-2,2,6,6-tetramethylpiperidin-4-yl)butyl-amino]-s-triazine end-capped with 2-chloro-4,6-bis(dibutylamino)-s-triazine; and binary or ternary combinations thereof.

Certain binary combinations of hindered amine light stabilizers are advantageous. Preferred hindered amine light stabilizers are binary combinations of bis(2,2,6,6-tetramethylpiperidin-4-yl) sebacate and a condensate of N,N'-bis(2,2,6,6-tetramethyl-4-piperidyl)-hexamethylenediamine and 4-tert-octylamino-2,6-dichloro-1,3,5-triazine (BIN1); bis(2,2,6,6-tetramethylpiperidin-4-yl) sebacate and oligomeric compound condensate of 4,4'-hexamethylenebis(amino-2,2,6,6-tetramethylpiperidine) and 2,4-dichloro-6-[(2,2,6,6-tetra-methylpiperidin-4-yl)butylamino]-s-triazine end-capped with 2-chloro-4,6-bis(dibutylamino)-s-triazine (BIN2); 2,2,6,6-tetramethylpiperidin-4-yl octadecanoate and oligomeric condensate of 4,4'-hexamethylenebis(amino- 2,2,6,6-tetramethylpiperidine) and 2,4-dichloro-6-[(2,2,6,6-tetra-methypiperidin-4-yl)butyamino]-s-triazine end-capped with 2-chloro-4,6-bis(dibutylamino)-s-triazine (BIN3); or bis(2,2,6,6-tetramethylpiperidin-4-yl) sebacate and 2,2,6,6-tetramethylpiperidin-4-yl octadecanoate (BIN4). Also preferred hindered amine light stabilizers are ternary combinations of bis(2,2,6,6-tetramethylpiperidin-4-yl) sebacate; 1-(2-hydroxy-2-methylpropoxy)-4-octadecanoyloxy-2,2,6, 6-tetramethylpiperidine and oligomeric condensate of 4,4'-hexamethylenebis(amino-2,2,6,6-tetramethylpiperidine) and 2,4-dichloro-6-[(2,2,6,6-tetra-methyliperidin-4-yl)butylamino]-s-triazine end-capped with 2-chloro-4,6-bis(dibutylamino)-s-triazine (TER1); 1-(2-hydroxy-2-methyl-propoxy)-4-octadecanoyloxy-2,2,6,6-tetramethyl-piperidine, 2,2,6,6-tetramethylpiperidin-4-yl octadecanoate and oligomeric condensate of 4,4'-hexamethylenebis(amino-2,2,6,6-tetramethylpiperidine) and 2,4-dichloro-6-[(2,2,6,6-tetra-methylpiperidin-4-yl)butylamino]-s-triazine end-capped with 2-chloro-4,6-bis(dibutylamino)-s-triazine (TER2); or bis(2,2,6,6-tetramethylpiperidin-4-yl) sebacate, 1-(2-hydroxy-2-methyl-propoxy)-4-octadecanoyloxy-2,2,6, 6-tetramethylpiperidine and condensate of N,N'-bis(2,2,6,6-tetramethyl-4-piperidyl)-hexamethylenediamine and 4-tert-octylamino-2,6-dichloro-1,3,5-triazine (TER3). HALS condensate of N,N'-bis-(2,2,6,6-tetramethyl-4-piperidyl)-hexamethylenediamine and 4-morpholino-2,6-dichloro-1,3, 5-triazine or condensate of N,N'-bis-(1,2,2,6,6-pentamethyl-4-piperidyl)hexamethylenediamine and 4-morpholino-2,6-dichloro-1,3,5-triazine may be substituted for HALS condensate of N,N'-bis(2,2,6,6-tetramethyl-4-piperidyl)-hexamethylenediamine and 4-tert-octylamino-2,6-dichloro-1,3,5-triazine in the binary and ternary combinations. Many of the present hindered amine stabilizers are commercial, for example TINUVIN 770, CHIMASSORB 944, CHIMASSORB 2020, CYASORB UV 3853, CYASORB UV 3529, TINUVIN NOR 371, UVINUL 4050, UVINUL 5050, etc.

Ternary combination 1 is especially effective for polypropylene homopolymers and copolymers, and ternary combination 3 is especially effective for polyethylene.

In the binary HALS combinations, the weight:weight ratio is from about 1:19 to about 19:1, from about 1:17 to about 17:1, from about 1:15 to about 15:1, from about 1:13 to about 13:1, from about 1:11 to about 11:1 or from about 1:9 to about 9:1, for instance at ratios of about 1:10, about 1:8, about 1:7, about 1:6, about 1:5, about 1:4, about 1:3, about 1:2, about 1:1, about 2:1, about 3:1, about 4:1, about 5:1, about 6:1, about 7:1, about 8:1 or about 10:1 and ratios in between.

In the ternary HALS combinations, the weight:weight ratios of any two of the HALS is as for the binary combinations. Advantageously, a combination of a low molecular weight and a high molecular weight HALS is employed. The low molecular weight stabilizers have a molecular weight of from about 200 g/mol to about 1000 g/mol. The high molecular weight stabilizers have a molecular weight from about 1200 g/mol to about 10,000 g/mol.

Suitable low molecular weight hindered amines are (1)-(33a). Suitable high molecular weight hindered amines are (34)-(49). In oligomeric or polymeric hindered amines, the repeating unit "n" is a value such that the average molecular weight is from about 1200 g/mol to about 10,000 g/mol.

Advantageously, a low and high molecular weight hindered amine combination is employed together with a UV absorber, for instance an hydroxybenzoate UV absorber.

A further subject of the invention is a polyolefin composition comprising a polyolefin substrate having incorporated therein
a) an hydroxybenzoate ultraviolet light absorber and
b) a high molecular weight hindered amine and a low molecular weight hindered amine.

The hindered amine light stabilizers are present, in total, from about 0.10 to about 1.9 weight percent, based on the weight of the polyolefin substrate. Preferably from about 0.15 to about 1.5 weight percent. For instance, the hindered amine light stabilizers are present at about 0.2, about 0.3, about 0.4, about 0.5, about 0.6, about 0.7, about 0.8, about 0.9, about 1.0, about 1.1, about 1.2, about 1.3 or about 1.4 weight percent, based on the weight of the polyolefin substrate and at levels in between.

Antioxidants are selected from the group consisting of hindered phenolic antioxidants, organic phosphorus stabilizers, dialkylhydroxylamine stabilizers, amine oxide stabilizers and tocopherols. The antioxidants are preferably a combination of an organic phosphorus stabilizer and a hindered phenolic antioxidant, a dialkylhydroxylamine stabilizer, a combination of an organic phosphorus stabilizer and a dialkylhydroxylamine stabilizer, an amine oxide stabilizer or a combination of an organic phosphorus stabilizer and an amine oxide stabilizer.

Present antioxidants also include vitamin E and vitamin E acetate (tocopherols). Each may be employed alone, in combination with each other or in combination with one or more antioxidants selected from the group consisting of hindered phenolic antioxidants, dialkylhydroxylamine stabilizers, organic phosphorus stabilizers and amine oxide stabilizers.

The organic phosphorus stabilizers are for example known phosphite and phosphonite stabilizers and include triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, bis(2,4-di-□-cumylphenyl) pentaerythrtitol diphosphite, diisodecyl pentaerythritol diphosphite, bis(2,4-di-tert-butylphenyl) pentaerythritol diphosphite (D), bis(2,6-di-tert-butyl-4-methylphenyl) pentaerythritol diphosphite (E), bisisodecyloxy-pentaerythritol diphosphite, bis(2,4-di-tert-butyl-6-methylphenyl) pentaerythritol diphosphite, bis(2,4,6-tri-tert-butylphenyl) pentaerythritol diphosphite, tristearyl sorbitol triphosphite, tetrakis-(2,4-di-tert-butylphenyl) 4,4'-biphenylene-diphosphonite (H), 6-isooctyloxy-2,4,8,10-tetra-tert-butyl-dibenzo[d,f][1,3,2]dioxaphosphepin (C), 6-fluoro-2,4, 8,10-tetra-tert-butyl-12-methyl-dibenzo[d,g][1,3,2] dioxaphosphocin (A), bis(2,4-di-tert-butyl-6-methylphenyl) methyl phosphite, bis(2,4-di-tert-butyl-6-methylphenyl) ethyl phosphite (G), 2,2',2"-nitrilo[triethyltris(3,3'5,5'-tetra-tert-butyl-1,1'-biphenyl-2,2'-diyl) phosphite] (B), bis(2,4-di-t-butylphenyl) octylphosphite, poly(4,4'-{2,2'-dimethyl-5, 5'-di-t-butylphenylsulfide-}octylphosphite), poly(4,4' {-isopropylidenediphenol}-octylphosphite), poly(4,4'-{isopropylidenebis[2,6-dibromophenol]}-octylphosphite), poly (4,4'-{2,2'-dimethyl-5,5'-di-t-butylphenylsulfide}-pentaerythrityl diphosphite),

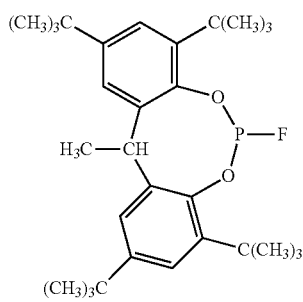
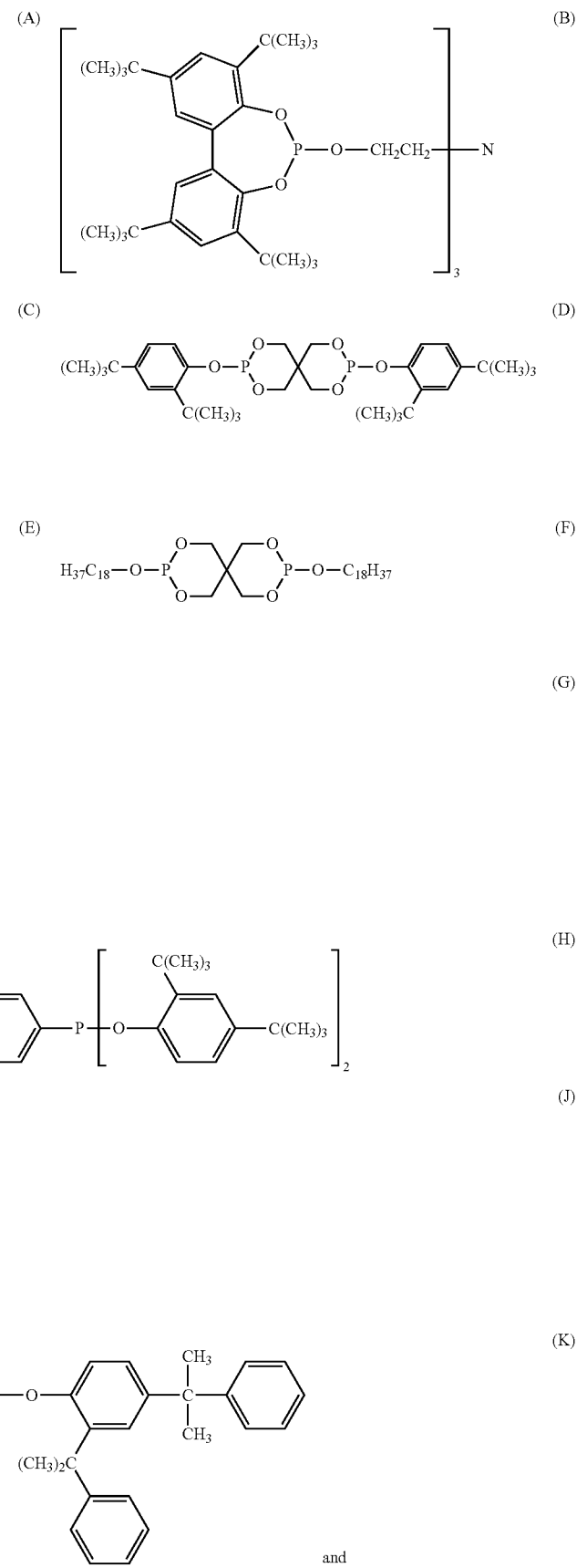

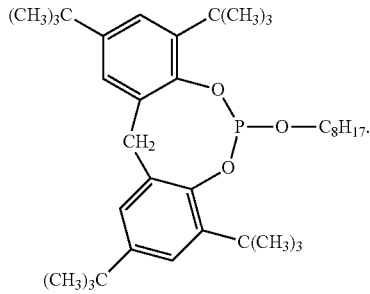

(L)

Suitable organic phosphorus stabilizers are also liquid stabilizers as disclosed in U.S. Pub. No. 2010/048782 and U.S. Pat. No. 7,888,414, for example liquid phosphites P-2, P-3 and P-4 therein. Suitable liquid organic phosphorus stabilizers are also disclosed in U.S. Pub. Nos. 2013/0225736 and 2010/0029844 and U.S. Pat. Nos. 7,468,410 and 8,304,477.

Hindered phenolic antioxidants include for example tris (3,5-di-tert-butyl-4-hydroxybenzyl) isocyanurate, 1,3,5-tris-(3,5-di-tert-butyl-4-hydroxybenzyl)-2,4,6-trimethylbenzene, the calcium salt of the monoethyl ester of 3,5-di-tert-butyl-4-hydroxybenzylphosphonic acid, pentaerythritol tetrakis[3-(3,5-di-tert-butyl-4-hydroxyphenyl) propionate] or octadecyl 3-(3,5-di-tert-butyl-4-hydroxyphenyl) propionate.

The combination of an organic phosphorus stabilizer and a hindered phenolic antioxidant is in particular tris(2,4-di-tert-butylphenyl) phosphite and pentaerythritol tetrakis[3-(3,5-di-tert-butyl-4-hydroxyphenyl) propionate] or octadecyl 3-(3,5-di-tert-butyl-4-hydroxyphenyl) propionate.

The weight:weight ratio of organic phosphorus stabilizer to hindered phenolic antioxidant is from about 9:1 to about 1:9 and ratios in between, for instance about 8:1, about 7:1, about 6:1, about 5:1, about 4:1, about 3:1, about 2:1, about 1:1, about 1:2, about 1:3, about 1:4, about 1:5, about 1:6, about 1:7 or about 1:8 and ratios in between.

Hydroxylamine stabilizers are for example N,N-dibenzylhydroxylamine, N,N-diethylhydroxylamine, N,N-dioctylhydroxylamine, N,N-dilaurylhydroxylamine, N,N-didodecylhydroxylamine, N,N-ditetradecylhydroxylamine, N,N-dihexadecylhydroxylamine, N,N-dioctadecylhydroxylamine, N-hexadecyl-N-tetradecylhydroxylamine, N-hexadecyl-N-heptadecylhydroxylamine, N-hexadecyl-N-octadecylhydroxylamine, N-heptadecyl-N-octadecylhydroxylamine, N-methyl-N-octadecylhydroxylamine or preferably N,N-di($C_{16}$-$C_{18}$alkyl)hydroxylamine.

The amine oxide stabilizer is for instance a di($C_{16}$-$C_{18}$) alkyl methyl amine oxide, CAS #204933-93-7.

The combination of an organic phosphorus stabilizer and a dialkylhydroxylamine is in particular tris(2,4-di-tert-butylphenyl) phosphite and N,N-di($C_{16}$-$C_{18}$alkyl)hydroxylamine.

The combination of an organic phosphorus stabilizer and an amine oxide stabilizer is in particular tris(2,4-di-tert-butylphenyl) phosphite and di($C_{16}$-$C_{18}$)alkyl methyl amine oxide.

The weight:weight ratios of these two combinations are as above for the organic phosphorus/hindered phenolic antioxidant combination.

The antioxidants are present, in total, from about 0.05 to about 1.0 weight percent, based on the weight of the polyolefin substrate. Preferably from about 0.10 to about 0.75 weight percent. For instance, the antioxidants are present at levels of about 0.20, about 0.30, about 0.40, about 0.50, about 0.60, about 0.70, about 0.80, about 0.90 or about 1.0 weight percent, based on the weight of the polyolefin substrate and at levels in between.

The colorants are preferably selected from the group consisting of organic pigments, inorganic pigments and mixtures thereof. Some suitable examples may be found in Pigment Handbook, T. C. Patton, Ed., Wiley-Interscience, New York, 1973. Any of the commercial pigments used in polymer based products can be utilized in the present compositions such as: metallic oxides, such as titanium dioxide, zinc oxide, aluminum oxide and iron oxide, metal hydroxide, metal flakes, such as aluminum flake, chromates, such as lead chromate, sulfides, sulfates, carbonates, carbon black, bismuth vanadate, silica, talc, china clay, phthalocyanine blues and greens, organo reds, organo maroons, pearlescent pigments and other organic pigments. If desired chromate-free pigments, such as barium metaborate, zinc phosphate, aluminum triphosphate and mixtures thereof, can also be used.

Some useful pigments include C.I. Pigments: Black 12, Black 26, Black 28, Black 30, Blue 15.0, Blue 15.3 (G), Blue 15.3 (R), Blue 28, Blue 36, Blue 385, Brown 24, Brown 29, Brown 33, Brown 10P850, Green 7 (Y), Green 7 (B), Green 17, Green 26, Green 50, Violet 14, Violet 16, Yellow 1, Yellow 3, Yellow 12, Yellow 13, Yellow 14, Yellow 17, Yellow 62, Yellow 74, Yellow 83, Yellow 164, Yellow 53, Red 2, Red 3 (Y), Red 3 (B), Red 4, Red 48.1, Red 48.2, Red 48.3, Red 48.4, Red 52.2, Red 49.1, Red 53.1, Red 57.1 (Y), Red 57.1 (B), Red 112, Red 146, Red 170 (F5RK Type) Bluer, C.I. Pigment Orange 5, Pigment Orange 13, Pigment Orange 34, Pigment Orange 23 (R), and Pigment Orange 23 (B). Some useful organic pigments include: Pigment Yellow 151, Pigment Yellow 154, Pigment Yellow 155, Pigment Red 8, Pigment Red 8, Pigment Red 49.2, Pigment Red 81, Pigment Red 169, Pigment Blue 1, Pigment Violet 1, Pigment Violet 3, Pigment Violet 27, Pigment Red 122, Pigment Violet 19. Some useful inorganic pigments include Middle Chrome, Lemon Chrome, Prime-Rose Chrome, Scarlet Chrome, and Zinc Chromate.

The present organic pigments are preferably selected from the group consisting of phthalocyanines, perylenes, azo compounds, isoindolines, quinophthalones, diketopyrrolopyrroles, qyinacridones, dioxazines and indanthrones. The blue pigments are for example of the indanthrone and the copper phthalocyanine classes, for instance Pigment Blue 60, Pigment Blue 15:1, Pigment Blue 15:3, Pigment Blue 15:4 and Pigment Blue 15:6. The green pigments are for example of the copper phthalocyanine class, for instance Pigment Green 7 and Pigment Green 36. The magenta pigments are for instance of the quinacridone class, for example 2,9-dichloro quinacridone, Pigment Red 202. The red pigments are for instance of the quinacridone class, for instance dimethyl quinacridone, Pigment Red 122, or of the perylene class, for instance Pigment Red 149, Pigment Red 178 and Pigment Red 179, or of the diketopyrrolopyrrole class, for instance Pigment Red 254 and Pigment Red 264. The yellow pigments are for instance of the pteridine, isoindolinone, and isoindoline classes, for example Pigment Yellow 215, Pigment Yellow 110, and Pigment Yellow 139. The orange pigments are of the isoindolinone or diketopyrrolopyrrole class, for instance Pigment Orange 61, Pigment Orange 71, and Pigment Orange 73. The violet pigments are for instance of the quinacridone class, for instance pigment violet 19 or of the dioxazine class, for instance pigment violet 23 or pigment violet 37. Advantageously, mixtures of pigments may be employed.

The colorants are present, in total, from about 0.10 to about 3.0 weight percent, based on the weight of the polyolefin substrate. Preferably from about 0.2 to about 1.0 weight percent. For instance, the colorants are present at levels of about 0.3, about 0.4, about 0.5, about 0.6, about 0.7, about 0.8 or about 0.9 weight percent, based on the weight of the polyolefin substrate and at levels in between.

Fillers may be particulate or fibrous and organic or inorganic. Particulate organic fillers include wood flour, cork, nutshell, starch, polymers, carbon and proteins. Fillers may include organic natural or synthetic fibers of wood, lignin-free or nearly lignin free cellulose, flax, jute, hemp, kenaf, rice hulls, abaca, wool, carbon, aramid fibers, nylons, polyesters and/or combinations thereof. Particulate inorganic fillers include glass, calcium carbonate, beryllium oxide, iron oxide, magnesia, magnesium carbonate, titanium dioxide, zinc oxide, zirconia, hydrated alumina, antimony oxide, metal powders, silica, silicates, organo-nanoclays, clays, barium ferrite, silicon carbide and potassium titanate. Fibrous inorganic fillers include glass, mineral wool, calcium sulphate, potassium titanate, boron, alumina and metals. Inorganic fillers also include alkali or alkali earth metal carboxylates stearates or sulfates. Preferably the inorganic fillers are dolomite, silica, calcium carbonate, magnesium hydroxide, zinc borate, talcs (magnesium silcates), vermiculite, diatomite, perlite, wallastonite, fly ash, kaolin clay, mica or various titanium dioxides including surface treated titanium dioxide. Preferably, the fillers are calcium carbonate, magnesium hydroxide, talc, wollastonite or fly ash. The fillers are present, in total, from about 5 to about 60 or about 70 weight percent, based on the weight of the polyolefin substrate. Preferably from about 10 to about 50 or from about 15 to about 40 weight percent. For instance the fillers are present at about 10, about 20, about 25, about 30, about 35 or about 45 weight percent, based on the weight of the polyolefin substrate and at levels in between.

Suitable flame retardants include chlorinated flame retardants, brominated flame retardants, phosphorus based flame retardants, metal hydroxide compounds, melamine based compounds, antimony compounds, borate compounds, other metal containing flame retardants and combinations thereof. Chlorinated flame retardants are disclosed in U.S. Pat. Nos. 6,472,456, 5,393,812, 7,230,042 and 7,786,199. Chlorinated flame retardants are for example tris(2-chloroethyl) phosphite, bis-(hexachlorocloentadeno) cyclooctane, tris(1-chloro-2-propyl)phosphate, tris(2-chloroethyl)phosphate, bis(2-chloroethyl)vinyl phosphate, hexachlorocyclopentadiene, tris(chloropropyl)phosphate, tris(2-chloroethyl)phosphate, tris(chloropropyl)phosphate, polychlorinated biphenyls, mixtures of monomeric chloroethyl phosphonates and high boiling phosphonates, tris(2,3-dichloropropyl)phosphate, chlorendic acid, tetrachlorophthalic acid, poly-β-chloroethyl triphosphonate mixture, bis(hexachlorocyclopentadieno)cyclooctane (DECLORANE PLUS), chlorinated paraffins and hexachlorocyclopentadiene derivatives. Brominated flame retardants include tetrabromobisphenol A (TBBPA) and its derivatives such as esters, ethers, and oligomers, for example tetrabromophthalate esters, bis (2,3-dibromopropyloxy)tetrabromobisphenol A, brominated carbonate oligomers based on TBBPA, brominated epoxy oligomers based on condensation of TBBPA and epichlorohydrin, and copolymers of TBBPA and 1,2-dibromoethane; dibromobenzoic acid, dibromostyrene (DBS) and its derivatives; ethylenebromobistetrabromophthalimide, dibromoneopentyl glycol, dibromocyclooctane, trisbromoneopentanol, tris(tribromophenyl)triazine, 2,3-dibromopropanol, tribromoaniline, tribromophenol, tetrabromocyclopentane, tetrabromobiphenyl ether, tetrabromodipentaerythritol, decabromodiphenyl ether, tetrabromophthalic anhydride, pentabromotoluene, pentabromodiphenyl ether, pentabromodiphenyl oxide, pentabromophenol, pentabromophenyl benzoate, pentabromoethylbenzene, hexabromocyclohexane, hexabromocyclooctane, hexabromocyclodecane, hexabromocyclododecane, hexabromobenzene, hexabromobiphenyl, octabromobiphenyl, octabromodiphenyl oxide, poly(pentabromobenzyl acrylate), octabromodiphenyl ether, decabromodiphenyl ethane, decabromodiphenyl, brominated trimethylphenylindan, tetrabromochlorotoluene, bis (tetrabromophthalimido)ethane, bis(tribromophenoxy)ethane, brominated polystyrene, brominated epoxy oligomer, polypentabromobenzyl acrylate, dibromopropylacrylate, dibromohexachlorocyclopentadienocyclooctane, N'-ethyl (bis)dibromononboranedicarboximide, tetrabrombisphenol S, N'N'-ethylbis(dibromononbornene)dicarboximide, hexachlorocyclopentadieno-bis-(2,3-dibromo-1-propyl) phthalate, brominated phosphates like bis(2,3-dibromopropyl)phosphate and tris(tribromoneopentyl)phosphate and tris(dichlorobromopropyl) phosphite, N,N'-ethylene-bis-(tetrabromophthalimide), tetrabromophthalic acid diol[2-hydroxypropyl-oxy-2-2-hydroxyethyl-ethyltetrabromophthalate], vinylbromide, polypentabromobenzyl acrylate, polybrominated dibenzo-p-dioxins, tris-(2,3-dibromopropyl)-isocyanurate, ethylene-bis-tetrabromophthalimide and tris(2,3-dibromopropyl)phosphate. Suitable examples of commercially available brominated flame retardants include polybrominated diphenyl oxide (DE-60F), decabromodiphenyl oxide (decabromodiphenyl ether) (DB-DPO; SAYTEX® 102E), tris[3-bromo-2,2-bis(bromomethyl)propyl]phosphate (PB 370®, FMC Corp. or FR 370, ICL/Ameribrom), tris(2,3-dibromopropyl)phosphate, tetrabromophthalic acid, bis-(N,N'-hydroxyethyl)tetrachlorphenylene diamine, tetrabromobisphenol A bis(2,3-dibromopropyl ether) (PE68), brominated epoxy resin, ethylene-bis (tetrabromophthalimide) (SAYTEX® BT-93), octabromodiphenyl ether, 1,2-bis(tribromophenoxy)ethane (FF680), tetrabromo-bisphenol A (SAYTEX® RB100), ethylene bis-(dibromo-norbornanedicarboximide) (SAYTEX® BN-451), tris-(2,3-dibromopropyl)-isocyanurate, hexabromocyclododecane, brominated polystyrene and EMERALD INNOVATION series from Chemtura, for example EMERALD INNOVATION 1000. The organobromine flame retardant is preferably decabromodiphenyl ether or tris[3-bromo-2,2-bis(bromomethyl)propyl]phosphate.

Antimony trioxide (ATO) may be employed, especially together with a present halogentated flame retardant, i.e. a brominated flame retardant. Combinations of antimony trioxide with decabromodiphenyl ether or tris[3-bromo-2,2-bis(bromomethyl)propyl]phosphate are preferred.

Phosphorus based flame retardants include those disclosed for example in, U.S. Pub. Nos. 2003/0220422, 2014/0005289, 2011/0257310 and 2014/0005289 and U.S. Pat. Nos. 3,966,894, 4,079,035, 4,107,108, 4,108,805, 4,174,343, 4,228,063, 6,265,599, 6,528,559, 6,740,695, 7,786,199 and 8,349,925. Phosphorous based fire retardant include phosphazene compounds, triphenyl phosphates, phosphate esters, phosphonium derivatives, phosphonates, phosphoric acid esters and phosphate esters. Phosphorous based fire retardants are usually composed of a phosphate core to which is bonded alkyl (generally straight chain) or aryl (aromatic ring) groups. Examples include red phosphorous, inorganic phosphates, insoluble ammonium phosphate, ammonium polyphosphate, ammonium urea polyphosphate, ammonium orthophosphate, ammonium carbonate phosphate, ammonium urea phosphate, diammonium phosphate, ammonium melamine phosphate, diethylenediamine polyphosphate, dicyandiamide polyphosphate, polyphosphate, urea phosphate, melamine pyrophosphate, melamine orthophosphate, melamine salt of dimethyl methyl phosphonate, melamine salt of dimethyl hydrogen phosphite, ammonium salt of boron-polyphosphate, urea salt of dimethyl methyl phosphonate, organophosphates, phosphonates and phosphine oxide. Phosphate esters include, for example, trialkyl derivatives, such as triethyl phosphate, tris(2-ethylhexyl)phosphate, trioctyl phosphate, triaryl derivatives, such as triphenyl phosphate, cresyl diphenyl phosphate and tricresyl phosphate and aryl-alkyl derivatives, such as 2-ethylhexyl-diphenyl phosphate and dimethyl-aryl phosphates, octylphenyl phosphate and ethylene diamine phosphates. Other examples of phosphorous based fire retardants include resorcinol-bis-diphenylphosphate, guanidine phenylphosphonate, melamine phenylphosphonate, dimethylaluminium phosphinate, methyl-ethylaluminiumphosphinate, diethylaluminiumphosphinate, poly-[2,4-(piperazine-1,4-yl)-6-morpholine-4-yl)-1,3,5-triazine], aluminium polyphosphate, methylamine boron-phosphate, cyanuramide phosphate, magnesium phosphate, ethanolamine dimethyl phosphate, pentaerythritol-di-methylphosphonate, cyclic phosphonate ester, trialkyl phosphonates, potassium ammonium phosphate, cyanuramide phosphate, aniline phosphate, trimethylphosphoramide, tris(1-aziridinyl)phosphine oxide, bis(5, 5-dimethyl-2-thiono-1,3,2-dioxaphosphorinamyl)oxide, dimethylphosphono-N-hydroxymethyl-3-propionamide, tris (2-butoxyethyl)phosphate, tetrakis(hydroxymethyl)phosphonium salts, such as tetrakis(hydroxymethyl)phosphonium chloride and tetrakis(hydroxymethyl)phosphonium sulfate, n-hydroxymethyl-3-(dimethylphosphono)-propionamide, a melamine salt of boron-polyphosphate, an ammonium salt of boron-polyphosphate, triphenyl phosphite, ammonium dimethyl phosphate, melamine orthophosphate, ammonium urea phosphate, ammonium melamine phosphate, a melamine salt of dimethyl methyl phosphonate, a melamine salt of dimethyl hydrogen phosphite and the like.

Metal hydroxide fire retardants include inorganic hydroxides, such as aluminum hydroxide, magnesium hydroxide, aluminum trihydroxide (ATH) and hydroxycarbonate.

Melamine based fire retardants are a family of non-halogenated flame retardants that include three chemical groups: (a) melamine (2,4,6-triamino-1,3,5 triazine); (b) melamine derivatives (including salts with organic or inorganic acids, such as boric acid, cyanuric acid, phosphoric acid or pyro/poly-phosphoric acid); and (c) melamine homologues. Melamine derivatives include, for example, melamine cyanurate (a salt of melamine and cyanuric acid), melamine-mono-phosphate (a salt of melamine and phosphoric acid), melamine pyrophosphate and melamine polyphosphate. Melamine homologues include melam (1,3,5-triazin-2,4,6-triamine-n-(4,6-diamino-1,3,5-triazine-2-yl), melem (2,5,8-triamino 1,3,4,6,7,9,9b-heptaazaphenalene) and melon (poly[8-amino-1,3,4,6,7,9,9b-heptaazaphenalene-2,5-diyl). Melamine based flame retardants are also melamine compound/polyol condensates. For instance, as disclosed in U.S. application Ser. No. 10/539,097 (published as WO 2004/055029) and U.S. Pub. No. 2010/152376, where the polyol is a linear, branched or cyclic trihydric, tetrahydric, pentahydric or hexahydric alcohol or a linear or cyclic $C_4$-$C_6$ aldose or $C_4$-$C_6$ ketose and where the melamine compound is melamine phosphate, melamine pyrophosphate or melamine polyphosphate. The polyol is preferably pentaerythritol or dipentaerythritol. The melamine compound is preferably melamine phosphate. The molar ratio of melamine compound to the polyol is preferably from about 1:1 to about 4:1. The condensate may further have incorporated therein a dendritic polymer substituted by hydroxy groups, for instance a dendritic polyester or dendritic polyamide. A dendritic polyester is preferably a product of an initiator compound selected from the group consisting of trimethyolpropane, pentaerythritol and ethoxylated pentaerythritol and chain-extending dimethylpropionic acid. A dendritic polyamide is preferably a polycondensate of a cyclic carboxylic acid anhydride and diisopropanolamine.

Borate fire retardant compounds include zinc borate, borax (sodium borate), ammonium borate, and calcium borate. Zinc borate is a boron based fire retardant having the chemical composition $xZnO_yB_2O_3.zH_2O$. Zinc borate can be used alone, or in conjunction with other chemical compounds, such as alumina trihydrate, magnesium hydroxide or red phosphorous. It acts through zinc halide or zinc oxyhalide, which accelerate the decomposition of halogen sources and promote char formation.

Examples of other metal containing flame retardant substances, which can be employed alone or in combination with other flame retardant substances, include, but are not limited to, magnesium oxide, magnesium chloride, talcum, alumina hydrate, zinc oxide, alumina trihydrate, alumina magnesium, calcium silicate, sodium silicate, zeolite, sodium carbonate, calcium carbonate, ammonium molybdate, iron oxide, copper oxide, zinc phosphate, zinc chloride, clay, sodium dihydrogen phosphate, tin, molybdenum and zinc.

Polytetrafluoroethylene (PTFE) is also contemplated as an anti-drip agent which can provide additional flame retardancy to the composition.

Silicon based materials are also included which are for instance linear or branched chain type silicone with (hydroxy or methoxy) or without (saturated hydrocarbons) functional reactive groups.

Suitable flame retardants are also those of U.S. Pat. applications 61/739,842 and 61/835,893, published as WO2014/099397. For instance a combination of one or more bismuth compounds selected from the group consisting of bismuth oxychloride, bismuth oxyfluoride, bismuth oxybromide, bismuth oxyiodide and bismuth oxynitrate and one or more organobromine flame retardants.

Preferably, the flame retardant is melamine polyphosphate, pentaerythritol-di-methylphosphonate, ammonium polyphosphate or a condensate of melamine phosphate and pentaerythritol.

The flame retardants are present, in total, from about 0.5% to about 70% by weight, based on the weight of the polyolefin substrate, preferably from about 1% to about 50% by weight or more preferably from about 1% to about 40% by weight or from about 15% to about 50% by weight, based on the weight of the polyolefin substrate. The flame retardants are present at levels of about 3, about 5, about 7, about 9, about 11, about 13, about 15, about 17, about 19, about 21, about 23, about 25, about 27, about 29, about 31, about 33, about 35, about 37 or about 39 weight percent, based on the weight of the polyolefin substrate and at levels in between.

Suitable antimicrobial compounds are disclosed in U.S. Pub. No. 2008/0306183. Antimicrobial compounds are for instance o-benzyl-phenol, 2-benzyl-4-chloro-phenol, 2,4,4'-trichloro-2'-hydroxydiphenyl ether, 4,4'-dichloro-2-hydroxydiphenyl ether, 5-chloro-2-hydroxy-diphenyl-methane, mono-chloro-o-benzyl-phenol, 2,2'-methylenbis-(4-chloro-phenol) or 2,4,6-trichlorophenol. Suitable inorganic antimicrobial compounds are selected from the group consisting of zinc oxide, copper and copper compounds, colloidal silver, silver nitrate, silver sulphate, silver chloride, silver complexes, metal-containing zeolites and surface modified metal-containing zeolites.

The metal-containing zeolites are those such as described in U.S. Pat. Nos. 4,775,585, 4,911,898, 4,911,899, 6,071,542 or 6,585,989.

Preferably, the antimicrobial compounds comprise a form of silver, for example a silver compound, a silver dispersion or a supported silver (for example silver supported on a zeolite or on a glass), elemental silver, micro or nano scaled elemental silver, elemental silver dispersed in silicone oil (polymethyldisiloxane), silver chloride, silver nitrate, silver sulfate, silver phosphate, silver zirconate, or silver apatite. Antimicrobials are also for instance 3,5-dimethyl-tetrahydro-1,3,5-2H-thiodiazin-2-thione, bis-tributyltinoxide, 4,5-dichlor-2-n-octyl-4-isothiazolin-3-one, N-butyl-benzisothiazoline, 10,10'-oxybisphenoxyarsine, zinc-2-pyridinthiol-1-oxide, 2-methylthio-4-cyclopropylamino-6-(α,β-dimethylpropylamino)-s-triazine, 2-methylthio-4-cyclopropylamino-6-tert-butylamino-s-triazine or 2-methylthio-4-ethylamino-6-(α,β-dimethylpropylamino)-s-triazine, 2,4,4'-trichloro-2'-hydroxydiphenyl ether, 3-iodine-2-propenyl-butylcarbamate (IPBC or iodopropynyl butylcarbamate), carbendazim or thiabendazole.

The antimicrobals are present from about 0.001 weight percent to about 5.0 weight percent, preferably from about to about 0.01 to about 4.0 weight percent, based on the weight of the polyolefin substrate, more preferably from about 0.02 to about 2.0 weight percent. For example, the antimicrobials are present at weight levels of about 0.05, about 0.10, about 0.20, about 0.30, about 0.40, about 0.50, about 0.60, about 0.70, about 0.80, about 0.90, about 1.0, about 1.1, about 1.2, about 1.3, about 1.4, about 1.5, about 1.6, about 1.7, about 1.8 or about 1.9 weight percent, based on the weight of the polyolefin substrate, and levels in between.

Further additives may also be present in the inventive compositions. The further additives may be present from about 0.1 weight percent to about 10 weight percent, based on the polyolefin substrate. Preferably from about 0.2 to about 5.0 weight percent, based on the weight of the polyolefin substrate.

Further additives include benzofuranone stabilizers, for example those disclosed in U.S. Pat. Nos. 4,325,863, 4,338,244, 5,175,312, 5,216,052, 5,252,643 5,369,159 5,356,966 5,367,008 5,428,177 or 5,428,162 or U.S. Pub. No. 2012/0238677 or 3-[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]-phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2-acetyl-5-isooctylphenyl)-5-isooctylbenzofuran-2-one and 3-(2,3-dimethylphenyl)-5,7-di-tert-butyl-benzofuran-2-one. Benzofuranone stabilizers are also disclosed in U.S. Pat. Nos. 8,653,284, 7,601,853 and 7,390,912 and U.S. Pub. No. 2012/238677.

Further additives also include antistatic agents, anti-scratch agents, slip agents, polymer processing aids and the like. Further additives include metal salts of fatty acids, for example calcium, magnesium, zinc or aluminum stearate. Further additives also include thiosynergists, for example dilauryl thiodipropionate or distearyl thiodipropionate.

Suitable are acrylic processing aids such as all acrylic or mostly acrylic processing aids such as PARALOID K 125 from Dow. Acrylic processing aids are for example taught in U.S. Pub. Nos. 2009111915 and 2012189837 and U.S. Pat. No. 8,124,664. Acrylic processing aids are for instance copolymers of a mixture of acrylic monomers or copolymers of an acrylic monomer or mixture of acrylic monomers with one or more further monomers. The copolymers are generally in powder form and have a molecular weight, Mw, of from about 500,000 to about 9,000,000.

Acrylic monomers include all monomeric acrylic or methacrylic esters of non-tertiary alkyl alcohols, with the alkyl groups having from 1 to 20 carbon atoms or alternatively from 1 to 8 carbon atoms. Suitable acrylate monomers include but are not limited to methyl acrylate, ethyl acrylate, n-butyl acrylate, lauryl acrylate, 2-ethylhexyl acrylate, cyclohexyl acrylate, iso-octyl acrylate, octadecyl acrylate, nonyl acrylate, decyl acrylate, isobornyl acrylate and dodecyl acrylate. Also useful are aromatic acrylates (e.g. benzyl acrylate). Suitable methacrylate monomers include but are not limited to methyl methacrylate, ethyl methacrylate, n-butyl methacrylate, lauryl methacrylate, 2-ethylhexyl methacrylate, cyclohexyl methacrylate, iso-octyl methacrylate, octadecyl methacrylate, nonyl methacrylate, decyl methacrylate, isobornyl methacrylate, and dodecyl methacrylate. The content of the acrylic monomers is in the range of about 60 to 100% by weight and alternatively from about 70 to about 90% by weight of the total monomers of the acrylic copolymer processing aid.

Examples of the further monomers copolymerizable therewith with include benzyl acrylate and phenyl acrylate; aromatic vinyl compounds such as styrene, α-methylstyrene and vinyltoluene; vinyl cyanide compounds such as acrylonitrile and methacrylonitrile; vinyl esters such as vinyl acetate; and acid anhydrides such as maleic anhydride. The other copolymerizable monomers may also be used alone or in admixture of two or more. The content of the other monomers is in the range of 0 to about 40% by weight and alternatively from about 10 to about 30% by weight of the total monomers.

Moreover, multifunctional monomers such as divinylbenzene, allyl methacrylate, 1,3-butanediol dimethacrylate and triallyl cyanurate may be used as constituents of the acrylic processing aid. The content of these monomers may be in the range of 0.001 to about 2.0% by weight and alternatively from about 0.2 to about 1.0% by weight, based on the total monomers.

The Tg of the acrylic processing aid is for instance from about −50° C. to about 130° C., for instance from about 40° C. to about 130° C. The Mw of the processing aid is for instance from about 500,000 to about 9,000,000, from about 1,000,000 to about 8,000,000 or from about 2,000,000 to about 7,000,000.

The acrylic processing aids are for instance employed at a weight level of from about 0.5% to about 15%, from about 1% to about 12% or from about 1% to about 10%, based on the weight of the polyolefin. The acrylic processing aid may be employed at a weight level of about 2%, about 3%, about 4%, about 5%, about 6%, about 7%, about 8% or about 9%, based on the weight of the polyolefin.

A further subject of the invention is a polyolefin composition comprising a polyolefin substrate having incorporated therein an acrylic processing aid.

Further additives also include compatibilizers or dispersing aids, for instance maleic anhydride grafted PE or PP, ethylene vinyl acetate, ethylene acrylic acid and the like.

The polymer components of the present polyolefin compositions consist essentially of the polyolefin substrate. Generally, no other polymers are present, notwithstanding the possibility of certain additive amounts of polymeric additives such as compatibilizers and the like. That is to say, the polyolefin substrate is ≥90 wt. %, ≥92 wt. %, ≥94 wt. %, ≥96 wt. % or ≥98 wt. % of the polymeric components of the polyolefin compositions.

The present compositions pass or exceed the following standard industry tests. The present compositions exhibit impact strength of >35 in-lb measured according to ASTM D4226, coefficient of linear thermal expansion of <4.5×10E-05 in/in/ft measured according to ASTM D696 and optionally acceptable color uniformity in finished siding parts according to ASTM D6864 and/or acceptable low delta E color for the intended application according to ASTM D2244 and/or a V-1 or V-0 rating according to the UL-94 Test for Flammability of Plastic Materials for Parts in Devices and Appliances, $5^{th}$ Ed., Oct. 29, 1996 and/or a flame spread index of <200 measured according to ASTM E-84. For instance, the present compositions exhibit an impact strength of >60 in-lb according to ASTM D4226, for instance >55 in-lb, >50 in-lb, >45 in-lb or >40 in-lb. For instance, the intended application is outdoor use as house siding panels, soffit, profiles or roofing. In particular, the compositions are useful as house siding panels (siding). An acceptable low delta E color is for example ≤8.0, ≤7.5, ≤7.0, ≤6.5, ≤6.0, ≤5.5, ≤5.0, ≤4.5, ≤4.0, ≤3.5, ≤3.0, ≤2.5, ≤2.0, ≤1.5 or ≤1.0.

The incorporation of the present components a)-g) and optional further additives into the polyolefin substrate is carried out by known methods, for example before or after molding or also by applying the dissolved or dispersed additive mixture to the polyolefin, with or without subsequent evaporation of the solvent. Present components a)-g) and optional further additives can also be added to the polyolefin in the form of a masterbatch which contains the additives in a concentration of, for example, about 2.5% to about 40% by weight, based on the total weight of the masterbatch. In the form of a masterbatch, the polymer of the masterbatch need not be the same as the polyolefin substrate.

Molding is carried out with known mixing machines, for instance mixers, kneaders or extruders. Present components a)-g) and optional further additives can be premixed or added individually. Present components a)-g) and optional further additives can also be added before or during the polymerization or before crosslinking. Present components a)-g) and optional further additives can be incorporated into the polymer to be made flame retardant in pure form or encapsulated in waxes, oils or polymers. Present components a)-g) and optional further additives can also be sprayed onto the polyolefin substrate. They are able to dilute other additives or their melts so that they can be sprayed also together with these additives onto the polyolefin. Addition by spraying during the deactivation of the polymerization catalysts is particularly advantageous, it being possible to carry out spraying using, for example, the steam used for deactivation. In particular, the present additives of components a)-g) are incorporated into the thermoplastic polyolefin substrate by melt blending in an extruder. That is, the present compositions are melt extruded and the final articles are prepared by melt extrusion. The present additives of components a)-g) may be added together or separately.

Generally the present process includes the measurement of raw materials by weight followed by the dry blending of raw ingredients. The mixture is fed to a screw extruder at a constant feed rate to extrude the material into a desired form. The product may be embossed to provide a desired texture onto the surface followed by water cooling, drying and trimming to manufacture the final product.

Benefits for producing polyolefin siding via profile extrusion compared to injection molding of siding panels include:

Extrusion is a continuous process where polymer exiting a die forms a linear shaped sheet of any relevant length prior to cutting into lengths suitable for eventual installation. Injection molding is a batch process with longer "cycle time" and less favorable economics considering polymer volume converted to shaped article per unit time.

In the case of counter-rotating twin screw machines used in profile extrusion, a uniform head pressure is created which enables articles of consistent thickness and volume to be produced.

Twin screw machines in general allow the flexibility and economic benefit to melt blend and mix various additives, colorants, fillers etc. and produce directly a finished profile siding article. In contrast, the injection molding process is not as thorough of a blending machine, consequently an additional timely and costly pre-compounding step is necessary to mix additives and fillers into the base polymer resin prior to feeding said resin to the injection molding machine. While additional pre-compounded components may be added to an injection molding machine this requires again a separate pre-compounding step and the use of multiple material feeders at the injection molding machine for the various pre-compounded components.

The present compositions are especially useful as house siding, cladding, soffit or roofing.

Present siding panels may be embossed as taught in U.S. Pat. Nos. 5,284,693 and 5,662,977. Alternatively, a process according to U.S. Pat. No. 6,823,794 may be employed where curable inks are applied to an extruded sheet to produce a visual effect. Also a process according to U.S. Pub. No. 2007/092701 may be employed.

Accordingly, also disclosed is an article of manufacture comprising the present polyolefin compositions. In particular, the article of manufacture is house siding, cladding, soffit or roofing.

The present formulations may be extruded into a monolithic single layer article.

Alternatively, the present article may be a multilayer article formed for example via coextrusion, thermoforming or lamination. A present multilayer article contains at least one layer consisting of the present polyolefin composition. Preferably, a present multilayer article contains a present polyolefin composition as the capstock and/or base layer.

The multilayer article may comprise a base layer and a capstock layer covering the base layer. The multilayer article may comprise a base layer and a backing layer covering the base layer. The multilayer article may comprise a base layer, a capstock layer and a backing layer.

The base layer consists of the polyolefin composition. Additional "tie layers" may be present to provide adhesion between dissimilar polymer layers in a multilayer article. The capstock layer faces the exterior of the house and is exposed to the environment. The backing layer faces the interior of the house.

Tie layers are especially useful for adhesion of dissimilar polymers or similar polymers of different viscosity or molecular weights, for example for such polymers present in the capstock and base layer respectively. Examples of tie layer materials include a polyolefin, for instance a polypropylene or polyethylene homopolymer, copolymer etc. and a block or graft polyolefin co- or ter-polymer. Examples are olefinic block polymers useful as compatibilizers described earlier.

The capstock layer may be comprised of the same polymer as the base layer or may be comprised of another material such as an acrylic, a styrenic such as acrylonitrile-stryene-acrylate (ASA) or PVC. The capstock layer or cap layer may provide durability against environmental exposure, that is sunlight, rain and thermal cycling. Such durability may be evidenced by adequate retention of gloss, surface appearance and color stability.

The backing layer is useful as an insulation layer, to enhance structural rigidity, dimensional stability and/or impact strength. Such backing material may be a foamed organic polymer such as polyurethane, or may be a polyolefin of similar or different composition to the base layer. A backing layer may be applied to the base layer via co-extrusion, lamination or adhesive or mechanical bonding. Examples of foamed backing layers for siding are taught in U.S. Pat. Nos. 6,590,004 and 8,061,097.

Examples of multilayer articles are described in U.S. Pub. Nos. 2010/330272, 2007/092701, 2008/182074 and 2006/0013994 and U.S. Pat. No. 8,006,455.

Monolithic siding of the present invention is for instance from about 12 feet to about 25 feet long, from about 6 inches to about 10 inches wide and from about 0.035 inches to about 0.055 inches thick. The thickness of the present monolithic articles or of the base layer of a multilayer article is about 0.030, about 0.032, about 0.034, about 0.036, about 0.038, about 0.040, about 0.042, about 0.044, about 0.046, about 0.048, about 0.050, about 0.052, about 0.054, about 0.056, about 0.58, about 0.60, about 0.62, about 0.64, about 0.66, about 0.68 or about 0.70 inches and levels in between.

A moderately thin siding article is lighter in weight and less labor intensive to install. In the situation where the siding of this invention has a back-face material, it is conceivable to down gauge the front face siding material to a thinner cross section, have less weight, but still possessing adequate rigidity to allow facile installation, compared to especially the larger square area and heavier polyolefin injection molded siding.

An inch is 1000 mils.

Monolithic siding of the present invention, for instance a polyolefin monolithic siding comprising as a polyolefin substrate polypropylene homopolymer or copolymer optionally blended with a polyethylene homopolymer or copolymer, where the blend may further contain a compatibilizer exhibits a weight of about 0.19 lbs/ft$^2$. This is for unfilled polymer. For filled polymer, the siding exhibits a weight of from about 0.20 lbs/ft$^2$ to about 0.30 lbs/ft$^2$. The present monolithic siding articles exhibit a weight of about 0.18 lbs/ft$^2$, about 0.19 lbs/ft$^2$, about 0.20 lbs/ft2, about 0.21, about 0.22, about 0.23, about 0.24, about 0.25, about 0.26, about 0.27, about 0.28, about 0.29, about 0.30, about 0.31, about 0.32, about 0.33, about 0.34 or about 0.35 lbs/ft$^2$ and levels in-between.

This description will also fit a base layer of a multilayer article. Accordingly, also subject of the present invention is an unfilled or filled polyolefin siding article, which article comprises a polyolefin substrate and which has a weight of from about 0.18 lbs/ft$^2$ to about 0.35 lbs/ft$^2$ and where the article exhibits impact strength of >35 in-lb measured according to ASTM D4226, coefficient of linear thermal expansion of <4.5×10E-05 in/in/ft measured according to ASTM D696 and optionally acceptable color uniformity in finished siding parts according to ASTM D6864 and/or acceptable low delta E color for the intended application according to ASTM D2244 and/or a UL-94 V-1 or V-0 rating and/or a flame spread index of <200 measured according to ASTM E-84.

Co-extrusion is a process where a structure of multiple layers is simultaneously fabricated. This type of extrusion uses two or more extruders to melt and deliver often different viscous plastics to a single extrusion die which will extrude the materials in the desired form. Coextrusion technology is used on any number of processes including blown film, over jacketing, tubing and sheet including profiles. Specific to the construction markets, coextrusion is selected for producing articles such as vinyl fencing, window profiles or building siding, in cases where such articles are expected to endure many years of service life where exposure to outdoor weather and sunlight occurs. These articles are often composed of a thin outer layer "cap-stock" of polymeric compound that contains weather resistant additives and is extruded over an identical or different polymeric compound that provides more structural rigidity and impact resistance ("base layer"). The base layer might contain the same or different levels of weather resistant additives, colorants, fillers, flame retardants, and the like. The base layer might further have adhered to its rear face any manner of further structural reinforcing materials, insulation barrier materials of higher or lower density materials from neat plastic to cellular foamed plastics. Alternately the base layer itself might be a foamed polymeric structure, providing a substantial amount of the structural rigidity, strength and insulating properties. Compositions of this invention include base layer reinforcements composed of foamed polyolefins including polyethylenes, polypropylenes, polyurethanes, vinyl chloride polymers and copolymers.

Examples of coextruded compositions suitable for siding articles include but are not limited to polyolefin capstock materials such as a polypropylene homo- or copolymer or a polyethylene homo- or copolymer with the same or different polypropylene or polyethylene base layer, such base layer optionally may be a foamed composition or optionally have a separate foamed polypropylene or polyethylene backing layer prepared by an integrated coextrusion operation or a post-lamination process.

Capstock materials may be dissimilar to the base-layer, such as acrylics (polymerized forms of methacrylate esters as homopolymers or copolymers) available as ACRYLIGARD, SOLARKOTE, LURAN and GELOY, terpolymers including "ASA" poly(acrylonitrile-styrene-acrylate), vinyl chloride polymers or copolymers or blends thereof.

A capstock layer may optionally contain any or all UV absorbers, hindered amine stabilizers, colorants, flame retardants, antimicrobial additives, nucleating agents. Other base layer materials may comprise acrylics and vinyl chloride polymers and copolymers as described above. Such base layers optionally may be a foamed composition or optionally have a separate foamed polypropylene or polyethylene backing face layer prepared by integrated coextrusion operation or post-lamination processes.

The present compositions and articles offer unexpected advantages over common siding materials such as PVC, wood, HARDIE BOARD, aluminum, etc. Disclosed are comprehensive polyolefin compositions and articles that are cost effective and durable for outdoor use. They exhibit the following: molded-in color—no painting required, bBroader and brighter color range, can be made to resemble natural wood siding, lower maintenance and longer lifespan than wood siding, environmentally friendly—chlorine free, more sustainable—100% recyclable, will not rust or corrode, less warpage compared to PVC when exposed to heat, light and oxygen.

Each of the U.S. patents, U.S. published patent applications and U.S. patent applications cited herein are hereby incorporated by reference.

The term "a" when referring to a component is synonymous with "one or more".

The term "about" refers to variation that can occur, for example, through typical measuring and handling procedures; through inadvertent error in these procedures; through differences in the manufacture, source, or purity of ingredients used; through differences in methods used; and the like. The term "about" also encompasses amounts that differ due to different equilibrium conditions for a composition resulting from a particular initial mixture. Whether or not modified by the term "about," embodiments and claims include equivalents to the recited quantities. All numeric values herein are modified by the term "about," whether or not explicitly indicated. The term "about" generally refers to a range of numbers that one of skill in the art would consider equivalent to the recited value (i.e., having the same function and/or result). In many instances, the term "about" may include numbers that are rounded to the nearest significant figure. A value modified by the term "about" of course includes the specific value. For instance, "about 5.0" must include 5.0.

Following are some embodiments of the disclosure.

Embodiment 1

A polyolefin composition comprising a polyolefin substrate having incorporated therein one or more additives selected from the group consisting of
a) one or more ultraviolet light absorbers,
b) one or more hindered amine light stabilizers and
c) one or more antioxidants,
where the composition exhibits impact strength of >35 in-lb measured according to ASTM D4226, coefficient of linear thermal expansion of <4.5×10E-05 in/in/ft measured according to ASTM D696 and optionally acceptable color uniformity in finished siding parts according to ASTM D6864 and/or acceptable low delta E color for the intended application according to ASTM D2244 and/or a UL-94 V-1 or V-0 rating and/or a flame spread index of <200 measured according to ASTM E-84.

Embodiment 2

A polyolefin composition according to embodiment 1 comprising a polyolefin substrate having incorporated therein
a) one or more ultraviolet light absorbers,
b) one or more hindered amine light stabilizers and
c) one or more antioxidants.

Embodiment 3

A polyolefin composition according to embodiment 1 comprising a polyolefin substrate having incorporated therein
a) one or more ultraviolet light absorbers,
b) one or more hindered amine light stabilizers,
c) one or more antioxidants,
d) one or more colorants and
e) one or more fillers.

Embodiment 4

A polyolefin composition according to embodiment 1 comprising a polyolefin substrate having incorporated therein
a) one or more ultraviolet light absorbers,
b) one or more hindered amine light stabilizers,
c) one or more antioxidants,
d) one or more colorants,
e) one or more fillers and
f) one or more flame retardants.

Embodiment 5

A polyolefin composition according to embodiment 1 comprising a polyolefin substrate having incorporated therein
a) one or more ultraviolet light absorbers,
b) one or more hindered amine light stabilizers,
c) one or more antioxidants,
d) one or more colorants,
e) one or more fillers,
f) one or more flame retardants and
g) one or more antimicrobial compounds.

Embodiment 6

A polyolefin composition according to any of the preceding embodiments where the polyolefin substrate is polyethylene, polypropylene, ethylene/propylene copolymer, a mixture of polypropylene and polyethylene or a mixture of different types of polyethylene.

Embodiment 7

A polyolefin composition according to any of embodiments 1-5 where the polyolefin substrate is a polypropylene homopolymer or copolymer, optionally blended with a polyethylene homopolymer or copolymer where the blend may further contain a compatibilizer.

Embodiment 8

A polyolefin composition according to any of the preceding embodiments where the ultraviolet light absorbers are selected from the group consisting of hydroxyphenylbenzotriazoles, tris-aryl-s-triazines, hydroxybenzoates, 2-hydroxybenzophenones and cyanoacrylates, the antioxidants are selected from the group consisting of organic phosphorus stabilizer/hindered phenolic antioxidant combinations, dialkylhydroxylamine stabilizers, organic phosphorus stabilizer/dialkylhydroxylamine stabilizer combinations, amine oxide stabilizers and organic phosphorus stabilizer/amine oxide stabilizer combinations, the colorants are selected from the group consisting organic and inorganic pigments, the fillers are selected from the group consisting of natural fibers and inorganic fillers and the flame retardants are selected from the group consisting of chlorinated flame retardants, brominated flame retardants, phosphorus based flame retardants, metal hydroxide compounds, melamine based compounds, antimony compounds, borate compounds and other metal containing flame retardants.

Embodiment 9

A polyolefin composition according to any of the preceding embodiments where the ultraviolet light absorbers are selected from the group consisting of 5-chloro-2-(3-t-butyl-2-hydroxy-5-methylphenyl)-2H-benzotriazole, 2-(3,5-bis-α-cumyl-2-hydroxyphenyl)-2H-benzotriazole, 4,6-diphenyl-2-(4-hexyloxy-2-hydroxyphenyl)-s-triazine, 4,6-bis-(2,4-dimethylphenyl)-2-(2-hydroxy-4-octyloxyphenyl)-s-triazine, hexadecyl 3,5-di-tert-butyl-4-hydroxybenzoate, 2,4-di-tert-butylphenyl 3,5-di-tert-butyl-4-hydroxybenzoate and 4-octyloxy-2-hydroxybenzophenone and the hindered amine light stabilizers are selected from the group consisting of (1) 1-cyclohexyloxy-2,2,6,6-tetramethyl-4-octadecylaminopiperidine; (2) bis(2,2,6,6-tetramethylpiperidin-4-yl) sebacate; (3) bis(1-acetoxy-2,2,6,6-tetramethylpiperidin-4-yl) sebacate; (4) bis(1,2,2,6,6-pentamethylpiperidin-4-yl) sebacate; (5) bis(1-cyclohexyloxy-2,2,6,6-tetramethylpiperidin-4-yl) sebacate; (6) bis(1-octyloxy-2,2,6,6-tetramethylpiperidin-4-yl) sebacate; (7) bis(1-acyl-2,2,6,6-tetramethylpiperidin-4-yl) sebacate; (8) bis(1,2,2,6,6-pentamethyl-4-piperidyl) n-butyl-3,5-di-tert-butyl-4-hydroxybenzylmalonate (9) 2,4-bis[(1-cyclohexyloxy-2,2,6,6-tetramethylpiperidin-4-yl)butylamino]-6-(2-hydroxyethylamino-s-triazine; (10) bis(1-cyclohexyloxy-2,2,6,6-tetramethylpiperidin-4-yl) adipate; (11) 2,4-bis[(1-cyclohexyloxy-2,2,6,6-piperidin-4-yl)butylamino]-6-chloro-s-triazine; (12) 1-(2-hydroxy-2-methylpropoxy)-4-hydroxy-2,2,6,6-tetramethylpiperidine; (13) 1-(2-hydroxy-2-methylpropoxy)-4-oxo-2,2,6,6-tetramethylpiperidine; (14) 1-(2-hydroxy-2-methylpropoxy)-4-octadecanoyloxy-2,2,6,6-tetramethylpiperidine; (15) bis(1-(2-hydroxy-2-methylpropoxy)-2,2,6,6-tetramethylpiperidin-4-yl) sebacate; (16) bis(1-(2-hydroxy-2-methylpropoxy)-2,2,6,6-tetramethylpiperidin-4-yl) adipate; (17) 2,4-bis{N-[1-(2-hydroxy-2-methylpropoxy)-2,2,6,6-tetramethylpiperidin-4-yl]-N-butylamino}-6-(2-hydroxyethylamino)-s-triazine; (18) 4-benzoyl-2,2,6,6-tetramethylpiperidine; (19) di-(1,2,2,6,6-pentamethylpiperidin-4-yl) p-methoxybenzylidenemalonate; (20) 2,2,6,6-tetramethylpiperidin-4-yl octadecanoate; (21) bis(1-octyloxy-2,2,6,6-tetramethylpiperidyl) succinate; (22) 1,2,2,6,6-pentamethyl-4-aminopiperidine; (23) 2-undecyl-7,7,9,9-tetramethyl-1-oxa-3,8-diaza-4-oxo-spiro[4,5]decane; (24) tris(2,2,6,6-tetramethyl-4-piperidyl) nitrilotriacetate; (25) tris-(2-hydroxy-3-(amino-(2,2,6,6-tetramethylpiperidin-4-yl) propyl) nitrilotriacetate; (26) tetrakis(2,2,6,6-tetramethyl-4-piperidyl)-1,2,3,4-butane-tetracarboxylate; (27) tetrakis-(1,2,2,6,6-pentamethyl-4-piperidyl)-1,2,3,4-butane-tetracarboxylate; (28) 1,1'-(1,2-ethanediyl)-bis-(3,3,5,5-tetramethylpiperazinone); (29) 3-n-octyl-7,7,9,9-tetramethyl-1,3,8-triazaspiro[4.5]decan-2,4-dione; (30) 8-acetyl-3-dodecyl-7,7,9,9-tetramethyl-1,3,8-triazaspiro [4.5]decane-2,4-dione; (31) 3-dodecyl-1-(2,2,6,6-tetramethyl-4-piperidyl)pyrrolidin-2,5-dione; (32) 3-dodecyl-1-(1,2,2,6,6-pentamethyl-4-piperidyl)pyrrolidine-2,5-dione; (33) N,N'-bis-formyl-N,N'-bis(2,2,6,6-tetramethyl-4-piperidyl) hexamethylenediamine; (33a) bis(1-undecanyloxy-2,2,6,6-tetramethylpiperidin-4-yl)carbonate; (34) reaction product of 2,4-bis[(1-cyclohexyloxy-2,2,6,6-piperidin-4-yl)-butylamino]-6-chloro-s-triazine with N,N'-bis(3-aminopropyl) ethylenediamine); (35) condensate of 1-(2-hydroxyethyl)-2,2,6,6-tetramethyl-4-hydroxypiperidine and succinic acid; (36) condensate of N,N'-bis(2,2,6,6-tetramethyl-4-piperidyl)-hexamethylenediamine and 4-tert-octylamino-2,6-dichloro-1,3,5-triazine; (37) condensate of N,N'-bis(2,2,6,6-tetramethyl-4-piperidyl)-hexamethylenediamine and 4-cyclohexylamino-2,6-dichloro-1,3,5-triazine; (38) condensate of N,N'-bis-(2,2,6,6-tetramethyl-4-piperidyl)hexamethylenediamine and 4-morpholino-2,6-dichloro-1,3,5-triazine; (39) condensate of N,N'-bis-(1,2,2,6,6-pentamethyl-4-piperidyl)-hexamethylenediamine and 4-morpholino-2,6-dichloro-1,3,5-triazine; (40) condensate of 2-chloro-4,6-bis(4-n-butylamino-2,2,6,6-tetramethylpiperidyl)-1,3,5-triazine and 1,2-bis(3-amino-propylamino)ethane; (41) condensate of 2-chloro-4,6-di-(4-n-butylamino-1,2,2,6,6-pentamethylpiperidyl)-1,3,5-triazine and 1,2-bis-(3-aminopropylamino)ethane; (42) a reaction product of 7,7,9,9-tetramethyl-2-cycloundecyl-1-oxa-3,8-diaza-4-oxospiro-[4,5]decane and epichlorohydrin; (43) poly[methyl-(3-oxy-(2,2,6,6-tetramethylpiperidin-4-yl)propyl)]siloxane, CAS #182635-99-0; (44) reaction product of maleic acid anhydride-$C_{18}$-$C_{22}$-α-olefin-copolymer with 2,2,6,6-tetramethyl-4-aminopiperidine; (45) oligomeric condensate of 4,4'-hexamethylene-bis(amino-2,2,6,6-tetramethylpiperidine) and 2,4-dichloro-6-[(2,2,6,6-tetramethylpiperidin-4-yl)butylamino]-s-triazine end-capped with 2-chloro-4,6-bis(dibutylamino)-s-triazine; (46) oligomeric condensate of 4,4'-hexamethylenebis(amino-1,2,2,6,6-pentamethylpiperidine) and 2,4-dichloro-6-[(1,2,2,6,6-pentamethylpiperidin-4-yl)butylamino]-s-triazine end-capped with 2-chloro-4,6-bis(dibutylamino)-s-triazine; (47) oligomeric condensate of 4,4'-hexamethylene-bis(amino-1-propoxy-2,2,6,6-tetramethylpiperidine) and 2,4-dichloro-6-[(1-propoxy-2,2,6,6-tetramethylpiperidin-4-yl)butylamino]-s-triazine end-capped with 2-chloro-4,6-bis(dibutyl-amino)-s-triazine; (48) oligomeric condensate of 4,4'-hexamethylenebis (amino-1-acyloxy-2,2,6,6-tetramethylpiperidine) and 2,4-dichloro-6-[(1-acyloxy-2,2,6,6-tetramethylpiperidin-4-yl) butylamino]-s-triazine end-capped with 2-chloro-4,6-bis (dibutylamino)-s-triazine and (49) product obtained by reacting (a) with (b) where (a) is product obtained by reacting 1,2-bis(3-aminopropylamino)ethane with cyanuric chloride and (b) is (2,2,6,6-tetramethylpiperidin-4-yl)butylamine.

Embodiment 10

A polyolefin composition according to any of the preceding embodiments where the hindered amine light stabilizers are selected from the group consisting of bis(2,2,6,6-tetramethylpiperidin-4-yl) sebacate; 2,2,6,6-tetramethylpiperidin-4-yl octadecanoate; 1-(2-hydroxy-2-methylpropoxy)-4-octadecanoyloxy-2,2,6,6-tetramethylpiperidine; N,N'-bis-formyl-N,N'-bis(2,2,6,6-tetramethyl-4-piperidyl) hexamethylenediamine; a condensate of N,N'-bis(2,2,6,6-tetramethyl-4-piperidyl)-hexamethylenediamine and 4-tert-octylamino-2,6-dichloro-1,3,5-triazine; a condensate of N,N'-bis-(2,2,6,6-tetramethyl-4-piperidyl)hexamethylenediamine and 4-morpholino-2,6-dichloro-1,3,5-triazine; a condensate of N,N'-bis-(1,2,2,6,6-pentamethyl-4-piperidyl)hexamethylenediamine and 4-morpholino-2,6-dichloro-1,3,5-triazine; a reaction product of maleic acid anhydride-$C_{18}$-$C_{22}$-α-olefin-copolymer with 2,2,6,6-tetramethyl-4-aminopiperidine; an oligomeric compound condensate of 4,4'-hexamethylenebis(amino-2,2,6,6-tetramethylpiperidine) and 2,4-dichloro-6-[(2,2,6,6-tetramethylpiperidin-4-yl)butylamino]-s-triazine end-capped with 2-chloro-4,6-bis(dibutylamino)-s-triazine; an oligomeric compound condensate of 4,4'-hexamethylenebis(amino-1-propoxy-2,2,6,6-tetramethylpiperidine) and 2,4-dichloro-6-[(1-propoxy-2,2,6,6-tetramethylpiperidin-4-yl)butylamino]-s-triazine end-capped with 2-chloro-4,6-bis(dibutylamino)-s-triazine; and binary or ternary combinations thereof.

Embodiment 11

A polyolefin composition according to any of the preceding embodiments where the hindered amine stabilizers are a binary or ternary combination selected from the group consisting of (2) bis(2,2,6,6-tetramethylpiperidin-4-yl) sebacate and (36) condensate of N,N'-bis(2,2,6,6-tetramethyl-4-piperidyl)-hexamethylenediamine and 4-tert-octylamino-2,6-dichloro-1,3,5-triazine; (2) bis(2,2,6,6-tetramethylpiperidin-4-yl) sebacate and (38) condensate of N,N'-bis-(2,2,6,6-tetramethyl-4-piperidyl)hexamethylenediamine and 4-morpholino-2,6-dichloro-1,3,5-triazine; (2) bis(2,2,6,6-tetramethylpiperidin-4-yl) sebacate and (39) condensate of N,N'-bis-(1,2,2,6,6-pentamethyl-4-piperidyl)hexamethylenediamine and 4-morpholino-2,6-dichloro-1,3,5-triazine; (2) bis(2,2,6,6-tetramethylpiperidin-4-yl) sebacate and (45) oligomeric compound condensate of 4,4'-hexamethylenebis(amino-2,2,6,6-tetramethylpiperidine) and 2,4-dichloro-6-[(2,2,6,6-tetramethylpiperidin-4-yl)butylamino]-s-triazine end-capped with 2-chloro-4,6-bis(dibutylamino)-s-triazine; (20) 2,2,6,6-tetramethylpiperidin-4-yl octadecanoate and (45) oligomeric condensate of 4,4'-hexamethylene-bis(amino-2,2,6,6-tetramethylpiperidine) and 2,4-dichloro-6-[(2,2,6,6-tetramethylpiperidin-4-yl)butylamino]-s-triazine end-capped with 2-chloro-4,6-bis(dibutylamino)-s-triazine; (2) bis(2,2,6,6-tetramethylpiperidin-4-yl) sebacate and (20) 2,2,6,6-tetramethylpiperidin-4-yl octadecanoate; (2) bis(2,2,6,6-tetramethylpiperidin-4-yl) sebacate, (14) 1-(2-hydroxy-2-methyl-propoxy)-4-octadecanoyloxy-2,2,6,6-tetramethylpiperidine and (45) oligomeric condensate of 4,4'-hexamethylenebis(amino-2,2,6,6-tetramethylpiperidine) and 2,4-dichloro-6-[(2,2,6,6-tetramethylpiperidin-4-yl)butylamino]-s-triazine end-capped with 2-chloro-4,6-bis(dibutylamino)-s-triazine; (14) 1-(2-hydroxy-2-methylpropoxy)-4-octadecanoyloxy-2,2,6,6-tetramethylpiperidine, (20) 2,2,6,6-tetramethylpiperidin-4-yl octadecanoate and (45) oligomeric condensate of 4,4'-hexamethylenebis(amino-2,2,6,6-tetramethylpiperidine) and 2,4-dichloro-6-[(2,2,6,6-tetra-methylpiperidin-4-yl)butylamino]-s-triazine end-capped with 2-chloro-4,6-bis(dibutylamino)-s-triazine; (2) bis(2,2,6,6-tetramethylpiperidin-4-yl) sebacate, (14) 1-(2-hydroxy-2-methyl-propoxy)-4-octadecanoyloxy-2,2,6,6-tetramethylpiperidine and (36) condensate of N,N'-bis(2,2,6,6-tetramethyl-4-piperidyl)-hexamethylenediamine and 4-tert-octylamino-2,6-dichloro-1,3,5-triazine; (2) bis(2,2,6,6-tetramethylpiperidin-4-yl) sebacate, (14) 1-(2-hydroxy-2-methyl-propoxy)-2,2,6,6-tetramethylpiperidine and (38) condensate of N,N'-bis-(2,2,6,6-tetramethyl-4-piperidyl)-hexamethylenediamine and 4-morpholino-2,6-dichloro-1,3,5-triazine; and (2) bis(2,2,6,6-tetramethylpiperidin-4-yl) sebacate, (14) 1-(2-hydroxy-2-methyl-propoxy)-4-octadecanoyloxy-2,2,6,6-tetramethylpiperidine and (39) condensate of N,N'-bis-(1,2,2,6,6-pentamethyl-4-piperidyl)hexamethylenediamine and 4-morpholino-2,6-dichloro-1,3,5-triazine.

Embodiment 12

A polyolefin composition according to any of the preceding embodiments comprising a polyolefin substrate having incorporated therein c) a tris(2,4-di-tert-butylphenyl) phosphite/hindered phenolic antioxidant combination where the hindered phenolic antioxidants are selected from the group consisting of tris(3,5-di-tert-butyl-4-hydroxybenzyl) isocyanurate, 1,3,5-tris-(3,5-di-tert-butyl-4-hydroxybenzyl)-2,4,6-trimethylbenzene, the calcium salt of the monoethyl ester of 3,5-di-tert-butyl-4-hydroxybenzylphosphonic acid, pentaerythritol tetrakis[3-(3,5-di-tert-butyl-4-hydroxyphenyl) propionate] and octadecyl 3-(3,5-di-tert-butyl-4-hydroxyphenyl) propionate, N,N-di($C_{16}$-$C_{18}$alkyl)hydroxylamine, a tris(2,4-di-tert-butylphenyl) phosphite/N,N-di($C_{16}$-$C_{18}$alkyl)hydroxylamine combination, di($C_{16}$-$C_{18}$)alkyl methyl amine oxide or a tris(2,4-di-tert-butylphenyl) phosphite/di($C_{16}$-$C_{18}$)alkyl methyl amine oxide combination.

Embodiment 13

A polyolefin composition according to any of the preceding embodiments comprising a polyolefin substrate having incorporated therein c) a tris(2,4-di-tert-butylphenyl) phosphite/pentaerythritol tetrakis[3-(3,5-di-tert-butyl-4-hydroxyphenyl) propionate] combination, a tris(2,4-di-tert-butylphenyl) phosphite/octadecyl 3-(3,5-di-tert-butyl-4-hydroxyphenyl) propionate combination, N,N-di($C_{16}$-$C_{18}$alkyl)hydroxylamine, a tris(2,4-di-tert-butylphenyl) phosphite/N,N-di($C_{16}$-$C_{18}$alkyl)hydroxylamine combination, di($C_{16}$-$C_{18}$)alkyl methyl amine oxide or a tris(2,4-di-tert-butylphenyl) phosphite/di($C_{16}$-$C_{18}$)alkyl methyl amine oxide combination.

Embodiment 14

A polyolefin composition according to any of the preceding embodiments comprising a polyolefin substrate having incorporated therein e) a filler selected from the group consisting of calcium carbonate, magnesium hydroxide, talc, wollastonite and fly ash.

Embodiment 15

A polyolefin composition according to any of the preceding embodiments comprising a polyolefin substrate having incorporated therein f) one or more flame retardants selected from the group consisting of brominated flame retardants, phosphorus based flame retardants, melamine based compounds and antimony compounds.

Embodiment 16

A polyolefin composition according to any of the preceding embodiments comprising a polyolefin substrate having incorporated therein f) a melamine compound/polyol condensate.

Embodiment 17

A polyolefin composition according to any of the preceding embodiments comprising a polyolefin substrate having incorporated therein f) melamine polyphosphate, ammonium polyphosphate, pentaerythritol-di-methylphosphonate or a melamine compound/polyol condensate where the polyol is a linear, branched or cyclic trihydric, tetrahydric, pentahydric or hexahydric alchol or a linear or cyclic $C_4$-$C_6$ aldose or $C_4$-$C_6$ ketose and where the melamine compound is melamine phosphate, melamine pyrophosphate or melamine polyphosphate or a combination of antimony trioxide with decabromodiphenyl ether or tris[3-bromo-2,2-bis(bromomethyl)propyl]phosphate.

Embodiment 18

A polyolefin composition according to any of the preceding embodiments comprising a polyolefin substrate having incorporated therein g) one or more antimicrobial compounds selected from the group consisting of zinc oxide, copper, copper compounds, silver compounds, silver dispersions, supported silver, 3,5-dimethyl-tetrahydro-1,3,5-2H-thiodiazin-2-thione, bis-tributyltinoxide, 4,5-dichlor-2-n-octyl-4-isothiazolin-3-one, N-butyl-benzisothiazoline, 10,10'-oxybisphenoxyarsine, zinc-2-pyridinthiol-1-oxide, 2-methylthio-4-cyclopropylamino-6-($\alpha$,$\beta$-dimethylpropylamino)-s-triazine, 2-methylthio-4-cyclopropylamino-6-tert-butylamino-s-triazine, 2-methylthio-4-ethylamino-6-($\alpha$,$\beta$-dimethylpropylamino)-s-triazine, 2,4,4'-trichloro-2'-hydroxydiphenyl ether, 3-iodine-2-propenyl-butylcarbamate, carbendazim and thiabendazole.

Embodiment 19

A polyolefin composition according to any of the preceding embodiments comprising a polyolefin substrate having incorporated therein g) one or more antimicrobial compounds selected from the group consisting of silver supported on a zeolite, silver supported on a glass, elemental silver, micro or nano scaled elemental silver, elemental silver dispersed in silicone oil, silver chloride, silver nitrate, silver sulfate, silver phosphate, silver zirconate and silver apatite.

Embodiment 20

A polyolefin composition according to any of the preceding embodiments comprising a polyolefin substrate having incorporated therein a) one or more ultraviolet light absorbers, in total, from about 0.10 to about 2.5 weight percent, preferably from about 0.10 to about 1.5 weight percent, more preferably from about 0.10 to about 0.95 weight percent, b) one or more hindered amine light stabilizers, in total, from about 0.10 to about 1.9 weight percent, preferably from about 0.15 to about 1.5 weight percent, c) one or more antioxidants, in total, from about 0.05 to about 1.0 weight percent, preferably from about 0.10 to about 0.75 weight percent, d) one or more colorants, in total, from about 0.10 to about 3.0 weight percent, preferably from about 0.2 to about 1.0 weight percent, e) one or more fillers, in total, from about 5 to about 70 weight percent, preferably from about 15 to about 40 weight percent, f) one or more flame retardants, in total, from about 1 to about 70 weight percent, preferably from about 1 to about 50 weight percent, more preferably from about 1 to about 40 weight percent, and optionally g) one or more antimicrobial compounds, in total, from about 0.001 to about 5.0 weight percent, preferably from about 0.01 to about 4.0 weight percent, more preferably from about 0.02 to about 2.0 weight percent, the weight percents being based on the weight of the polyolefin substrate.

Embodiment 21

A polyolefin composition comprising a polyolefin substrate selected from the group consisting of polyethylene, polypropylene, ethylene/propylene copolymer, a mixture of polypropylene and polyethylene and a mixture of different types of polyethylene having incorporated therein a) about 0.10 to about 0.95 weight percent, in total, of one or more ultraviolet light absorbers selected from the group consisting of 5-chloro-2-(3-t-butyl-2-hydroxy-5-methylphenyl)-2H-benzotriazole, 2-(3,5-bis-$\alpha$-cumyl-2-hydroxyphenyl)-2H-benzotriazole, 4,6-diphenyl-2-(4-hexyloxy-2-hydroxyphenyl)-s-triazine, 4,6-bis-(2,4-dimethyl-phenyl)-2-(2-hydroxy-4-octyloxyphenyl)-s-triazine, hexadecyl 3,5-di-tert-butyl-4-hydroxybenzoate, 2,4-di-tert-butylphenyl 3,5-di-tert-butyl-4-hydroxybenzoate and 4-octyloxy-2-hydroxybenzophenone, b) about 0.15 to about 1.5 weight percent of a binary or ternary hindered amine light stabilizer combination selected from the group consisting of (2) bis (2,2,6,6-tetramethylpiperidin-4-yl) sebacate and (36) condensate of N,N'-bis(2,2,6,6-tetramethyl-4-piperidyl)-hexamethylenediamine and 4-tert-octylamino-2,6-dichloro-1,3,5-triazine; (2)bis(2,2,6,6-tetramethylpiperidin-4-yl) sebacate and (38) condensate of N,N'-bis-(2,2,6,6-tetramethyl-4-piperidyl)hexamethylenediamine and 4-morpholino-2,6-dichloro-1,3,5-triazine; (2)bis(2,2,6,6-tetramethylpiperidin-4-yl) sebacate and (39) condensate of N,N'-bis-(1,2,2,6,6-pentamethyl-4-piperidyl) hexamethylenediamine and 4-morpholino-2,6-dichloro-1,3, 5-triazine; (2) bis(2,2,6,6-tetramethylpiperidin-4-yl) sebacate and (45) oligomeric compound condensate of 4,4'-hexamethylenebis(amino-2,2,6,6-tetramethylpiperidine) and 2,4-dichloro-6-[(2,2,6,6-tetra-methylpiperidin-4-yl)butylamino]-s-triazine end-capped with 2-chloro-4,6-bis(dibutylamino)-s-triazine; (20) 2,2,6,6-tetramethylpiperidin-4-yl octadecanoate and (45) oligomeric condensate of 4,4'-hexamethylenebis(amino-2,2,6,6-tetramethylpiperidine) and 2,4-dichloro-6-[(2,2,6,6-tetra-methylpiperidin-4-yl)butylamino]-s-triazine end-capped with 2-chloro-4,6-bis(dibutylamino)-s-triazine; (2) bis(2,2,6,6-tetramethylpiperidin-4-yl) sebacate and (20) 2,2,6,6-tetramethylpiperidin-4-yl octadecanoate, (2) bis(2,2,6,6-tetramethylpiperidin-4-yl) sebacate, (14) 1-(2-hydroxy-2-methylpropoxy)-4-octadecanoyloxy-2,2,6,6-tetramethylpiperidine and (45) oligomeric condensate of 4,4'-hexamethylenebis(amino-2,2,6,6-tetramethylpiperidine) and 2,4-dichloro-6-[(2,2,6,6-tetramethylpiperidin-4-yl)butylamino]-s-triazine end-capped with 2-chloro-4,6-bis(dibutylamino)-s-triazine; (14) 1-(2-hydroxy-2-methylpropoxy)-4-octadecanoyloxy-2,2,6, 6-tetramethylpiperidine; (20) 2,2,6,6-tetramethylpiperidin-4-yl octadecanoate and (45) oligomeric condensate of 4,4'-hexamethylenebis(amino-2,2,6,6-tetramethylpiperidine) and 2,4-dichloro-6-[(2,2,6,6-tetramethylpiperidin-4-yl)butylamino]-s-triazine end-capped with 2-chloro-4,6-bis(dibutylamino)-s-triazine; (2) bis(2,2,6,6-tetramethylpiperidin-4-yl) sebacate, (14) 1-(2-hydroxy-2-methylpropoxy)-4-octadecanoyloxy-2,2,6,6-tetramethylpiperidine and (36) condensate of N,N'-bis(2,2,6,6-tetramethyl-4-piperidyl)-hexamethylenediamine and 4-tert-octylamino-2,6-dichloro-1,3,5-triazine; (2) bis(2,2,6,6-tetramethylpiperidin-4-yl) sebacate, (14) 1-(2-hydroxy-2-methylpropoxy)-4-octadecanoyloxy-2,2,6,6-tetramethylpiperidine and (38) condensate of N,N'-bis-(2,2,6,6-tetramethyl-4-piperidyl)hexamethylenediamine and 4-morpholino-2,6-dichloro-1,3,5-triazine; and (2) bis(2,2,6,6-tetramethylpiperidin-4-yl) sebacate, (14) 1-(2-hydroxy-2-methylpropoxy)-4-octadecanoyloxy-2,2,6, 6-tetramethylpiperidine and (39) condensate of N,N'-bis-(1, 2,2,6,6-pentamethyl-4-piperidyl)hexamethylenediamine and 4-morpholino-2,6-dichloro-1,3,5-triazine; c) about 0.10 to about 0.75 weight percent of a tris(2,4-di-tert-butylphenyl) phosphite/pentaerythritol tetrakis[3-(3,5-di-tert-butyl-4-hydroxyphenyl) propionate] combination, a tris(2,4-di-tert-butylphenyl) phosphite/octadecyl 3-(3,5-di-tert-butyl-4-hydroxyphenyl) propionate combination, N,N-di($C_{16}$-$C_{18}$alkyl)hydroxylamine, a tris(2,4-di-tert-butylphenyl) phosphite/N,N-di($C_{16}$-$C_{18}$alkyl)hydroxylamine combination; di($C_{16}$-$C_{18}$)alkyl methyl amine oxide, or a tris(2,4-di-tert-butylphenyl) phosphite/di($C_{16}$-$C_{18}$)alkyl methyl amine oxide combination; d) about 0.1 to about 3.0 weight percent, in total, of one or more colorants selected from the group consisting organic and inorganic pigments; e) about 15 to about 40 weight percent, in total, of one or more fillers selected from the group consisting of calcium carbonate, magnesium hydroxide, talc, wollastonite and fly ash; f) about 1 to about 40 weight percent, in total, of one or more flame retardants selected from the group consisting of melamine polyphosphate, ammonium polyphosphate, pentaerythritol-di-methylphosphonate, melamine compound/polyol condensates and a combination of antimony trioxide with decabromodiphenyl ether or tris[3-bromo-2,2-bis(bromomethyl)propyl]phosphate; and optionally g) about 0.02 to about 2.0 weight percent, in total, of one or more antimicrobial compounds selected from the group consisting of zinc oxide, copper, copper compounds, silver compounds, silver dispersions, supported silver, 3,5-dimethyl-tetrahydro-1,3,5-2H-thiodiazin-2-thione, bis-tributyltinoxide, 4,5-dichlor-2-n-octyl-4-isothiazolin-3-one, N-butyl-benzisothiazoline, 10,10'-oxybisphenoxyarsine, zinc-2-pyridinthiol-1-oxide, 2-methylthio-4-cyclopropylamino-6-($\alpha,\beta$-dimethylpropylamino)-s-triazine, 2-methylthio-4-cyclopropylamino-6-tert-butylamino-s-triazine, 2-methylthio-4-ethylamino-6-($\alpha,\beta$-dimethylpropylamino)-s-triazine, 2,4,4'-trichloro-2'-hydroxydiphenyl ether, 3-iodine-2-propenyl-butylcarbamate, carbendazim and thiabendazole, where the composition exhibits impact strength of >35 in-lb measured according to ASTM D4226, coefficient of linear thermal expansion of <4.5×10E-05 in/in/ft measured according to ASTM D696 and optionally acceptable color uniformity in finished siding parts according to ASTM D6864 and/or acceptable low delta E color for the intended application according to ASTM D2244 and/or a UL-94 V-1 or V-0 rating and/or a flame spread index of <200 measured according to ASTM E-84.

Embodiment 22

A polyolefin composition comprising a polypropylene homopolymer or copolymer substrate, optionally blended with a polyethylene homopolymer or copolymer where the blend may further contain a compatibilizer having incorporated therein a) about 0.10 to about 0.95 weight percent, in total, of one or more ultraviolet light absorbers selected from the group consisting of 5-chloro-2-(3-t-butyl-2-hydroxy-5-methylphenyl)-2H-benzotriazole, 2-(3,5-bis-α-cumyl-2-hydroxyphenyl)-2H-benzotriazole, 4,6-diphenyl-2-(4-hexyloxy-2-hydroxyphenyl)-s-triazine, 4,6-bis-(2,4-dimethylphenyl)-2-(2-hydroxy-4-octyloxyphenyl)-s-triazine, hexadecyl 3,5-di-tert-butyl-4-hydroxybenzoate, 2,4-di-tert-butylphenyl 3,5-di-tert-butyl-4-hydroxybenzoate and 4-octyloxy-2-hydroxybenzophenone; b) about 0.15 to about 1.5 weight percent of a binary or ternary hindered amine light stabilizer combination selected from the group consisting of (2)bis(2,2,6,6-tetramethylpiperidin-4-yl) sebacate and (36) condensate of N,N'-bis(2,2,6,6-tetramethyl-4-piperidyl)-hexamethylenediamine and 4-tert-octylamino-2, 6-dichloro-1,3,5-triazine; (2) bis(2,2,6,6-tetramethylpiperidin-4-yl) sebacate and (38) condensate of N,N'-bis-(2,2,6,6-tetramethyl-4-piperidyl)hexamethylenediamine and 4-morpholino-2,6-dichloro-1,3,5-triazine; (2) bis (2,2,6,6-tetramethylpiperidin-4-yl) sebacate and (39) condensate of N,N'-bis-(1,2,2,6,6-pentamethyl-4-piperidyl) hexamethylenediamine and 4-morpholino-2,6-dichloro-1,3, 5-triazine; (2)bis(2,2,6,6-tetramethylpiperidin-4-yl) sebacate and (45) oligomeric compound condensate of 4,4'-hexa-methylenebis(amino-2,2,6,6-tetramethylpiperidine) and 2,4-dichloro-6-[(2,2,6,6-tetramethyl-piperidin-4-yl)butylamino]-s-triazine end-capped with 2-chloro-4,6-bis(dibutylamino)-s-triazine; (20) 2,2,6,6-tetramethylpiperidin-4-yl octadecanoate and (45) oligomeric condensate of 4,4'-hexamethylenebis(amino-2,2,6,6-tetramethylpiperidine) and 2,4-dichloro-6-[(2,2,6,6-tetra-methylpiperidin-4-yl)butylamino]-s-triazine end-capped with 2-chloro-4,6-bis(dibutylamino)-s-triazine; (2) bis(2,2,6,6-tetramethylpiperidin-4-yl) sebacate and (20) 2,2,6,6-tetramethylpiperidin-4-yl octadecanoate; (2) bis(2,2,6,6-tetramethylpiperidin-4-yl) sebacate, (14) 1-(2-hydroxy-2-methylpropoxy)-4-octadecanoyloxy-2,2,6,6-tetramethylpiperidine and (45) oligomeric condensate of 4,4'-hexamethylenebis(amino-2,2,6,6-tetramethylpiperidine) and 2,4-dichloro-6-[(2,2,6,6-tetramethylpiperidin-4-yl)butylamino]-s-triazine end-capped with 2-chloro-4,6-bis(dibutylamino)-s-triazine; (14) 1-(2-hydroxy-2-methylpropoxy)-4-octadecanoyloxy-2,2,6, 6-tetramethylpiperidine, (20) 2,2,6,6-tetramethylpiperidin-4-yl octadecanoate and (45) oligomeric condensate of 4,4'-hexamethylenebis(amino-2,2,6,6-tetramethylpiperidine) and 2,4-dichloro-6-[(2,2,6,6-tetramethylpiperidin-4-yl)butylamino]-s-triazine end-capped with 2-chloro-4,6-bis(dibutylamino)-s-triazine; (2) bis(2,2,6,6-tetramethylpiperidin-4-yl) sebacate, (14) 1-(2-hydroxy-2-methylpropoxy)-4-octadecanoyloxy-2,2,6,6-tetramethylpiperidine and (36) condensate of N,N'-bis(2,2,6,6-tetramethyl-4-piperidyl)-hexamethylenediamine and 4-tert-octylamino-2,6-dichloro-1,3,5-triazine; (2) bis(2,2,6,6-tetramethylpiperidin-4-yl) sebacate, (14) 1-(2-hydroxy-2-methylpropoxy)-4-octadecanoyloxy-2,2,6,6-tetramethylpiperidine and (38) condensate of N,N'-bis-(2,2,6,6-tetramethyl-4-piperidyl)hexamethylenediamine and 4-morpholino-2,6-dichloro-1,3,5-triazine; and (2) bis(2,2,6,6-tetramethylpiperidin-4-yl) sebacate, (14) 1-(2-hydroxy-2-methylpropoxy)-4-octadecanoyloxy-2,2,6, 6-tetramethylpiperidine and (39) condensate of N,N'-bis-(1, 2,2,6,6-pentamethyl-4-piperidyl)hexamethylenediamine and 4-morpholino-2,6-dichloro-1,3,5-triazine; c) about 0.10 to about 0.75 weight percent of a tris(2,4-di-tert-butylphenyl) phosphite/pentaerythritol tetrakis[3-(3,5-di-tert-butyl-4-hydroxyphenyl) propionate] combination, a tris(2,4-di-tert-butylphenyl) phosphite/octadecyl 3-(3,5-di-tert-butyl-4-hydroxyphenyl) propionate combination, N,N-di($C_{16}$-$C_{18}$alkyl)hydroxylamine, a tris(2,4-di-tert-butylphenyl) phosphite/N,N-di($C_{16}$-$C_{18}$alkyl)hydroxylamine combination, di($C_{16}$-$C_{18}$)alkyl methyl amine oxide, or a tris(2,4-di-tert-butylphenyl) phosphite/di($C_{16}$-$C_{18}$)alkyl methyl amine oxide combination; d) about 0.1 to about 3.0 weight percent, in total, of one or more colorants selected from the group consisting organic and inorganic pigments; e) about 15 to about 40 weight percent, in total, of one or more fillers selected from the group consisting of calcium carbonate, magnesium hydroxide, talc, wollastonite and fly ash; f)

about 1 to about 40 weight percent, in total, of one or more flame retardants selected from the group consisting of melamine polyphosphate, ammonium polyphosphate, pentaerythritol-di-methylphosphonate, melamine compound/polyol condensates and a combination of antimony trioxide with decabromodiphenyl ether or tris[3-bromo-2,2-bis(bromomethyl)propyl]phosphate; and optionally g) about 0.02 to about 2.0 weight percent, in total, of one or more antimicrobial compounds selected from the group consisting of zinc oxide, copper, copper compounds, silver compounds, silver dispersions, supported silver, 3,5-dimethyl-tetrahydro-1,3,5-2H-thiodiazin-2-thione, bis-tributyltinoxide, 4,5-dichlor-2-n-octyl-4-isothiazolin-3-one, N-butyl-benzisothiazoline, 10,10'-oxybisphenoxyarsine, zinc-2-pyridinthiol-1-oxide, 2-methylthio-4-cyclopropylamino-6-($\alpha,\beta$-dimethylpropylamino)-s-triazine, 2-methylthio-4-cyclopropylamino-6-tert-butylamino-s-triazine, 2-methylthio-4-ethylamino-6-($\alpha,\beta$-dimethylpropylamino)-s-triazine, 2,4,4'-trichloro-2'-hydroxydiphenyl ether, 3-iodine-2-propenyl-butylcarbamate, carbendazim and thiabendazole, where the composition exhibits an impact strength of >35 in-lb measured according to ASTM D4226, coefficient of linear thermal expansion of <4.5×10E-05 in/in/ft measured according to ASTM D696 and optionally acceptable color uniformity in finished siding parts according to ASTM D6864 and/or acceptable low delta E color for the intended application according to ASTM D2244 and/or a UL-94 V-1 or V-0 rating and/or a flame spread index of <200 measured according to ASTM E-84.

Embodiment 23

A polyolefin composition according to any of the preceding embodiments comprising a polyolefin substrate having incorporated therein b) a high molecular weight hindered amine and a low molecular weight hindered amine.

Embodiment 24

A polyolefin composition according to any of the preceding embodiments comprising a polyolefin substrate having incorporated therein a) one or more ultraviolet light absorbers, for instance an hydroxybenzoate and b) a high molecular weight hindered amine and a low molecular weight hindered amine.

Embodiment 25

A polyolefin composition comprising a polyolefin substrate having incorporated therein a) an hydroxybenzoate ultraviolet light absorber and b) a high molecular weight hindered amine and a low molecular weight hindered amine.

Embodiment 26

A polyolefin composition according to embodiment 25 comprising a polyolefin substrate having incorporated therein one or more further compounds selected from the group consisting of c) one or more antioxidants, d) one or more colorants, e) one or more fillers and f) one or more flame retardants.

Embodiment 27

A polyolefin composition according to any of the preceding embodiments comprising a polyolefin substrate having incorporated therein an acrylic processing aid.

Embodiment 28

A polyolefin composition comprising a polyolefin substrate having incorporated therein an acrylic processing aid.

Embodiment 29

A polyolefin composition according to embodiment 28 comprising a polyolefin substrate having incorporated therein one or more further compounds selected from the group consisting of a) one or more ultraviolet light absorbers, b) one or more hindered amine light stabilizers, c) one or more antioxidants, d) one or more colorants, e) one or more fillers and f) one or more flame retardants.

Embodiment 30

An extruded article comprising the polyolefin composition according to any of the preceding embodiments.

Embodiment 31

An extruded article according to embodiment 30 which is house siding, cladding, soffit or roofing.

Embodiment 32

An extruded article according to embodiments 30 or 31 which has a thickness of about 0.030 inches to about 0.070 inches and a weight of from about 0.18 lbs/ft$^2$ to about 0.31 lbs/ft$^2$.

Embodiment 33

Use of a composition according to any of embodiments 1-29 in an article of manufacture selected from the group consisting of house siding, cladding, soffit and roofing.

Embodiment 34

An unfilled or filled polyolefin siding article, which article comprises a polyolefin substrate and which has a weight of from about 0.18 lbs/ft$^2$ to about 0.31 lbs/ft$^2$ and optionally a thickness of from about 0.030 inches to about 0.070 inches and where the article exhibits an impact strength of >35 in-lb measured according to ASTM D4226, a coefficient of linear thermal expansion of <4.5×10E-05 in/in/ft measured according to ASTM D696, and optionally acceptable color uniformity in finished siding parts according to ASTM D6864 and/or acceptable low delta E color for the intended application according to ASTM D2244 and/or a UL-94 V-1 or V-0 rating and/or a flame spread index of <200 measured according to ASTM E-84.

Embodiment 35

A polyolefin article according to embodiment 34 which is a monolithic siding article.

In the following examples and throughout the specification, all parts and percentages are by weight unless specified otherwise.

EXAMPLES

Example 1 Polypropylene Copolymer

The formulations are dry blended together with polypropylene copolymer and compounded in an extruder to form 2"×2"×60 mil bars. Weight percent levels of the hindered amines employed are found in the table below. Each formulation further contains 20 weight percent calcium carbonate filler. Each formulation also contains 0.20 weight percent of 5-chloro-2-(3-t-butyl-2-hydroxy-5-methylphenyl)-2H-benzotriazole, 0.40 weight percent of a tris(2,4-di-tert-butylphenyl) phosphite/pentaerythritol tetrakis[3-(3,5-di-tert-butyl-4-hydroxyphenyl) propionate] combination, 1.0 weight percent titanium dioxide and 15 weight percent of the condensate of melamine phosphate and pentaerythritol. All weight percents are based on the weight of polypropylene copolymer.

| Formulation | (2) | (20) | BIN1 | BIN2 | BIN3 | TER1 | TER2 |
|---|---|---|---|---|---|---|---|
| 1 | 0.4 | — | — | — | — | — | — |
| 2 | 1.0 | — | — | — | — | — | — |
| 3 | — | 0.4 | — | — | — | — | — |
| 4 | — | 1.0 | — | — | — | — | — |
| 5 | — | — | 0.4 | — | — | — | — |
| 6 | — | — | 0.4 | — | — | — | — |
| 7 | — | — | 1.0 | — | — | — | — |
| 8 | — | — | — | 0.4 | — | — | — |
| 9 | — | — | — | 0.4 | — | — | — |
| 10 | — | — | — | 1.0 | — | — | — |
| 11 | — | — | — | — | 0.4 | — | — |
| 12 | — | — | — | — | 0.4 | — | — |
| 13 | — | — | — | — | 1.0 | — | — |
| 14 | — | — | — | — | — | 0.4 | — |
| 15 | — | — | — | — | — | 1.0 | — |
| 16 | — | — | — | — | — | — | 0.4 |
| 17 | — | — | — | — | — | — | 1.0 |

The hindered amines are those identified in the detailed description. BIN1 is a binary combination of hindered amines (2) and (36). BIN2 is a binary combination of hindered amines (2) and (45). BIN3 is a binary combination of hindered amines (20) and (45). Formulations 5, 7, 8, 10, 11 and 13 contain 1:1 weight ratios of the binary combinations. Formulation 6 contains 0.3% of hindered amine (2) and 0.1% of hindered amine (36). Formulation 9 contains 0.3% of hindered amine (2) and 0.1% of hindered amine (45). Formulation 12 contains 0.3% of hindered amine (20) and 0.1% hindered amine (45). TER1 is a ternary combination of hindered amines (2), (45) and (14). TER2 is a ternary combination of hindered amines (20), (45) and (14). Formulation 14 contains 0.2% hindered amine (2), 0.14% hindered amine (45) and 0.06% hindered amine (14). Formulation 15 contains 0.5% hindered amine (2), 0.35% hindered amine (45) and 0.15% hindered amine (14). Formulation 16 contains 0.2% hindered amine (20), 0.14% hindered amine (45) and 0.06% hindered amine (14). Formulation 17 contains 0.5% hindered amine (20), 0.35% hindered amine (45) and 0.15% hindered amine (14).

Formulations 1-17 are repeated, replacing 20% calcium carbonate with 40% calcium carbonate to produce formulations 18-34, respectively. Formulations 1-17 are repeated, replacing 20% calcium carbonate with 20% talc to produce formulations 35-51, respectively. Formulations 1-17 are repeated, replacing 20% calcium carbonate with 40% talc to produce formulations 52-68, respectively. Formulations 1-17 are repeated, replacing 20% calcium carbonate with 20% wollastonite to produce formulations 69-85, respectively. Formulations 1-17 are repeated, replacing 20% calcium carbonate with 40% wollastonite to produce formulations 86-102 respectively. The bars of formulations 1-102 are tested for flame retardancy and color stability after accelerated weathering.

Example 2 High Density Polyethylene

The formulations are dry blended together with high density polyethylene (HDPE) and compounded in an extruder to form 2"×2"×60 mil bars. Weight percent levels of the hindered amines employed are in the table below. Each formulation further contains 20 weight percent calcium carbonate filler.

Each formulation also contains 0.20 weight percent of 5-chloro-2-(3-t-butyl-2-hydroxy-5-methylphenyl)-2H-benzotriazole, 0.40 weight percent of a tris(2,4-di-tert-butylphenyl) phosphite/pentaerythritol tetrakis[3-(3,5-di-tert-butyl-4-hydroxyphenyl) propionate] combination, 1.0 weight percent titanium dioxide and 15 weight percent of the condensate of melamine phosphate and pentaerythritol. All weight percents are based on the weight of polyethylene.

| Formulation | (2) | (36) | (45) | (20) | BIN1 | BIN2 | BIN4 | TER2 | TER3 |
|---|---|---|---|---|---|---|---|---|---|
| 103 | 0.2 | — | — | — | — | — | — | — | — |
| 104 | 0.5 | — | — | — | — | — | — | — | — |
| 105 | — | 0.2 | — | — | — | — | — | — | — |
| 106 | — | 0.5 | — | — | — | — | — | — | — |
| 107 | — | — | 0.2 | — | — | — | — | — | — |
| 108 | — | — | 0.5 | — | — | — | — | — | — |
| 109 | — | — | — | 0.2 | — | — | — | — | — |
| 110 | — | — | — | 0.5 | — | — | — | — | — |
| 111 | — | — | — | — | 0.2 | — | — | — | — |
| 112 | — | — | — | — | 0.5 | — | — | — | — |
| 113 | — | — | — | — | — | 0.2 | — | — | — |
| 114 | — | — | — | — | — | 0.5 | — | — | — |
| 115 | — | — | — | — | — | — | 0.2 | — | — |
| 116 | — | — | — | — | — | — | 0.5 | — | — |
| 117 | — | — | — | — | — | — | — | 0.2 | — |
| 118 | — | — | — | — | — | — | — | 0.5 | — |
| 119 | — | — | — | — | — | — | — | — | 0.2 |
| 120 | — | — | — | — | — | — | — | — | 0.5 |

The hindered amines are those identified in the detailed description. BIN4 is a binary combination of hindered amines (2) and (20). Formulations 111-116 contain 1:1 weight ratios of the binary combinations. Formulation 117 contains 0.1% hindered amine (20), 0.07% hindered amine (45) and 0.03% hindered amine (14). Formulation 118 contains 0.25% hindered amine (20), 0.175% hindered amine (45) and 0.075% hindered amine (14). Formulation 119 contains 0.1% hindered amine (36), 0.07% hindered amine (2) and 0.03% hindered amine (14). Formulation 120 contains 0.25% hindered amine (36), 0.175% hindered amine (2) and 0.075% hindered amine (14). Formulations 103-120 are repeated, replacing 20% calcium carbonate with 40% calcium carbonate to produce formulations 121-138, respectively. Formulations 103-120 are repeated, replacing 20% calcium carbonate with 20% talc to produce formulations 139-156, respectively. Formulations 103-120 are repeated, replacing 20% calcium carbonate with 40% talc to produce formulations 157-174, respectively. Formulations 103-120 are repeated, replacing 20% calcium carbonate with 20% wollastonite to produce formulations 175-192, respectively. Formulations 103-120 are repeated, replacing 20% calcium carbonate with 40% wollastonite to produce formulations 192-210, respectively. The bars of formulations 103-210 are tested for flame retardancy and color stability after accelerated weathering.

Example 3. Polypropylene Copolymer

Example 1 is repeated, replacing 5-chloro-2-(3-t-butyl-2-hydroxy-5-methylphenyl)-2H-benzotriazole with a UVA selected from 2-(3,5-bis-α-cumyl-2-hydroxyphenyl)-2H-benzotriazole, 4,6-diphenyl-2-(4-hexyl oxy-2-hydroxyphenyl)-s-triazine, 4,6-bis-(2,4-dimethylphenyl)-2-(2-hydroxy-4-octyloxyphenyl)-s-triazine, hexadecyl 3,5-di-tert-butyl-4-hydroxybenzoate and 2,4-di-tert-butylphenyl 3,5-di-tert-butyl-4-hydroxybenzoate; replacing the tris(2,4-di-tert-butylphenyl) phosphite/pentaerythritol tetrakis[3-(3,5-di-tert-butyl-4-hydroxyphenyl) propionate] combination with an antioxidant selected from a tris(2,4-di-tert-butylphenyl) phosphite/octadecyl 3-(3,5-di-tert-butyl-4-hydroxyphenyl) propionate combination, N,N-di($C_{16}$-$C_{18}$alkyl)hydroxylamine, a tris(2,4-di-tert-butylphenyl) phosphite/N,N-di($C_{16}$-$C_{18}$alkyl)hydroxylamine combination, di($C_{16}$-$C_{18}$)alkyl methyl amine oxide and a tris(2,4-di-tert-butylphenyl) phosphite/di($C_{16}$-$C_{18}$)alkyl methyl amine oxide combination; replacing the calcium carbonate, talc and wallastonite with magnesium hydroxide or fly ash; and replacing the condensate of melamine phosphate and pentaerythritol with a flame retardant selected from melamine polyphosphate, ammonium polyphosphate and a combination of antimony trioxide with decabromodiphenyl ether or tris[3-bromo-2,2-bis(bromomethyl)propyl]phosphate.

Example 4. High Density Polyethylene

Example 2 is repeated, replacing 5-chloro-2-(3-t-butyl-2-hydroxy-5-methylphenyl)-2H-benzotriazole with a UVA selected from 2-(3,5-bis-α-cumyl-2-hydroxyphenyl)-2H-benzotriazole, 4,6-diphenyl-2-(4-hexyloxy-2-hydroxyphenyl)-s-triazine, 4,6-bis-(2,4-dimethylphenyl)-2-(2-hydroxy-4-octyloxyphenyl)-s-triazine, hexadecyl 3,5-di-tert-butyl-4-hydroxybenzoate and 2,4-di-tert-butylphenyl 3,5-di-tert-butyl-4-hydroxybenzoate; replacing the tris(2,4-di-tert-butylphenyl) phosphite/pentaerythritol tetrakis[3-(3,5-di-tert-butyl-4-hydroxyphenyl) propionate] combination with an antioxidant selected from a tris(2,4-di-tert-butylphenyl) phosphite/octadecyl 3-(3,5-di-tert-butyl-4-hydroxyphenyl) propionate combination, N,N-di($C_{16}$-$C_{18}$alkyl)hydroxylamine, a tris(2,4-di-tert-butylphenyl) phosphite/N,N-di($C_{16}$-$C_{18}$alkyl)hydroxylamine combination, di($C_{16}$-$C_{18}$)alkyl methyl amine oxide and a tris(2,4-di-tert-butylphenyl) phosphite/di($C_{16}$-$C_{18}$)alkyl methyl amine oxide combination; replacing the calcium carbonate, talc and wallastonite with magnesium hydroxide or fly ash; and replacing the condensate of melamine phosphate and pentaerythritol with a flame retardant selected from melamine polyphosphate, ammonium polyphosphate and a combination of antimony trioxide with decabromodiphenyl ether or tris[3-bromo-2,2-bis(bromomethyl)propyl]phosphate.

Example 5. Polypropylene Homopolymer

Examples 1-4 are repeated replacing the polyolefin with polypropylene homopolymer.

Example 6. High Melt Strength Polypropylene

ExxonMobil high melt strength polypropylene homopolymer 5341E1 is cryogenically ground to powder form, to which are blended powdered additives, talc inorganic reinforcing filler, calcium carbonate lubricant, powdered colorant and 500 ppm of IRGANOX B-215 as processing and heat stabilizer. Formulations are fed via single gravimetric feeder at 12 pounds/hour feed rate to a COPERION 25 mm corotating twin screw extruder at set temperature 220° C., 150 rpm screw speed. Extruded polymer strands are cooled in a water bath and pelletized to granule form.

Talc is Specialty Minerals ULTRATALC 609, cColorant is Ocean Blue pigment, IRGANOX B-215 is a 2:1 weight blend of tris(2,4-ditert-butylphenyl)phosphite, and pentaerythritol tetrakis[3-[3,5-di-tert-butyl-4-hydroxyphenyl] propionate]. Formulations prepared are as follows, where the wt % is based on polypropylene:

1: blank polypropylene
2: 0.4% HALS (2)
3: 0.2% HALS (2)/0.2% HALS (36)
4: 0.3% HALS (2)/0.1% HALS (36)
5: 0.2% HALS (2)/0.14% HALS (36)/0.06% hexadecyl 3,5-di-tert-butyl-4-hydroxybenzoate
6: 0.2% HALS (2)/0.2% HALS (45)
7: 0.3% HALS (2)/0.1% HALS (45)
8: 0.2% HALS (2)/0.14% HALS (45)/0.06% hexadecyl 3,5-di-tert-butyl-4-hydroxybenzoate
9: 0.4% HALS (20)
10: 0.2% HALS (20)/0.2% HALS (45)
11: 0.2% HALS (14)/0.2% HALS (45)
12: 0.2% HALS (2)/0.14% HALS (45)/0.06% HALS (14)
13: 0.2% HALS (2)/0.14% HALS (45)/0.06 hexadecyl 3,5-di-tert-butyl-4-hydroxybenzoate
14: 0.2% HALS (2)/0.14% HALS (45)/0.06% HALS (14)/0.04% 5-chloro-2-(3-t-butyl-2-hydroxy-5-methylphenyl)-2H-benzotriazole
15: 0.2% HALS (2)/0.14% HALS (45)/0.06% hexadecyl 3,5-di-tert-butyl-4-hydroxybenzoate/0.04% 5-chloro-2-(3-t-butyl-2-hydroxy-5-methylphenyl)-2H-benzotriazole
16: 0.14% HALS (45)/0.06% HALS (14)/0.2% HALS (20)
17: 0.14% HALS (45)/0.06% hexadecyl 3,5-di-tert-butyl-4-hydroxybenzoate/0.2% HALS (20)

Formulations are injection molded to 60 mil thick plaques, 1.75 in.×2.5 in., using BOY 50 injection molding machine with setpoint temperature 450° F., mold temperature 65° F. Three replicate plaques of each formulation are then mounted on frames and subjected to accelerated light aging/weathering using an Atlas Ci65A xenon Weather-O-Meter ("WOM"), per ASTM G155 cycle 1 (irradiance 0.35 W/m$^2$, black panel temperature 63° C., cycles 102 minutes light and 18 minutes light with water spray, with inner & outer light filters borosilicate.)

Results for the average readings after 1912 hours of weathering are presented in the following table:

| Formulation | ΔE | Initial 60° gloss | 60° gloss | Δ 60° gloss |
|---|---|---|---|---|
| 1 | 22.6 | 50.7 | 2.5 | 48.2 |
| 2 | 0.7 | 50.0 | 29.8 | 20.3 |
| 3 | 0.7 | 54.9 | 32.8 | 22.0 |
| 4 | 0.8 | 56.6 | 33.7 | 22.9 |
| 5 | 0.9 | 57.3 | 47.5 | 9.7 |
| 6 | 0.6 | 56.2 | 34.3 | 21.9 |
| 7 | 0.8 | 56.9 | 33.6 | 23.3 |
| 8 | 1.0 | 56.9 | 46.9 | 10.0 |
| 9 | 8.9 | 60.2 | 5.0 | 55.2 |
| 10 | 0.8 | 58.6 | 36.7 | 21.9 |
| 11 | 0.9 | 44.7 | 32.3 | 12.4 |
| 12 | 0.8 | 49.7 | 34.5 | 15.2 |
| 13 | 1.0 | 50.9 | 45.0 | 6.0 |
| 14 | 0.9 | 50.1 | 36.9 | 13.2 |
| 15 | 1.0 | 50.9 | 44.3 | 6.6 |

-continued

| Formulation | ΔE | Initial 60° gloss | 60° gloss | Δ 60° gloss |
|---|---|---|---|---|
| 16 | 0.9 | 50.9 | 36.5 | 14.4 |
| 17 | 1.0 | 51.3 | 44.3 | 7.0 |

Formulations 5, 8, and 11-17 show excellent results.

Example 7. Polypropylene Copolymer

The substrate is polypropylene impact copolymer PROFAX SG702 in pellet form. The filler is Heritage Plastics HT6P commercial masterbatch (60% talc in polypropylene copolymer). Filler is let down to 20% in all formulations.
Procedure:
 1. Bag Mixing 1 kg
 2. Compounding @ 200° C.
 3. Injection Molding @ 220° C. (plaque thickness 60 mil for Weather-o-Meter exposures)
 4. Periodic reading of color and gloss
 5. Microscopy for microcracking and exudation
 6. Regular spray weathering with intervals at 0, 500, 1000, 2000, 3000, 4000 hrs, etc.

The following formulations are prepared. Additives are present at 0.75 weight percent based on polypropylene. Multi-coponent additive mixtures contain individual additives in equal weight percent.
 1: hexadecyl 3,5-di-tert-butyl-4-hydroxybenzoate
 2: 2,4-di-t-butyl phenyl 3,5-di-t-butyl-4-hydroxybenzoate
 3: HALS (2)
 4: HALS (2)/hexadecyl 3,5-di-tert-butyl-4-hydroxybenzoate
 5: HALS (14)
 6: HALS (14)/hexadecyl 3,5-di-tert-butyl-4-hydroxybenzoate
 7: HALS (36)
 8: HALS (36)/hexadecyl 3,5-di-tert-butyl-4-hydroxybenzoate
 9: HALS (2)/HALS (14)/HALS (45)
 10: HALS (2)/HALS (14)/HALS (45)/hexadecyl 3,5-di-tert-butyl-4-hydroxybenzoate
 11: HALS (2)/HALS (14)/HALS (45)/2,4-di-t-butyl phenyl 3,5-di-t-butyl-4-hydroxybenzoate
 12: HALS (20)/hexadecyl 3,5-di-tert-butyl-4-hydroxybenzoate/HALS (39)/4,6-bis-(2,4-dimethylphenyl)-2-(2-hydroxy-4-octyloxyphenyl)-s-triazine (0.41 weight percent total)

The results of ΔE color change after accelerated weathering at 1500 hours and 4000 hours are below:

| Formulation | 1500 hours | 4000 hours |
|---|---|---|
| 1 | 18.2 | — |
| 2 | 16.5 | — |
| 3 | 3.8 | 3.7 |
| 4 | 4.0 | 3.5 |
| 5 | 6.8 | 6.7 |
| 6 | 5.3 | 4.9 |
| 7 | 3.3 | 3.7 |
| 8 | 3.5 | 2.9 |
| 9 | 3.0 | 2.9 |
| 10 | 3.5 | 2.9 |
| 11 | 2.1 | 2.0 |
| 12 | 3.8 | 3.5 |

Excellent results are achieved with formulations containing HALS and a benzoate UV absorber.

The following additional formulations are employed for gloss retention studies:
 1a: 0.15% hexadecyl 3,5-di-tert-butyl-4-hydroxybenzoate
 2a: 0.15% 2,4-di-t-butyl phenyl 3,5-di-t-butyl-4-hydroxybenzoate
 13a: 0.15% HALS (2)/HALS (14)/HALS (45)
 14a: 0.15% HALS (2)/HALS (14)/HALS (45)/hexadecyl 3,5-di-tert-butyl-4-hydroxybenzoate
 15a: 0.15% HALS (2)/HALS (14)/HALS (45)/2,4-di-t-butyl phenyl 3,5-di-t-butyl-4-hydroxybenzoate Percent 60° gloss retention at various time intervals are found below:

| Formulation | 1000 hours | 1500 hours | 2000 hours | 3000 hours | 4000 hours |
|---|---|---|---|---|---|
| 1a | 25% | 13% | — | — | — |
| 1 | 29% | 15% | — | — | — |
| 2a | 29% | 14% | — | — | — |
| 2 | 38% | 14% | — | — | — |
| 13a | 86% | 82% | 52% | 13% | 8% |
| 13 | 88% | 78% | 64% | 43% | 26% |
| 14a | 89% | 89% | 88% | 36% | 11% |
| 15a | 87% | 87% | 79% | 20% | 10% |
| 15 | 85% | 84% | 83% | 81% | 74% |

Combinations of hindered amine stabilizers and benzoate UV absorbers provide outstanding gloss retention upon accelerated weathering.

Example 8. Flame Retardancy of Polypropylene Homopolymer

ExxonMobil high melt strength polypropylene homopolymer 5341E1 is dry blended with the listed additives, 0.5% zinc stearate, and 0.1% IRGANOX B-225 thermal stabilizer. Formulations are extrusion compounded on 25 mm twin screw extruder at 195-205° C. set temperatures run at 200 rpm and 20 kg/hr feed rate. Compounded formulations are injection molded into UL-94 vertical burn test specimens 0.125×5.0×0.5 inches dimensions. IRGANOX B-225 is a 1:1 weight blend of tris(2,4-ditert-butylphenyl)phosphite and pentaerythritol tetrakis[3-[3,5-di-tert-butyl-4-hydroxyphenyl]propionate]. The following formulations are prepared. Additives are weight percent based on polypropylene.
 1: control—no flame retardant
 2: 6% AFLAMMIT PCO 960/0.6% HALS (34)
 3: 8% AFLAMMIT PCO 960/0.8% HALS (34)
 4: 6% AFLAMMIT PCO 960/0.6% HALS (47)
 5: 8% AFLAMMIT PCO 960/0.8% HALS (47)

AFLAMMIT PCO 960 is a proprietary organic phosphorus flame retardant containing 24% phosphorus, available from Thor.

Combinations of hindered amine stabilizers and benzoate UV absorbers provide outstanding gloss retention upon accelerated weathering.

Ratings according to the UL-94 V test are as compiled in the following table. UL-94 Test for Flammability of Plastic Materials for Parts in Devices and Appliances, 5th Edition, Oct. 29, 1996.

| Rating | Afterflame time | Burning drips | Burn to Clamp |
|---|---|---|---|
| V-0 | <10 s | no | no |
| V-1 | <30 s | no | no |
| V-2 | <30 s | yes | no |

-continued

| Rating | Afterflame time | Burning drips | Burn to Clamp |
|---|---|---|---|
| Fail | <30 s | | yes |
| Fail | >30 s | | no |

Results are below:

| Formulation | UL-94 rating |
|---|---|
| 1 | no rating |
| 2 | V-2 |
| 3 | V-2 |
| 4 | V-0 |
| 5 | V-0 |

Example 9. Melt Strength Improvement of Polypropylene

Suitable melt strength is an important property in extruded polymer profile articles. High melt strength is desired to avoid sagging or drooling of polymer film, sheet or profile shaped articles upon the polymer melt exiting the extruder die and during take-up operation in downstream equipment. It has surprisingly been found that improvements in melt strength can be imparted to commercially available high melt strength polypropylenes used as profile extrusion applications via polymer blending in the melt with certain random or block polymers. In particular polyolefin copolymers known as Olefinic Block Copolymers (OBC) such as INFUSE from Dow and VISTAMAXX from ExxonMobil have been found to improve melt strength properties in polypropylene and blends of polypropylene and polyethylene as shown below. A valuable property is melt strength for extruded profile articles. It is shown in the table that while HDPE alone and OBC alone have poor melt strength, certain binary and ternary combinations with a polypropylene, in this case a high melt strength (HMS) polypropylene, exhibit higher melt strength and elongation stress at break, over the HMS PP alone.

Polypropylene (PP) is ExxonMobil high melt strength polypropylene homopolymer 5341E1. Polyethylene is ALATHON L 5332CP, HDPE from LyondellBasell. Olefinic block copolymers (OBC) are INFUSE 9010 or INFUSE 9100 from Dow or VISTAMAXX 6102 or VISTAMAXX 3020FL from ExxonMobil. PARALOID K 125 is an all acrylic processing aid for vinyl from Dow, Mw 4.0 to 5.0 million, Tg 106° C.

The following formulations are tested. Percents are by weight.
1: PP
2: HDPE
3: INFUSE 9010
4: 90% PP/10% INFUSE 9010
5: 90% HDPE/10% INFUSE 9010
6: 70% PP/30% HDPE
7: 63% PP/32% HDPE/5% INFUSE 9010
8: 63% PP/27% HDPE/10% INFUSE 9010
9: PP
10: 95% PP/5% INFUSE 9100
11: 90% PP/10% INFUSE 9100
12: 95% PP/5% VISTAMAXX 6102
13: 90% PP/10% VISTAMAXX 6102
14: 95% PP/5% VISTAMAXX 3020FL
15: 90% PP/10% VISTAMAXX 3020FL
16: PP
17: 99% PP/1% PARALOID K 125
18: 97% PP/3% PARALOID K 125
19: 95% PP/5% PARALOID K 125

Results for formulations 1-8 are below. $V_b$ is speed at break (mm/sec). F is force at break in cN (melt strength). Draw ratio is draw ratio at break—ratio of initial speed to speed at break, higher is desired. Elongation stress is elongation stress at break in MPa—more extensibility of the polymer melt, higher is desired.

| Formulation | $V_b$ | F | draw ratio | elongation stress |
|---|---|---|---|---|
| 1 | 471.6 | 22.4 | 21.0 | 1.19 |
| 2 | 294.7 | 15.6 | 12.0 | 0.52 |
| 3 | 339.8 | 9.4 | 10.9 | 0.36 |
| 4 | 525.5 | 25.4 | 20.8 | 1.54 |
| 5 | 280.6 | 14.4 | 11.3 | 0.46 |
| 6 | 402.0 | 24.0 | 17.8 | 1.09 |
| 7 | 458.8 | 24.0 | 20.9 | 1.26 |
| 8 | 500.7 | 25.9 | 21.3 | 1.47 |

Results for formulations 9-15 are below.

| Formulation | $V_b$ | F | draw ratio | elongation stress |
|---|---|---|---|---|
| 9 | 344.6 | 17.6 | 12.8 | 0.69 |
| 10 | 427.3 | 23.7 | 16.6 | 1.15 |
| 11 | 390.4 | 21.2 | 16.4 | 0.95 |
| 12 | 408.3 | 20.1 | 15.0 | 0.95 |
| 13 | 460.7 | 19.5 | 18.6 | 1.06 |
| 14 | 382.0 | 16.4 | 13.6 | 0.73 |
| 15 | 496.5 | 22.2 | 18.5 | 1.26 |

Results for formulations 16-19 are below.

| Formulation | $V_b$ | F | draw ratio | elongation stress |
|---|---|---|---|---|
| 16 | 374.1 | 18.8 | 14.5 | 0.877 |
| 17 | 377.6 | 16.1 | 13.7 | 0.704 |
| 18 | 464.8 | 21.7 | 18.4 | 1.185 |
| 19 | 454.1 | 21.4 | 16.9 | 1.109 |

What is claimed is:
1. An article of manufacture comprising: a polyolefin substrate having incorporated therein:
about 0.10 to about 1.9 weight percent, based on the weight of the polyolefin substrate, a ternary combination of hindered amine light stabilizers (HALS) selected from:
(2) bis(2,2,6,6-tetramethylpiperidin-4-yl) sebacate, (14) 1-(2-hydroxy-2-methylpropoxy)-4-octadecanoyloxy-2,2,6,6-tetramethylpiperidine, and (20) 2,2,6,6-tetramethylpiperidin-4-yl octadecanoate;
(2) bis(2,2,6,6-tetramethylpiperidin-4-yl) sebacate, (14) 1-(2-hydroxy-2-methyl-propoxy)-4-octadecanoyloxy-2,2,6,6-tetramethylpiperidine, and (45) oligomeric condensate of 4,4'-hexamethylenebis(amino-2,2,6,6-tetra-methylpiperidine) and 2,4-dichloro-6-[(2,2,6,6-tetramethylpiperidin-4-yl)butylamino]-s-triazine end-capped with 2-chloro-4,6-bis(dibutylamino)-s-triazine; or
(14) 1-(2-hydroxy-2-methylpropoxy)-4-octadecanoyloxy-2,2,6,6-tetramethylpiperidine, (20) 2,2,6,6-tetramethylpiperidin-4-yl octadecanoate and (45) oligomeric condensate of 4,4'-hexamethylene-bis(amino-2,2,6,6-tetramethylpiperidine) and 2,4- dichloro-6-[(2,2,6,6-tetramethylpiperidin-4-yl)butylamino]-s-triazine end-capped with 2-chloro-4,6-bis(dibutylamino)-s-triazine;

about 12 ppm to about 500 ppm, based on the weight of the polyolefin substrate, a nucleating agent comprising 2,2'-methylene-bis(4,6-di-tert-butylphenyl)phosphate, zinc glycerolate, aromatic trisamide compounds 1,3:2,4-bis-(3,4-dimethylbenzylidene)sorbitol 1,3:2,4-bis(4-methylbenzylidene)sorbitol, 1,3:2,4-bis(3,4-dimethylbenzylidene)sorbitol, or a mixture of any two or more thereof;

about 15 wt % to about 40 wt %, based on the weight of the polyolefin substrate, of a filler comprising calcium carbonate; and about 0.10 to about 2.5 weight percent, based on the weight of the polyolefin substrate, of an ultraviolet light absorber comprising hexadecyl 3,5-di-tert-butyl-4-hydroxybenzoate or 2,4-di-tert-butylphenyl 3,5-di-tert-butyl-4-hydroxybenzoate;

wherein:
any two of the ternary HALS combinations have a weight ratio from about 1:5 to about 5:1; and
the article exhibits an impact strength of >35 in-lb measured according to ASTM D4226, acceptable color uniformity in finished siding parts according to ASTM D6864, a low delta E color according to ASTM D2244 of ≤5.0, and a coefficient of linear thermal expansion of <4.5×10E-05 in/in/ft measured according to ASTM D696.

2. The article of manufacture of claim 1, wherein the polyolefin substrate further comprises an additive selected from the group consisting of: one or more additional hindered amine light stabilizers, an antioxidant, a colorant, a flame retardant, and an antimicrobial compound.

3. The article of manufacture of claim 2, wherein:
the one or more additional hindered amine light stabilizers are selected from the group consisting of (1) 1-cyclohexyloxy-2,2,6,6-tetramethyl-4-octadecylaminopiperidine; (3) bis(1-acetoxy-2,2,6,6-tetramethylpiperidin-4-yl) sebacate; (4) bis(1,2,2,6,6-pentamethylpiperidin-4-yl) sebacate; (5) bis(1-cyclohexyloxy-2,2,6,6-tetramethylpiperidin-4-yl) sebacate; (6) bis(1-octyloxy-2,2,6,6-tetramethylpiperidin-4-yl) sebacate; (7) bis(1-acyl-2,2,6,6-tetramethylpiperidin-4-yl) sebacate; (8) bis(1,2,2,6,6-pentamethyl-4-piperidyl) n-butyl-3,5-di-tert-butyl-4-hydroxybenzylmalonate (9) 2,4-bis[(1-cyclohexyloxy-2,2,6,6-tetramethylpiperidin-4-yl)butylamino]-6-(2-hydroxyethylamino-s-triazine; (10) bis(1-cyclohexyloxy-2,2,6,6-tetramethylpiperidin-4-yl) adipate; (11) 2,4-bis[(1-cyclohexyloxy-2,2,6,6-piperidin-4-yl)butylamino]-6-chloro-s-triazine; (12) 1-(2-hydroxy-2-methylpropoxy)-4-hydroxy-2,2,6,6-tetramethylpiperidine; (13) 1-(2-hydroxy-2-methylpropoxy)-4-oxo-2,2,6,6-tetramethylpiperidine; (15) bis(1-(2-hydroxy-2-methylpropoxy)-2,2,6,6-tetramethylpiperidin-4-yl) sebacate; (16) bis(1-(2-hydroxy-2-methylpropoxy)-2,2,6,6-tetramethylpiperidin-4-yl) adipate; (17) 2,4-bis[N-[1-(2-hydroxy-2-methylpropoxy)-2,2,6,6-tetramethylpiperidin-4-yl]-N-butylamino]-6-(2-hydroxyethylamino)-s-triazine; (18) 4-benzoyl-2,2,6,6-tetramethylpiperidine; (19) di-(1,2,2,6,6-pentamethylpiperidin-4-yl) p-methoxybenzylidenemalonate; (21) bis(1-octyloxy-2,2,6,6-tetramethylpiperidyl) succinate; (22) 1,2,2,6,6-pentamethyl-4-aminopiperidine; (23) 2-undecyl-7,7,9,9-tetramethyl-1-oxa-3,8-diaza-4-oxo-spiro[4,5]decane; (24) tris(2,2,6,6-tetramethyl-4-piperidyl) nitrilotriacetate; (25) tris-(2-hydroxy-3-(amino-(2,2,6,6-tetramethylpiperidin-4-yl)propyl) nitrilotriacetate; (26) tetrakis(2,2,6,6-tetramethyl-4-piperidyl)-1,2,3,4-butane-tetracarboxylate; (27) tetrakis-(1,2,2,6,6-pentamethyl-4-piperidyl)-1,2,3,4-butane-tetracarboxylate; (28) 1,1'-(1,2-ethanediyl)-bis-(3,3,5,5-tetramethylpiperazinone); (29) 3-n-octyl-7,7,9,9-tetramethyl-1,3,8-triazaspiro[4.5]decan-2,4-dione; (30) 8-acetyl-3-dodecyl-7,7,9,9-tetramethyl-1,3,8-triazaspiro[4.5]decane-2,4-dione;
(31) 3-dodecyl-1-(2,2,6,6-tetramethyl-4-piperidyl)pyrrolidin-2,5-dione; (32) 3-dodecyl-1-(1,2,2,6,6-pentamethyl-4-piperidyl)pyrrolidine-2,5-dione; (33) N,N'-bisformyl-N,N'-bis(2,2,6,6-tetramethyl-4-piperidyl) hexamethylenediamine; (33a) bis(1-undecanyloxy-2,2,6,6-tetramethylpiperidin-4-yl)carbonate; (34) reaction product of 2,4-bis[(1-cyclohexyloxy-2,2,6,6-piperidin-4-yl)butylamino]-6-chloro-s-triazine with N,N'-bis(3-aminopropyl)ethylenediamine); (35) condensate of 1-(2-hydroxyethyl)-2,2,6,6-tetramethyl-4-hydroxypiperidine and succinic acid; (36) condensate of N,N'-bis(2,2,6,6-tetramethyl-4-piperidyl)-hexamethylenediamine and 4-tert-octylamino-2,6-dichloro-1,3,5-triazine; (37) condensate of N,N'-bis(2,2,6,6-tetramethyl-4-piperidyl)-hexamethylenediamine and 4-cyclohexylamino-2,6-dichloro-1,3,5-triazine; (38) condensate of N,N'-bis-(2,2,6,6-tetramethyl-4-piperidyl)hexamethylenediamine and 4-morpholino-2,6-dichloro-1,3,5-triazine; (39) condensate of N,N'-bis-(1,2,2,6,6-pentamethyl-4-piperidyl)hexamethylenediamine and 4-morpholino-2,6-dichloro-1,3,5-triazine; (40) condensate of 2-chloro-4,6-bis(4-n-butylamino-2,2,6,6-tetramethylpiperidyl)-1,3,5-triazine and 1,2-bis(3-aminopropylamino)ethane; (41) condensate of 2-chloro-4,6-di-(4-n-butylamino-1,2,2,6,6-pentamethylpiperidyl)-1,3,5-triazine and 1,2-bis-(3-aminopropylamino)ethane; (42) a reaction product of 7,7,9,9-tetramethyl-2-cycloundecyl-1-oxa-3,8-diaza-4-oxospiro[4,5]decane and epichlorohydrin; (43) poly[methyl-(3-oxy-(2,2,6,6-tetramethylpiperidin-4-yl)propyl)]
siloxane, CAS #182635-99-0; (44) reaction product of maleic acid anhydride-$C_{18}$-$C_{22}$-α-olefin-copolymer with 2,2,6,6-tetramethyl-4-aminopiperidine; (46) oligomeric condensate of 4,4'-hexamethylenebis(amino-1,2,2,6,6-pentamethylpiperidine) and 2,4-dichloro-6-[(1,2,2,6,6-pentamethylpiperidin-4-yl)butylamino]-s-triazine end-capped with 2-chloro-4,6-bis(dibutylamino)-s-triazine; (47) oligomeric condensate of 4,4'-hexamethylenebis(amino-1-propoxy-2,2,6,6-tetramethylpiperidine) and 2,4-dichloro-6-[(1-propoxy-2,2,6,6-tetramethylpiperidin-4-yl)butylaminol-s-triazine end-capped with 2-chloro-4,6-bis(dibutylamino)-s-triazine; (48) oligomeric condensate of 4,4'-hexamethylenebis(amino-1-acyloxy-2,2,6,6-tetramethylpiperidine) and 2,4-dichloro-6-R1-acyloxy-2,2,6,6-tetramethylpiperidin-4-yl)butylamino]-s-triazine end-capped with 2-chloro-4,6-bis(dibutylamino)-s-triazine; (49) product obtained by reacting (a) with (b) where (a) is product obtained by reacting 1,2-bis(3-aminopropylamino)ethane with cyanuric chloride and (b) is (2,2,6,6-tetramethylpiperidin-4-yl)butylamine; and a mixture of any two or more thereof;
the antioxidant is selected from the group consisting of organic phosphorus stabilizer/hindered phenolic antioxidant combinations, dialkylhydroxylamine stabilizers, organic phosphorus stabilizer/dialkylhydroxylamine stabilizer combinations, amine oxide stabilizers, organic phosphorus stabilizer/amine oxide stabilizer combinations, and a mixture of any two or more thereof;

the colorant is selected from the group consisting organic pigments, inorganic pigments, and a mixture of any two or more thereof; and the flame retardants are selected from the group consisting of chlorinated flame retardants, brominated flame retardants, phosphorus based flame retardants, metal hydroxide compounds, melamine based compounds, antimony compounds, borate compounds, and a mixture of any two or more thereof.

4. The article of manufacture of claim 2, wherein the one or more additional hindered amine light stabilizers are selected from the group consisting of (33) N,N'-bis-formyl-N,N'-bis(2,2,6,6-tetramethyl-4-piperidyl)hexamethylenediamine; (36) condensate of N,N'-bis(2,2,6,6-tetramethyl-4-piperidyl)-hexamethylenediamine and 4-tert-octylamino-2,6-dichloro-1,3,5-triazine; (38) condensate of N,N'-bis-(2,2,6,6-tetramethyl-4-piperidyl)hexamethylenediamine and 4-morpholino-2,6-dichloro-1,3,5-triazine; (39) condensate of N,N'-bis-(1,2,2,6,6-pentamethyl-4-piperidyl)hexamethylenediamine and 4-morpholino-2,6-dichloro-1,3,5-triazine; (44) reaction product of maleic acid anhydride-$C_{18}$-$C_{22}$-$\alpha$-olefin-copolymer with 2,2,6,6-tetramethyl-4-aminopiperidine; (47) oligomeric compound condensate of 4,4'-hexamethylenebis(amino-1-propoxy-2,2,6,6-tetramethylpiperidine) and 2,4-dichloro-6-[(1-propoxy-2,2,6,6-tetramethylpiperidin-4-yl)butylamino]-s-triazine end-capped with 2-chloro-4,6-bis(dibutylamino)-s-triazine; and binary or ternary combinations thereof.

5. The article of manufacture of claim 2, wherein the polyolefin substrate has incorporated therein:
the one or more ultraviolet light absorbers, in total, from about 0.10 to about 1.5 weight percent,
the ternary combination of hindered amine light stabilizers, in total, from about 0.15 to about 1.5 weight percent,
the one or more antioxidants, in total, from about 0.05 to about 1.0 weight percent,
one or more colorants, in total, from about 0.10 to about 3.0 weight percent,
one or more flame retardants, in total, from about 1 to about 70 weight percent, and
optionally, one or more antimicrobial compounds, in total, from about 0.001 to about 5.0 weight percent, the weight percents being based on the weight of the polyolefin substrate.

6. The article of manufacture of claim 1, wherein the polyolefin substrate comprises polyethylene, polypropylene, an ethylene/propylene copolymer, or a mixture of any two or more thereof.

7. The article of manufacture of claim 1, wherein the filler further comprises one or more of dolomite, silica, magnesium hydroxide, zinc borate, talc, vermiculite, diatomite, perlite, wallastonite, fly ash, kaolin clay, or mica or titanium dioxides.

8. The article of manufacture of claim 1, wherein the filler further comprises one or more of magnesium hydroxide, talc, wollastonite, or fly ash.

9. The article of manufacture of claim 1, wherein the nucleating agent comprises an aromatic trisamide compound.

10. The article of manufacture of claim 1, wherein the polyolefin substrate further has incorporated therein:

a tris(2,4-di-tert-butylphenyl) phosphite/hindered phenolic antioxidant combination wherein the hindered phenolic antioxidants are selected from the group consisting of tris(3,5-di-tert-butyl-4-hydroxybenzyl) isocyanurate, 1,3,5-tris-(3,5-di-tert-butyl-4-hydroxybenzyl)-2,4,6-trimethylbenzene, the calcium salt of the monoethyl ester of 3,5-di-tert-butyl-4-hydroxybenzylphosphonic acid, pentaerythritol tetrakis [3-(3,5-di-tert-butyl-4-hydroxyphenyl) propionate] and octadecyl 3-(3,5-di-tert-butyl-4-hydroxyphenyl) propionate, N,N-di($C_{16}$-$C_{18}$alkyl)hydroxylamine, a tris(2,4-di-tert-butylphenyl) phosphite/N,N-di($C_{16}$-$C_{18}$alkyl)hydroxylamine combination, di($C_{16}$-$C_{18}$)alkyl methyl amine oxide, a tris(2,4-di-tert-butylphenyl) phosphite/di($C_{16}$-$C_{18}$)alkyl methyl amine oxide combination, a tris(2,4-di-tert-butylphenyl) phosphite/pentaerythritoltetrakis [3-(3,5-di-tert-butyl-4-hydroxyphenyl) propionate] combination, a tris(2,4-di-tert-butylphenyl) phosphite/octadecyl 3-(3,5-di-tert-butyl-4-hydroxyphenyl) propionate combination, N,N-di($C_{16}$-$C_{18}$alkyl)hydroxylamine, a tris(2,4-di-tert-butylphenyl) phosphite/N,N-di($C_{16}$-$C_{18}$alkyl)hydroxylamine combination, di($C_{16}$-$C_{18}$)alkyl methyl amine oxide, or a tris(2,4-di-tert-butylphenyl) phosphite/di($C_{16}$-$C_{18}$)alkyl methyl amine oxide combination.

11. The article of manufacture of claim 1, which is an extruded article selected from the group consisting of house siding, cladding, soffit, and roofing having a thickness of about 0.030 inches to about 0.070 inches and a weight of from about 0.18 lbs/ft$^2$ to about 0.31 lbs/ft$^2$.

12. An article of manufacture comprising a polyolefin substrate selected from the group consisting of polyethylene, polypropylene, ethylene/propylene copolymer, and a mixture of any two or more thereof, the polyolefin substrate having incorporated therein:
a ternary combination of hindered amine light stabilizers (HALS), in total, from about 0.15 to about 1.5 weight percent based on the weight of the polyolefin substrate;
a nucleating agent that comprises from about 12 ppm to about 300 ppm by weight based on the weight of the polyolefin substrate;
about 0.10 to about 0.95 weight percent, based on the weight of the polyolefin substrate, an ultraviolet light absorber comprising hexadecyl 3,5-di-tert-butyl-4-hydroxybenzoate or 2,4-di-tert-butylphenyl 3,5-di-tert-butyl-4-hydroxybenzoate; and
a filler that comprises from about 15 to about 40 weight percent based on the weight of the polyolefin substrate;
wherein:
the ternary combination of hindered amine light stabilizers selected from:
(2) bis(2,2,6,6-tetramethylpiperidin-4-yl) sebacate, (14) 1-(2-hydroxy-2-methylpropoxy)-4-octadecanoyloxy-2,2,6,6-tetramethylpiperidine, and (20) 2,2,6,6-tetramethylpiperidin-4-yl octadecanoate;
(2) bis(2,2,6,6-tetramethylpiperidin-4-yl) sebacate, (14) 1-(2-hydroxy-2-methylpropoxy)-4-octadecanoyloxy-2,2,6,6-tetramethylpiperidine, and (45) oligomeric condensate of 4,4'-hexamethylenebis(amino-2,2,6,6-tetramethylpiperidine) and 2,4-dichloro-6-[(2,2,6,6-tetramethylpiperidin-4-yl)butylamino]-s-triazine end-capped with 2-chloro-4,6-bis(dibutylamino)-s-triazine; or

(14) 1-(2-hydroxy-2-methylpropoxy)-4-octadecanoyloxy-2,2,6,6-tetramethylpiperidine, (20) 2,2,6,6-tetramethylpiperidin-4-yl octadecanoate and (45) oligomeric condensate of 4,4'-hexamethylenebis(amino-2,2,6,6-tetramethylpiperidine) and 2,4-dichloro-6-[(2,2,6,6-tetramethylpiperidin-4-yl)butylamino]-s-triazine end-capped with 2-chloro-4,6-bis(dibutylamino)-s-triazine;

the nucleating agent comprises 2,2'-methylene-bis(4,6-di-tert-butylphenyl)phosphate, zinc glycerolate, 1,3:2,4-bis-(3,4-dimethylbenzylidene)sorbitol, 1,3:2,4-bis(4-methylbenzylidene)sorbitol, 1,3:2,4-bis(3,4-dimethylbenzylidene)sorbitol, or a mixture of any two or more thereof;

the filler comprises calcium carbonate;

any two of the ternary HALS combinations have a weight ratio from about 1:5 to about 5:1; and the article exhibits an impact strength of >35 in-lb measured according to ASTM D4226, acceptable color uniformity in finished siding parts according to ASTM D6864, a low delta E color according to ASTM D2244 of ≤5.0, and a coefficient of linear thermal expansion of <4.5×10E-05 in/in/ft measured according to ASTM D696.

13. The article of manufacture of claim 12, wherein the polyolefin substrate has further incorporated therein one or more additional additives selected from the group consisting of: one or more additional hindered amine light stabilizers; an antioxidant; a colorant; a flame retardant; and an antimicrobial compound.

14. The article of manufacture of claim 12, wherein the filler further comprises one or more of magnesium hydroxide, talc, wollastonite, or fly ash.

15. The article of manufacture of claim 12, wherein the article is an extruded article selected from the group consisting of house siding, cladding, soffit, and roofing having a thickness of about 0.030 inches to about 0.070 inches and a weight of from about 0.18 lbs/ft$^2$ to about 0.31 lbs/ft$^2$.

16. An article of manufacture comprising a polyolefin substrate having incorporated therein a nucleating agent, a filler, a hydroxybenzoate ultraviolet light absorber, a ternary combination of a high molecular weight hindered amine and a low molecular weight hindered amine, an antioxidant, a colorant, a flame retardant, and an acrylic processing aid; wherein:

the ternary combination of the high molecular weight hindered amine and the low molecular weight hindered amine comprises (2) bis(2,2,6,6-tetramethylpiperidin-4-yl) sebacate, (14) 1-(2-hydroxy-2-methylpropoxy)-4-octadecanoyloxy-2,2,6,6-tetramethylpiperidine, and (45) oligomeric condensate of 4,4'-hexamethylenebis(amino-2,2,6,6-tetramethylpiperidine) and 2,4-dichloro-6-[(2,2,6,6-tetramethylpiperidin-4-yl)butylamino]-s-triazine end-capped with 2-chloro-4,6-bis(dibutylamino)-s-triazine;

the nucleating agent comprises 2,2'-methylene-bis(4,6-di-tert-butylphenyl)phosphate, zinc glycerolate, aromatic trisamide compounds, 1,3:2,4-bis-(3,4-dimethylbenzylidene)sorbitol 1,3:2,4-bis(4-methylbenzylidene)sorbitol, 1,3:2,4-bis(3,4-dimethylbenzylidene)sorbitol, or a mixture of any two or more thereof;

the hydroxybenzoate ultraviolet light absorber comprising hexadecyl 3,5-di-tert-butyl-4-hydroxybenzoate or 2,4-di-tert-butylphenyl 3,5-di-tert-butyl-4-hydroxybenzoate;

the filler comprises calcium carbonate;

any two of the ternary HALS combinations have a weight ratio from about 1:5 to about 5:1; and the article exhibits an impact strength of >35 in-lb measured according to ASTM D4226, acceptable color uniformity in finished siding parts according to ASTM D6864, a low delta E color according to ASTM D2244 of ≤5.0, a coefficient of linear thermal expansion of <4.5×10E-05 in/in/ft measured according to ASTM D696, and a UL-94 V-1 or V-0 rating and/or a flame spread index of <200 measured according to ASTM E-84.

17. The article of manufacture of claim 16, which is an extruded article selected from the group consisting of house siding, cladding, soffit, and roofing having a thickness of about 0.030 inches to about 0.070 inches and a weight of from about 0.18 lbs/ft$^2$ to about 0.31 lbs/ft$^2$.

* * * * *